(12) United States Patent
Murakami et al.

(10) Patent No.: US 9,787,199 B2
(45) Date of Patent: Oct. 10, 2017

(54) POWER CONVERSION DEVICE TO CONTROL POWER DISTRIBUTION OF INPUT POWER TO MULTIPLE OUTPUTS

(71) Applicant: Mitsubishi Electric Corporation, Chiyoda-ku (JP)

(72) Inventors: Satoshi Murakami, Chiyoda-ku (JP); Masaki Yamada, Chiyoda-ku (JP); Ryota Kondo, Chiyoda-ku (JP); Takaaki Takahara, Chiyoda-ku (JP); Naohisa Uehara, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/021,890

(22) PCT Filed: May 21, 2014

(86) PCT No.: PCT/JP2014/063430
§ 371 (c)(1),
(2) Date: Mar. 14, 2016

(87) PCT Pub. No.: WO2015/059949
PCT Pub. Date: Apr. 30, 2015

(65) Prior Publication Data
US 2016/0233777 A1 Aug. 11, 2016

(30) Foreign Application Priority Data
Oct. 23, 2013 (JP) .................................. 2013-219942

(51) Int. Cl.
*H02M 3/335* (2006.01)
*H02M 1/00* (2006.01)

(52) U.S. Cl.
CPC .... *H02M 3/33546* (2013.01); *H02M 3/33561* (2013.01); *H02M 3/33584* (2013.01); *H02M 2001/007* (2013.01)

(58) Field of Classification Search
None
See application file for complete search history.

(56) References Cited

U.S. PATENT DOCUMENTS 4,672,516 A * 6/1987 Ney ................... H02M 3/33561
363/16
4,980,811 A * 12/1990 Suzuji ............... H02M 3/33561
323/250

(Continued)

FOREIGN PATENT DOCUMENTS

JP 8-154311 A 6/1996
JP 2001-204170 A 7/2001

(Continued)

OTHER PUBLICATIONS

International Search Report dated Aug. 26, 2014, in PCT/JP2014/063430 filed May 21, 2014.

*Primary Examiner* — Jeffrey Gblende
(74) *Attorney, Agent, or Firm* — Oblon, McClelland, Maier & Neustadt, L.L.P.

(57) ABSTRACT

The power reception amount of input power from an AC power supply is controlled through a first switching circuit. DC voltage is controlled through a second switching circuit, to control charge power for a first DC voltage source. DC voltage obtained by a third switching circuit is converted to AC by an inverter, to supply the resultant power to an AC load. DC voltage is controlled through a fourth switching circuit, to control charge power for a second DC voltage source. Thus, distribution control of the input power is performed. In addition, in the distribution control of the input power, operation of the second switching circuit or the (Continued)

fourth switching circuit is stopped to allow stop of the charging for the first DC voltage source or the second DC voltage source.

21 Claims, 43 Drawing Sheets

(56) References Cited

U.S. PATENT DOCUMENTS

| | | | | |
|---|---|---|---|---|
| 6,011,704 A | * | 1/2000 | Coleman | H02M 3/28 323/258 |
| 2003/0185022 A1 | * | 10/2003 | Ohishi | H02M 3/33507 363/21.06 |
| 2007/0076445 A1 | * | 4/2007 | Boke | H02M 3/3376 363/17 |
| 2008/0054719 A1 | * | 3/2008 | Nakazato | H02M 3/155 307/3 |
| 2008/0094859 A1 | | 4/2008 | Takayanagi et al. | |
| 2008/0101096 A1 | | 5/2008 | Takayanagi et al. | |

FOREIGN PATENT DOCUMENTS

| | | |
|---|---|---|
| JP | 2008-109754 A | 5/2008 |
| JP | 4263736 B2 | 5/2009 |
| JP | 2010-148227 A | 7/2010 |
| JP | 2011-244523 A | 12/2011 |
| JP | 2013-187995 A | 9/2013 |
| WO | WO 2011/141785 A1 | 11/2011 |

* cited by examiner

POWER CONVERSION DEVICE TO CONTROL POWER DISTRIBUTION OF INPUT POWER TO MULTIPLE OUTPUTS

TECHNICAL FIELD

The present invention relates to a power conversion device capable of performing power distribution control of input power to multiple outputs and realizing stop control.

BACKGROUND ART

Some conventional power conversion devices have a multioutput power supply configuration obtained by using complex windings for a transformer (for example, see Patent Document 1 shown below). An object of the power conversion device in this conventional technology is to, in charging two DC voltage sources with power from an AC power supply using the transformer having the complex windings magnetically coupled with each other, set a priority on one of the DC voltage sources to perform the charging. In the case where there is no AC power supply, one of the DC voltage sources is used as a power supply source to charge the other DC voltage source by means of bidirectional switch.

CITATION LIST

Patent Document

Patent Document 1: Japanese Patent No. 4263736

SUMMARY OF THE INVENTION

Problems to be Solved by the Invention

However, in the conventional device disclosed in Patent Document 1, a bidirectional switch circuit for controlling charging is formed using a diode connected in antiparallel to a switching element. Therefore, even if the amount of power received by each DC voltage source is to be controlled through PWM control using the bidirectional switch circuit, since the power is rectified by the diode connected in a bridge form, the amount of charge to each DC voltage source cannot be controlled, resulting in a problem that it is impossible to perform distribution control of AC input power.

When one of the DC voltage sources has been fully charged, it is necessary to stop the charging. However, for the same reason as described above, there is a problem that it is impossible to stop the charging while continuing to charge the other DC voltage source.

The present invention has been made to solve the above problems, and an object of the present invention is to provide a power conversion device capable of performing power distribution control of input power to multiple outputs and arbitrarily performing stop control of supply of power as necessary.

Solution to the Problems

A first power conversion device according to the present invention includes: a transformer composed of a first winding, a second winding, a third winding, and a fourth winding which are magnetically coupled with each other; a first switching circuit having an AC end connected to the first winding via a first step-up coil; an AC/DC converter having an output end connected to a DC end of the first switching circuit, and an input end connected to an AC power supply; a second switching circuit having an AC end connected to the second winding via a second step-up coil; a first DC voltage source connected to a DC end of the second switching circuit; a third switching circuit having an AC end connected to the third winding via a third step-up coil; an inverter connected to a DC end of the third switching circuit; and a fourth switching circuit connected between the fourth winding and a second DC voltage source. A turns ratio between the first winding and the second winding is set so that voltage of the second winding is lower than charge voltage of the first DC voltage source. In distribution of input power from the AC power supply to the first DC voltage source, an AC load connected to the inverter, and the second DC voltage source, a power reception amount of the input power is controlled through the first switching circuit; voltage occurring on the second winding is stepped up through the second switching circuit and DC voltage that is output of the second switching circuit is controlled, thereby controlling charge power for the first DC voltage source; DC voltage that is output of the third switching circuit is converted to AC by the inverter to supply resultant power to the AC load; and DC voltage that is output of the fourth switching circuit is controlled through the fourth switching circuit, thereby controlling charge power for the second DC voltage source. Thus, distribution control of the input power is performed. In the distribution control of the input power, stopping the second switching circuit allows stop of charging for the first DC voltage source, and stopping the fourth switching circuit allows stop of charging for the second DC voltage source.

A second power conversion device according to the present invention includes: a transformer composed of a first winding, a second winding, and a fourth winding which are magnetically coupled with each other; a first switching circuit having an AC end connected to the first winding via a first step-up coil; an AC/DC converter having a DC end connected to a DC end of the first switching circuit, and an AC end connected to an AC power supply; a second switching circuit having an AC end connected to the second winding via a second step-up coil; a first DC voltage source connected to a DC end of the second switching circuit; a fourth switching circuit connected between the fourth winding and a second DC voltage source; and an inverter connected to the DC end of the AC/DC converter, in parallel with the first switching circuit. A turns ratio between the first winding and the second winding is set so that voltage of the second winding is lower than charge voltage of the first DC voltage source. In distribution of input power from the AC power supply to the first DC voltage source, an AC load connected to the inverter, and the second DC voltage source, a power reception amount of the input power is controlled through the first switching circuit; voltage occurring on the second winding is stepped up through the second switching circuit and DC voltage that is output of the second switching circuit is controlled, thereby controlling charge power for the first DC voltage source; DC voltage that is output of the fourth switching circuit is controlled through the fourth switching circuit, thereby controlling charge power for the second DC voltage source; and DC voltage that is output of the AC/DC converter is converted to AC by the inverter to supply resultant power to the AC load. Thus, distribution control of the input power is performed. In the distribution control of the input power, stopping the second switching circuit allows stop of charging for the first DC voltage source, and stopping the fourth switching circuit allows stop of charging for the second DC voltage source.

A third power conversion device according to the present invention includes: a transformer composed of a first winding, a second winding, and a third winding which are magnetically coupled with each other; a first switching circuit having an AC end connected to the first winding via a first step-up coil; an AC/DC converter having a DC end connected to a DC end of the first switching circuit, and an AC end connected to an AC power supply; a second switching circuit having an AC end connected to the second winding via a second step-up coil; a first DC voltage source connected to a DC end of the second switching circuit; a third switching circuit having an AC end connected to the third winding via a third step-up coil; and an inverter connected to a DC end of the third switching circuit. A turns ratio between the first winding and the second winding is set so that voltage of the second winding is lower than charge voltage of the first DC voltage source. In distribution of input power from the AC power supply to the first DC voltage source and an AC load connected to the inverter, a power reception amount of the input power is controlled through the first switching circuit; voltage occurring on the second winding is stepped up through the second switching circuit and DC voltage that is output of the second switching circuit is controlled, thereby controlling charge power for the first DC voltage source; and DC voltage that is output of the third switching circuit is converted to AC by the inverter to supply resultant power to the AC load. Thus, distribution control of the input power is performed. In the distribution control of the input power, stopping the second switching circuit allows stop of charging for the first DC voltage source.

A fourth power conversion device according to the present invention includes: a transformer composed of a first winding, a second winding, and a fourth winding which are magnetically coupled with each other; a first switching circuit having an AC end connected to the first winding via a first step-up coil; an AC/DC converter having an output end connected to a DC end of the first switching circuit, and an input end connected to an AC power supply; a second switching circuit having an AC end connected to the second winding via a second step-up coil; a first DC voltage source connected to a DC end of the second switching circuit; and a fourth switching circuit connected between the fourth winding and a second DC voltage source. A turns ratio between the first winding and the second winding is set so that voltage of the second winding is lower than charge voltage of the first DC voltage source. In distribution of input power from the AC power supply to the first DC voltage source and the second DC voltage source, a power reception amount of the input power is controlled through the first switching circuit; voltage occurring on the second winding is stepped up through the second switching circuit and DC voltage that is output of the second switching circuit is controlled, thereby controlling charge power for the first DC voltage source; and DC voltage that is output of the fourth switching circuit is controlled through the fourth switching circuit, thereby controlling charge power for the second DC voltage source. Thus, distribution control of the input power is performed. In the distribution control of the input power, stopping the second switching circuit allows stop of charging for the first DC voltage source, and stopping the fourth switching circuit allows stop of charging for the second DC voltage source.

Effect of the Invention

The power conversion devices according to the present invention can perform power distribution control of input power to multiple outputs, and as necessary, can arbitrarily stop operation of charging the first DC voltage source or the second DC voltage source, while supplying power to another load.

DESCRIPTION OF EMBODIMENTS

Embodiment 1

Figure 1:
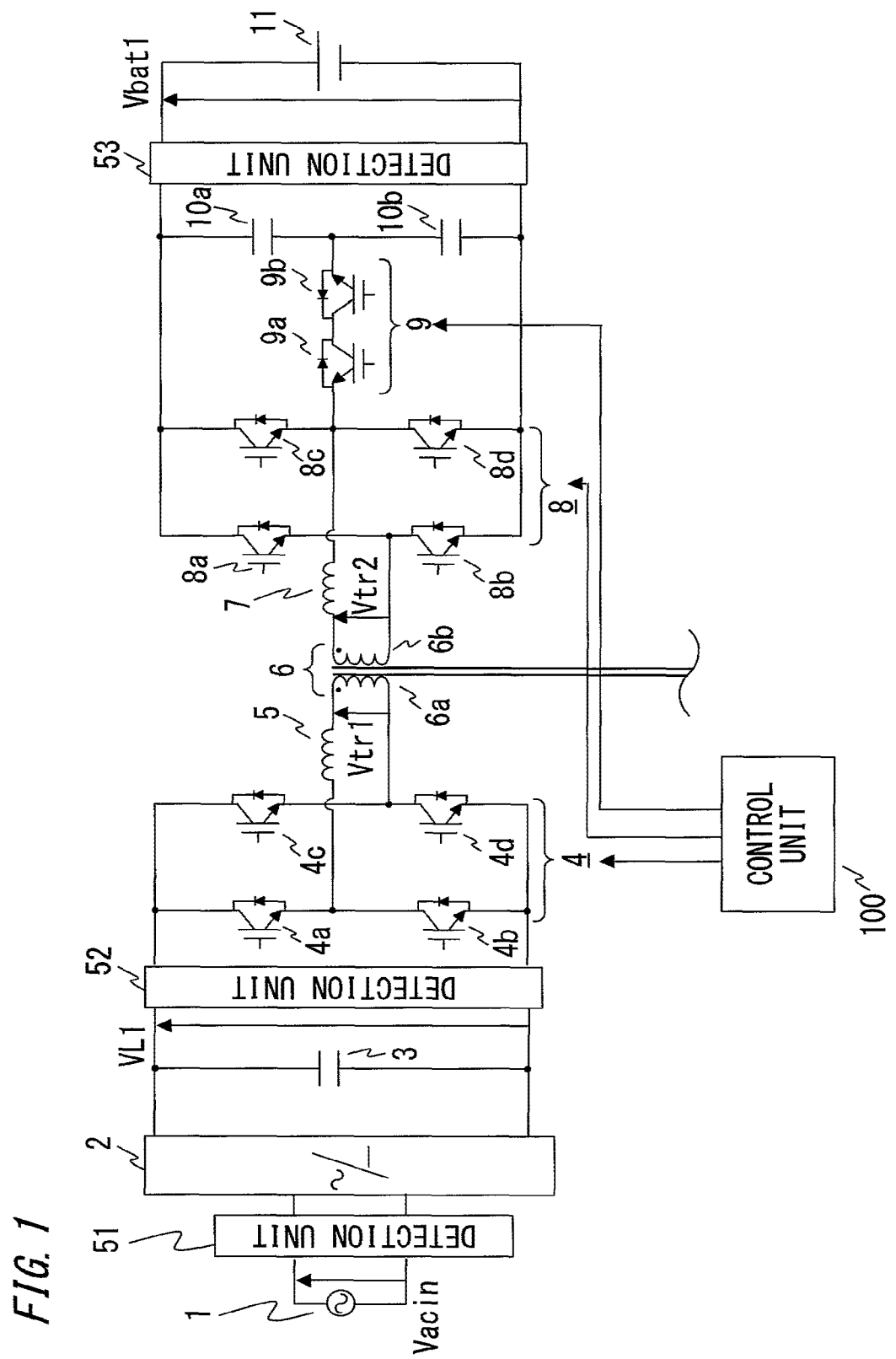
FIG. 1 is a circuit configuration diagram of a power conversion device according to embodiment 1 of the present invention.
Figure 2:
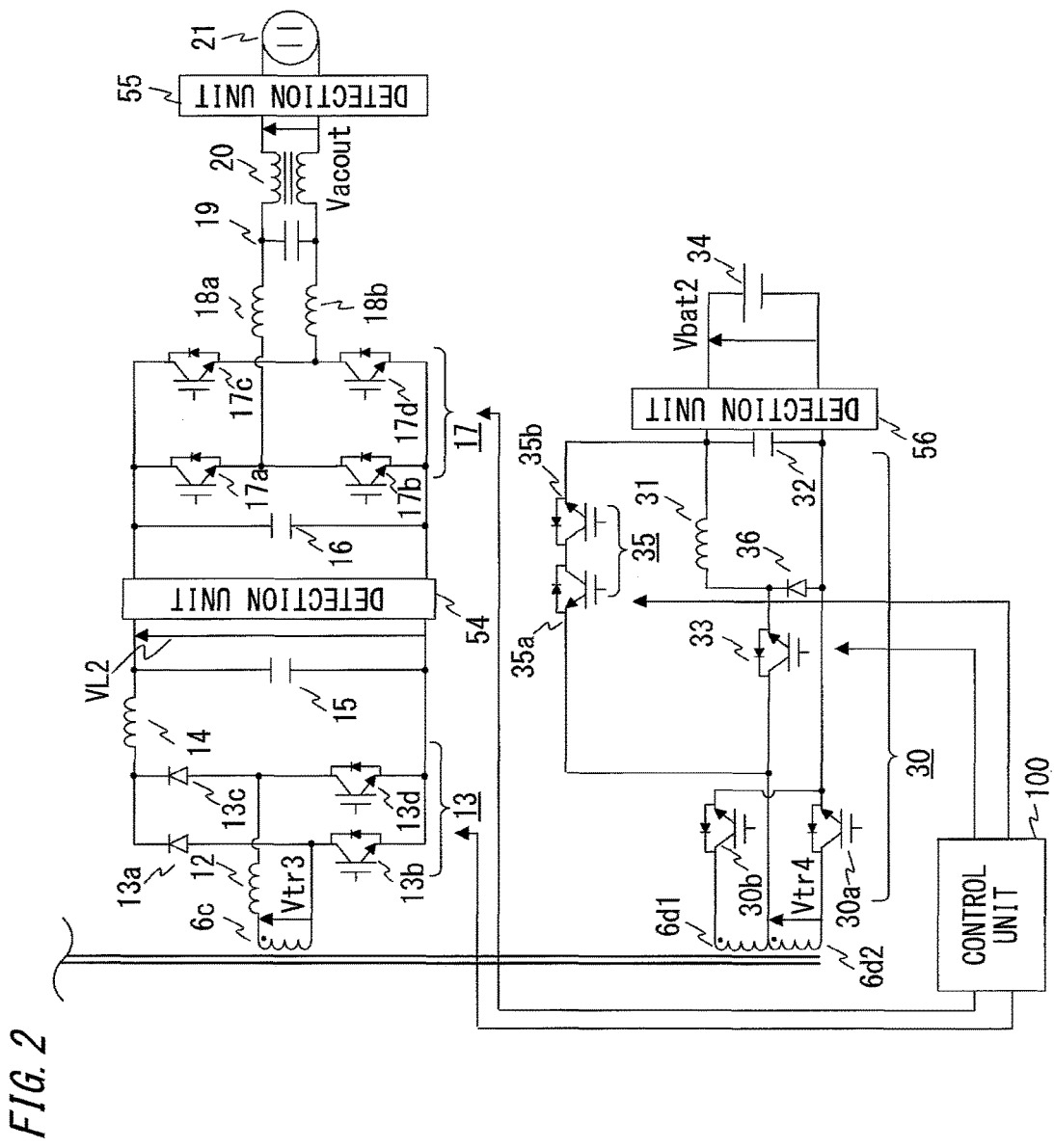
FIG. 2 is a circuit configuration diagram of the power conversion device according to embodiment 1 of the present invention.

FIG. 1 and FIG. 2 are circuit configuration diagrams of a power conversion device according to embodiment 1 of the present invention.

The power conversion device of the present embodiment 1 is applied to, for example, a power supply system involving a charger for an electric vehicle. That is, the power conversion device is applicable to a system in which: an AC power supply 1 is a commercial AC power supply, a private power generator, or the like; a first DC voltage source 11 is a high-voltage battery for vehicle travelling; a second DC voltage source 34 is a lead battery as a power supply for a vehicle electric component; and an inverter 17 is a power supply of AC 100V which can be used in the vehicle.

The AC power supply 1 is connected to an AC/DC converter 2 via a voltage current detection unit 51. AC voltage Vacin is converted to DC voltage VL1 by the AC/DC converter 2, and the DC voltage VL1 is stored in a capacitor 3. The DC voltage VL1 is converted to AC voltage Vtr1 by a first switching circuit 4. The first switching circuit 4 is formed as an inverter having four switching elements 4a to 4d connected in a bridge form, and controls the power reception amount of input power from the AC power supply 1.

A first end of a first step-up coil 5 is connected to a first AC end of the first switching circuit 4, and a first end of a first winding 6a on a primary side of a complex winding transformer (hereinafter, simply referred to as a transformer) 6 is connected to a second end of the first step-up coil 5. A second end of the first winding 6a is connected to a second AC end of the first switching circuit 4.

A first end of a second winding 6b on a secondary side of the transformer 6 is connected to a first end of a second step-up coil 7, and a second end of the second step-up coil 7 is connected to a first AC end of a second switching circuit 8 and a switch 9 including two switching elements 9a and 9b. A second end of the second winding 6b is connected to a second AC end of the second switching circuit 8. The second switching circuit 8 is composed of four switching elements 8a to 8d connected in a bridge form, and functions as a step-up chopper when the first DC voltage source 11 is to be charged.

Output of the switch 9 is connected to a connection point between two capacitors 10a and 10b connected in series. A DC plus terminal of the second switching circuit 8 is connected to another end of the capacitor 10a, and to a plus end of the first DC voltage source 11 via a voltage current detection unit 53. A DC minus terminal of the second switching circuit 8 is connected to another end of the capacitor 10b, and to a minus end of the first DC voltage source 11 via the voltage current detection unit 53. Here, the two capacitors 10a and 10b have the same capacitance.

A first end of a third winding 6c on a tertiary side of the transformer 6 is connected to a first end of a third step-up coil 12, and a second end of the third step-up coil 12 is connected to a first AC end of a third switching circuit 13. A second end of the third winding 6c is connected to a second AC end of the third switching circuit 13. The third switching circuit 13 is formed by parallel connection of two legs respectively composed of a rectification element 13a and a switching element 13b connected in series and a rectification element 13c and a switching element 13d connected in series. The third switching circuit 13 normally functions as a rectification circuit, and when DC voltage VL2 occurring on a smoothing capacitor 15 described later is lower than a predetermined value, functions as a step-up chopper.

AC voltage Vtr3 occurring on the third winding 6c of the transformer 6 is converted to DC by the third switching circuit 13 which has a rectification function, smoothed by a smoothing coil 14 and the smoothing capacitor 15, and then stored, as DC voltage VL2, in a capacitor 16 via a voltage current detection unit 54. The capacitor 16 is connected to a DC input end of the inverter 17 composed of four switching elements 17a to 17d. To an AC output end of the inverter 17, smoothing coils 18a and 18b, a smoothing capacitor 19, a common mode choke coil 20, a voltage current detection unit 55, and a load device connection end 21 are connected in this order. At the load device connection end 21, AC power supply Vacout is generated which is a power supply for supplying power to various load devices (hereinafter, referred to as an AC load).

Fourth windings 6d1 and 6d2 on a quaternary side of the transformer 6 are configured in a center-tap form, and first ends of two switching elements 30a and 30b composing a fourth switching circuit 30 are respectively connected to both ends of the fourth windings 6d1 and 6d2. To a connection point as the center tap between the fourth windings 6d1 and 6d2, a switching element 33 is connected and also a switch 35 composed of two switching elements 35a and 35b is connected.

An output side of the switching element 33 is connected to a connection point between a flyback diode 36 and a smoothing coil 31. Output of the smoothing coil 31, output of the switch 35, and a first end of a smoothing capacitor 32 are mutually connected, and then connected to a plus terminal of the second DC voltage source 34 via a voltage current detection unit 56. Second ends of the switching elements 30a and 30b are connected to each other, and are connected to an anode end of the flyback diode 36, a second end of the smoothing capacitor 32, and a minus terminal of the second DC voltage source 34. The fourth switching circuit 30 is composed of the two switching elements 30a and 30b, the switching element 33, the flyback diode 36, and the smoothing coil 31. A unit composed of the switching element 33, the flyback diode 36, and the smoothing coil 31 functions as a step-down chopper.

Each switching element composing the first to fourth switching circuits 4, 8, 13, and 30, and each switching element composing the inverter 17 may be IGBTs (Insulated Gate Bipolar Transistor), MOSFETs (Metal Oxide Semiconductor Field Effect Transistor), or the like.

A control unit 100 has a function of controlling operations of the first to fourth switching circuits 4, 8, 13, and 30 and the inverter 17.

Next, the summary of power distribution in the power conversion device of embodiment 1 will be described.

In the case where the AC power supply 1 is connected and the AC power supply 1 is used as a power supply source, the voltage Vacin of the AC power supply 1 is converted to the DC voltage VL1 by the AC/DC converter 2, and the DC voltage VL1 is converted to secondary-side DC voltage Vbat1 isolated by the transformer 6, to charge the first DC voltage source 11. In addition, the DC voltage VL1 is converted to tertiary-side DC voltage VL2 isolated by the transformer 6, and then, from the DC voltage VL2, AC power supply Vacout for the AC load connected to the load device connection end 21 is generated by the inverter 17. Further, the DC voltage VL1 is converted to quaternary-side DC voltage Vbat2 isolated by the transformer 6, to charge the second DC voltage source 34.

In the case where the AC power supply 1 is not connected and the first DC voltage source 11 is used as a power supply source, the voltage Vbat1 of the first DC voltage source 11 is converted to the tertiary-side DC voltage VL2 isolated by the transformer 6, and then, from the DC voltage VL2, the AC power supply Vacout for the AC load connected to the load device connection end 21 is generated by the inverter 17. In addition, the voltage Vbat1 of the first DC voltage source 11 is converted to the quaternary-side DC voltage Vbat2 isolated by the transformer 6, to charge the second DC voltage source 34.

In the case where the AC power supply 1 is not connected and the second DC voltage source 34 is used as a power supply source because the charge amount of the first DC voltage source 11 is insufficient, the voltage Vbat2 of the second DC voltage source 34 is converted to the tertiary-side DC voltage VL2 isolated by the transformer 6, and then, from the DC voltage VL2, the AC power supply Vacout for the AC load connected to the load device connection end 21 is generated by the inverter 17. In addition, the voltage Vbat2 of the second DC voltage source 34 is converted to the secondary-side DC voltage Vbat1 isolated by the transformer 6, to charge the first DC voltage source 11.

Next, the summary of a power flow in the power conversion device according to embodiment 1 of the present invention will be described with reference to FIG. 3 to FIG. 12.

Figure 3:
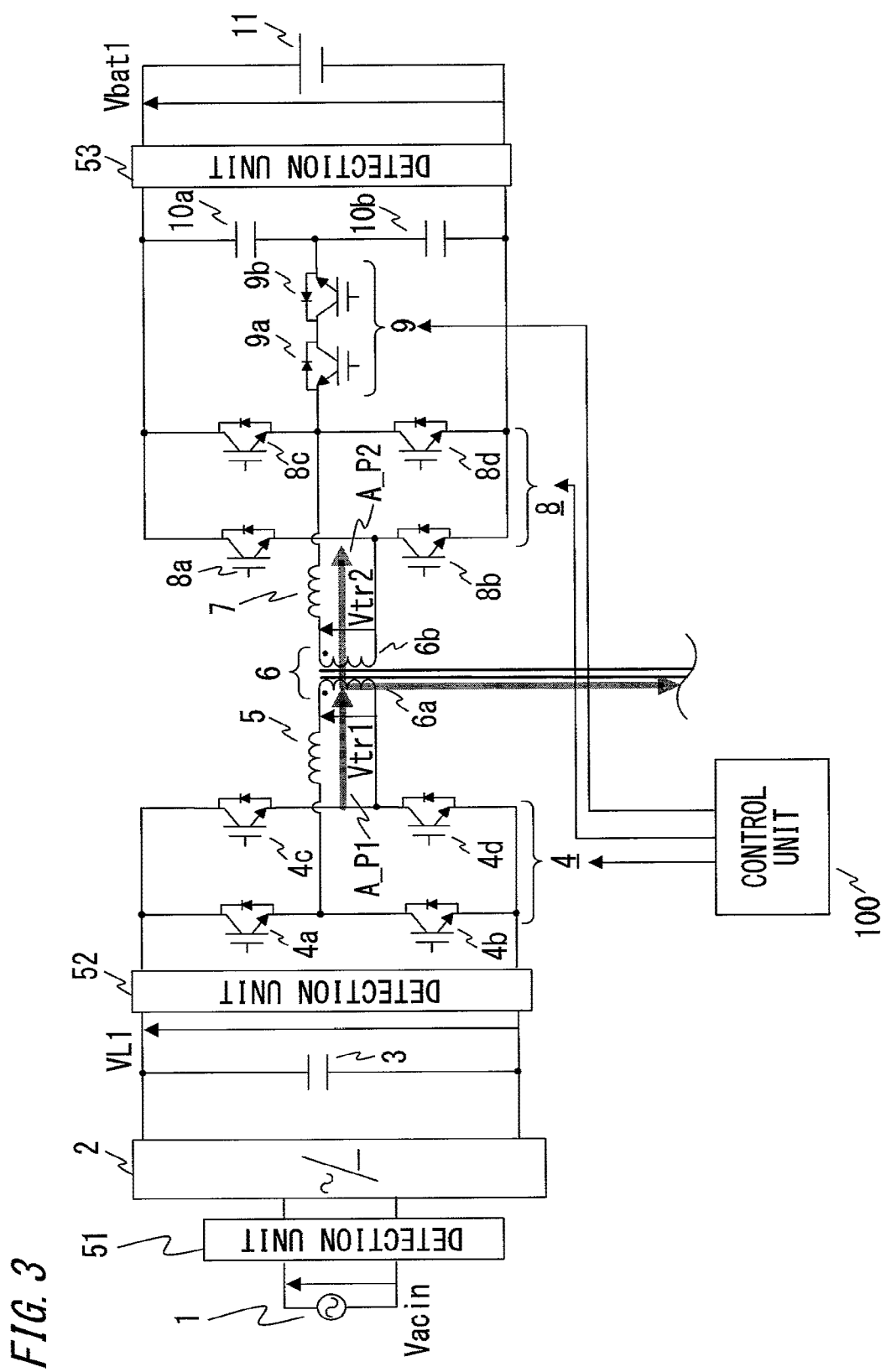
FIG. 3 is a diagram for explaining a power flow in the power conversion device according to embodiment 1 of the present invention.
Figure 4:
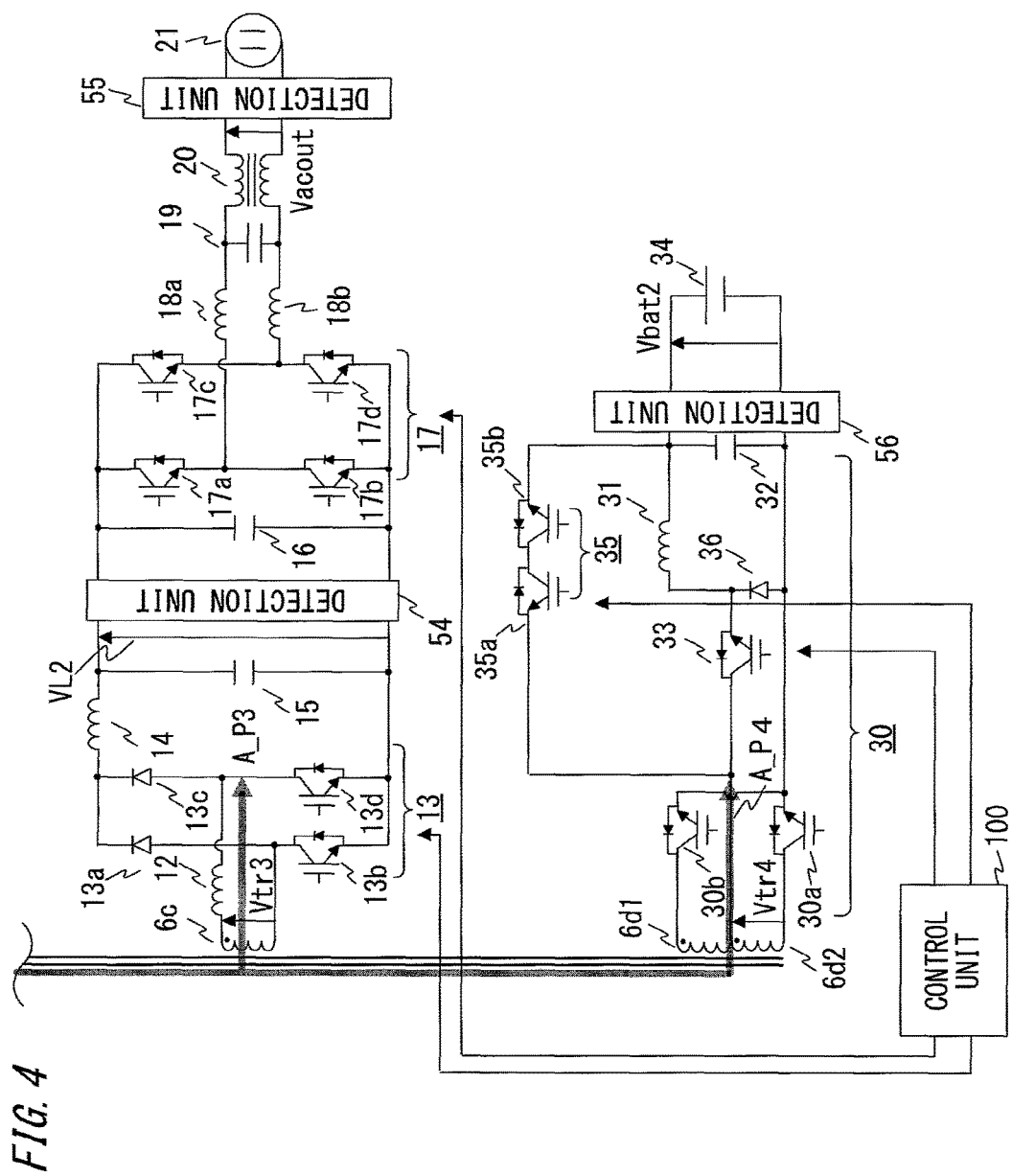
FIG. 4 is a diagram for explaining a power flow in the power conversion device according to embodiment 1 of the present invention.

As shown in FIG. 3 and FIG. 4, in the case where the AC power supply 1 is connected, input power A_P1 from the AC power supply 1 is distributed into charge power A_P2 for the first DC voltage source 11, supply power A_P3 for the AC load connected to the load device connection end 21, and charge power A_P4 for the second DC voltage source 34.

Figure 5:
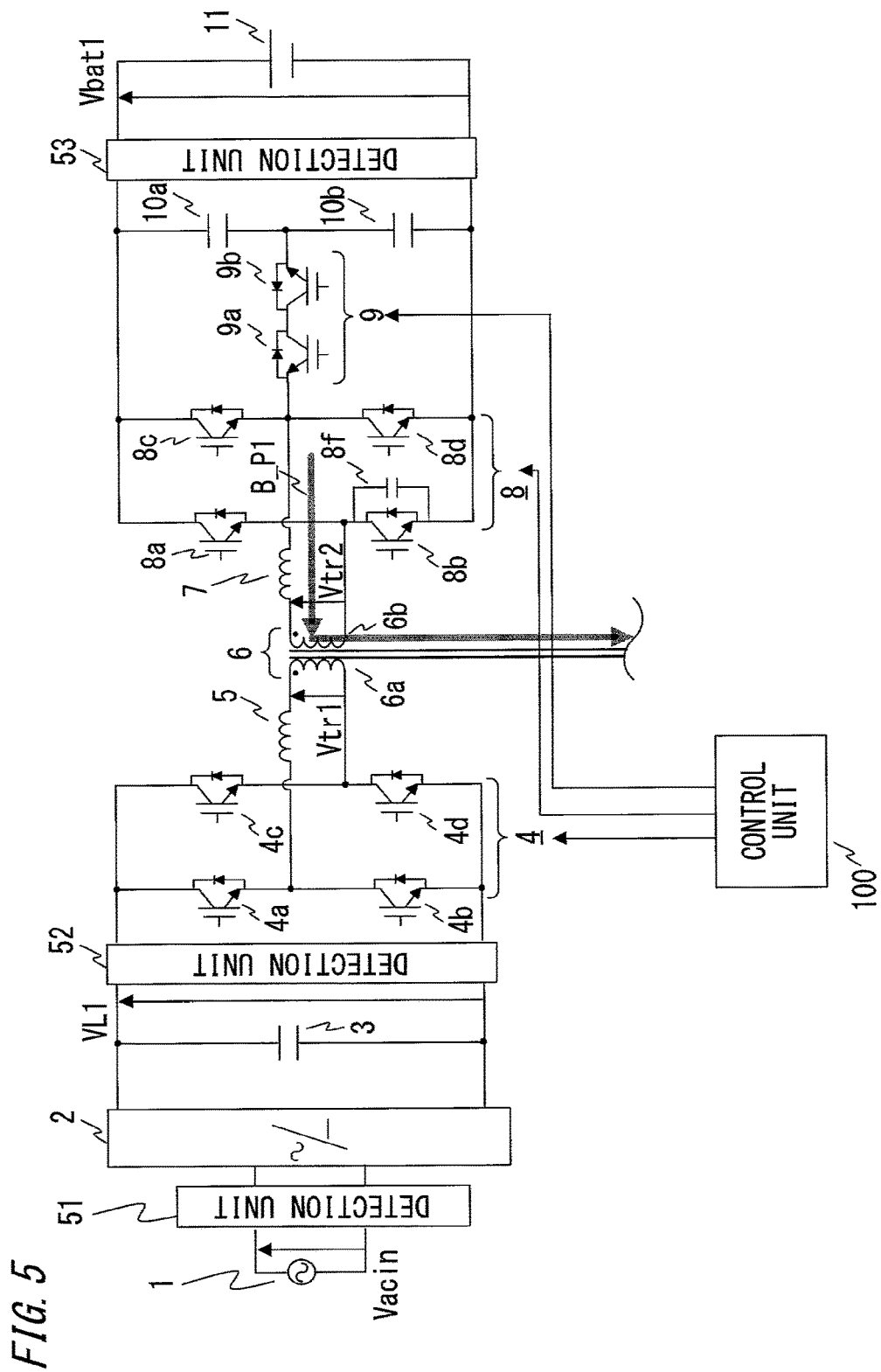
FIG. 5 is a diagram for explaining a power flow in the power conversion device according to embodiment 1 of the present invention.
Figure 6:
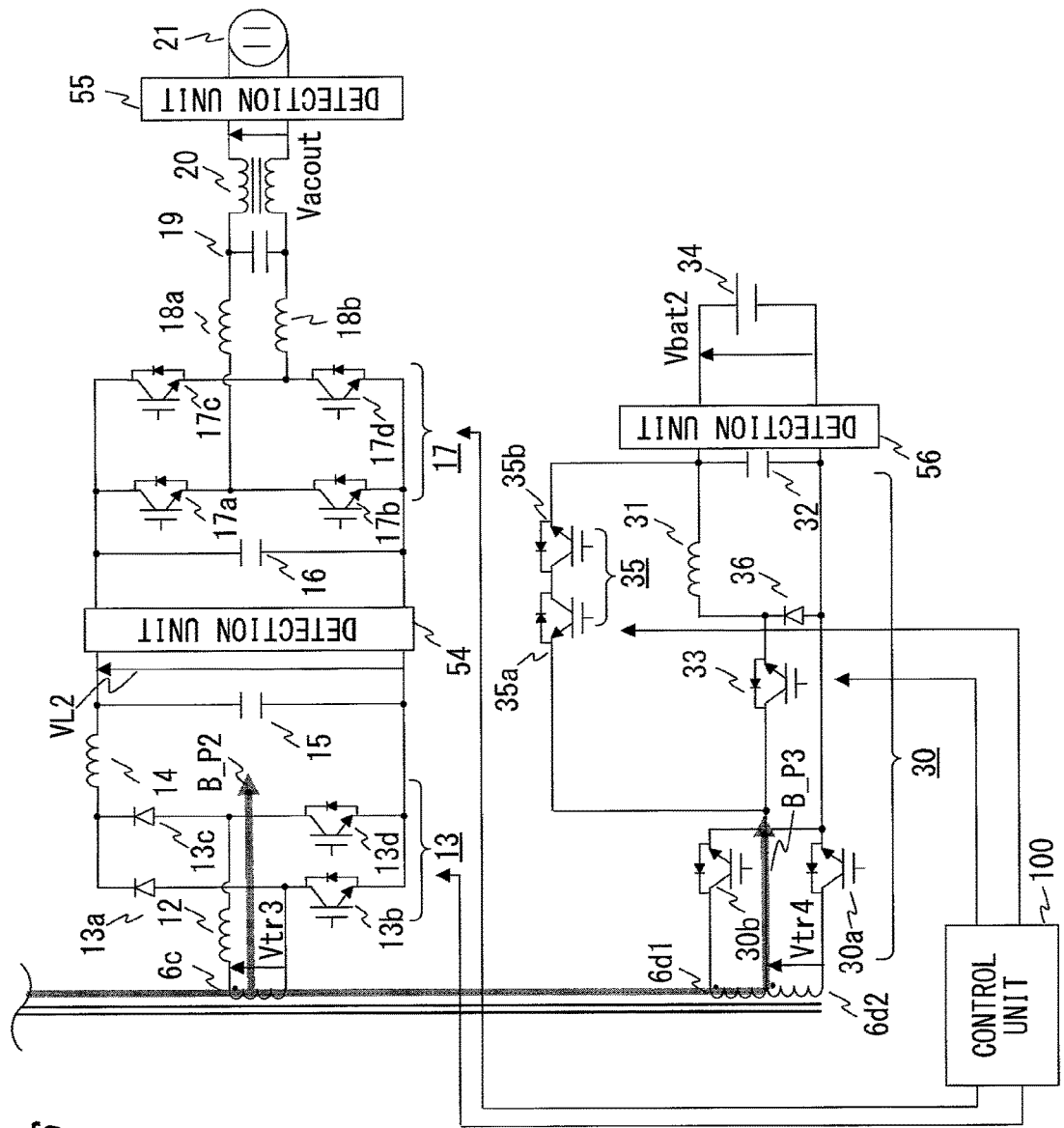
FIG. 6 is a diagram for explaining a power flow in the power conversion device according to embodiment 1 of the present invention.

As shown in FIG. 5 and FIG. 6, in the case where the AC power supply 1 is not connected and therefore the first DC voltage source 11 is used as a power supply source, supply power B_P1 from the first DC voltage source 11 is distributed into supply power B_P2 for the AC load connected to the load device connection end 21, and charge power B_P3 for the second DC voltage source 34.

Figure 7:
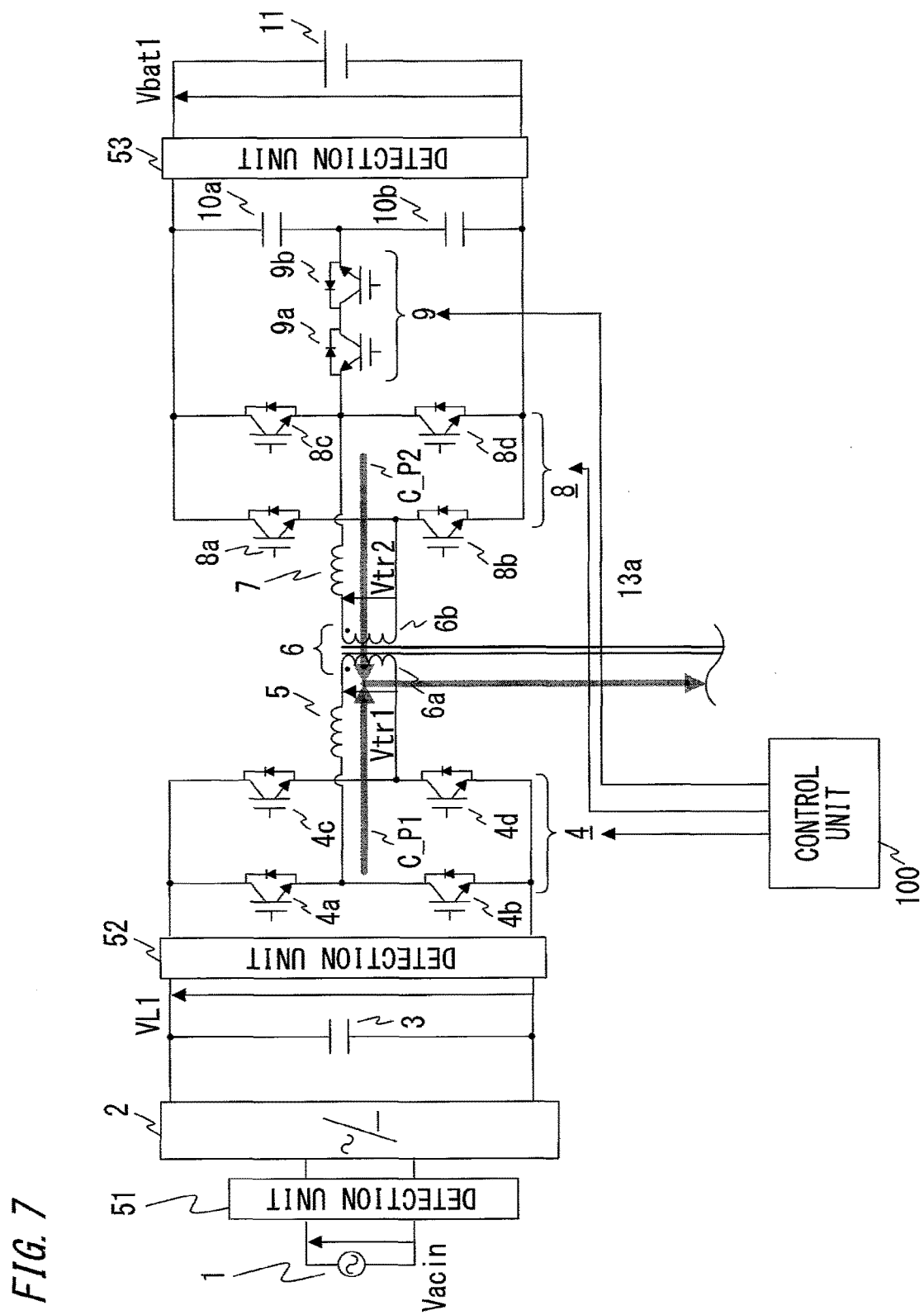
FIG. 7 is a diagram for explaining a power flow in the power conversion device according to embodiment 1 of the present invention.
Figure 8:
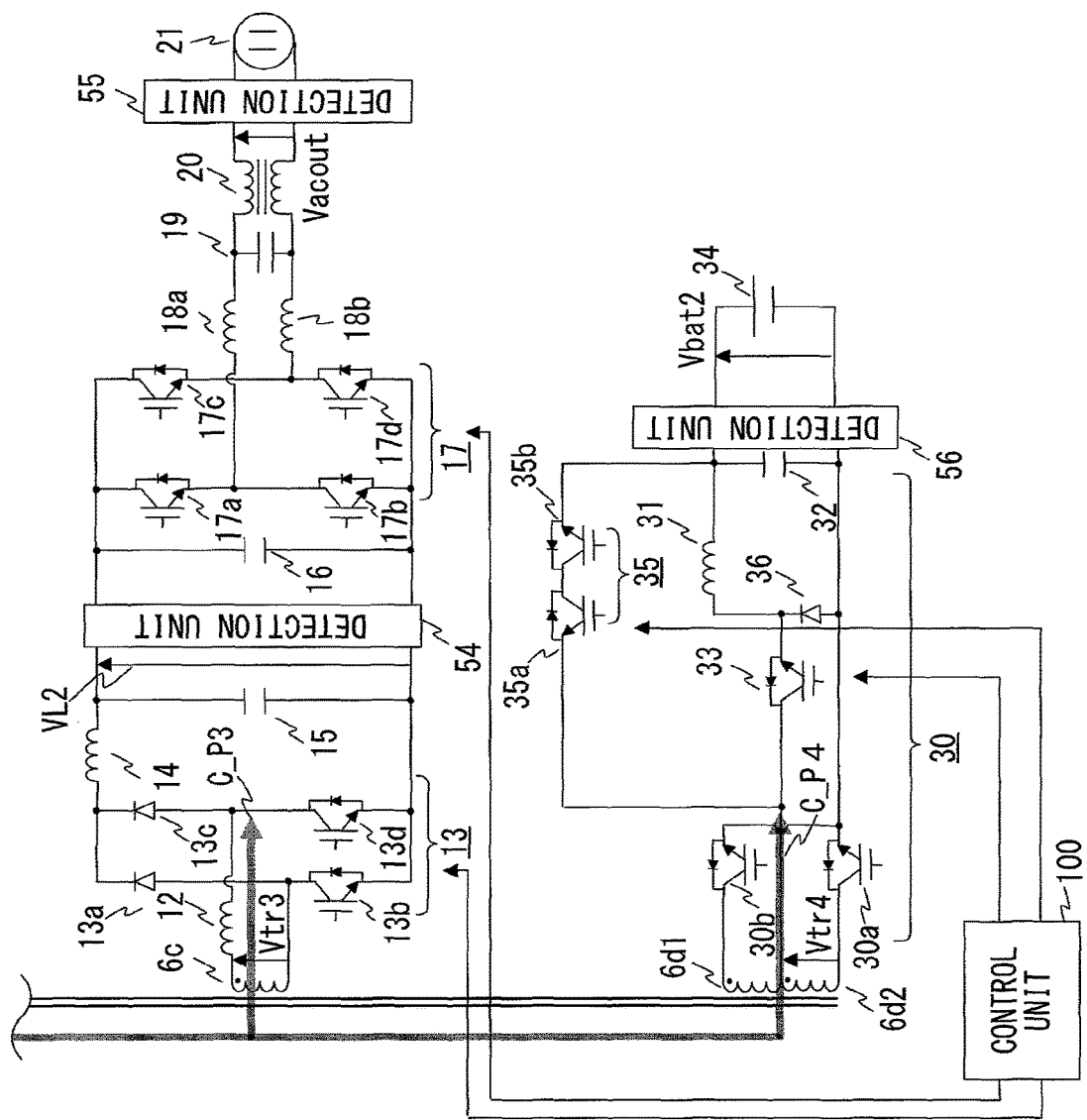
FIG. 8 is a diagram for explaining a power flow in the power conversion device according to embodiment 1 of the present invention.

As shown in FIG. 7 and FIG. 8, in the case where, since, for example, a private power generator is used as the AC power supply 1, power supplied from the AC power supply 1 is insufficient and therefore the AC power supply 1 and the first DC voltage source 11 are both used as a power supply source, power C_P1 from the AC power supply 1 and power C_P2 from the first DC voltage source 11 are distributed into supply power C_P3 for the AC load connected to the load device connection end 21, and charge power C_P4 for the second DC voltage source 34.

Figure 9:
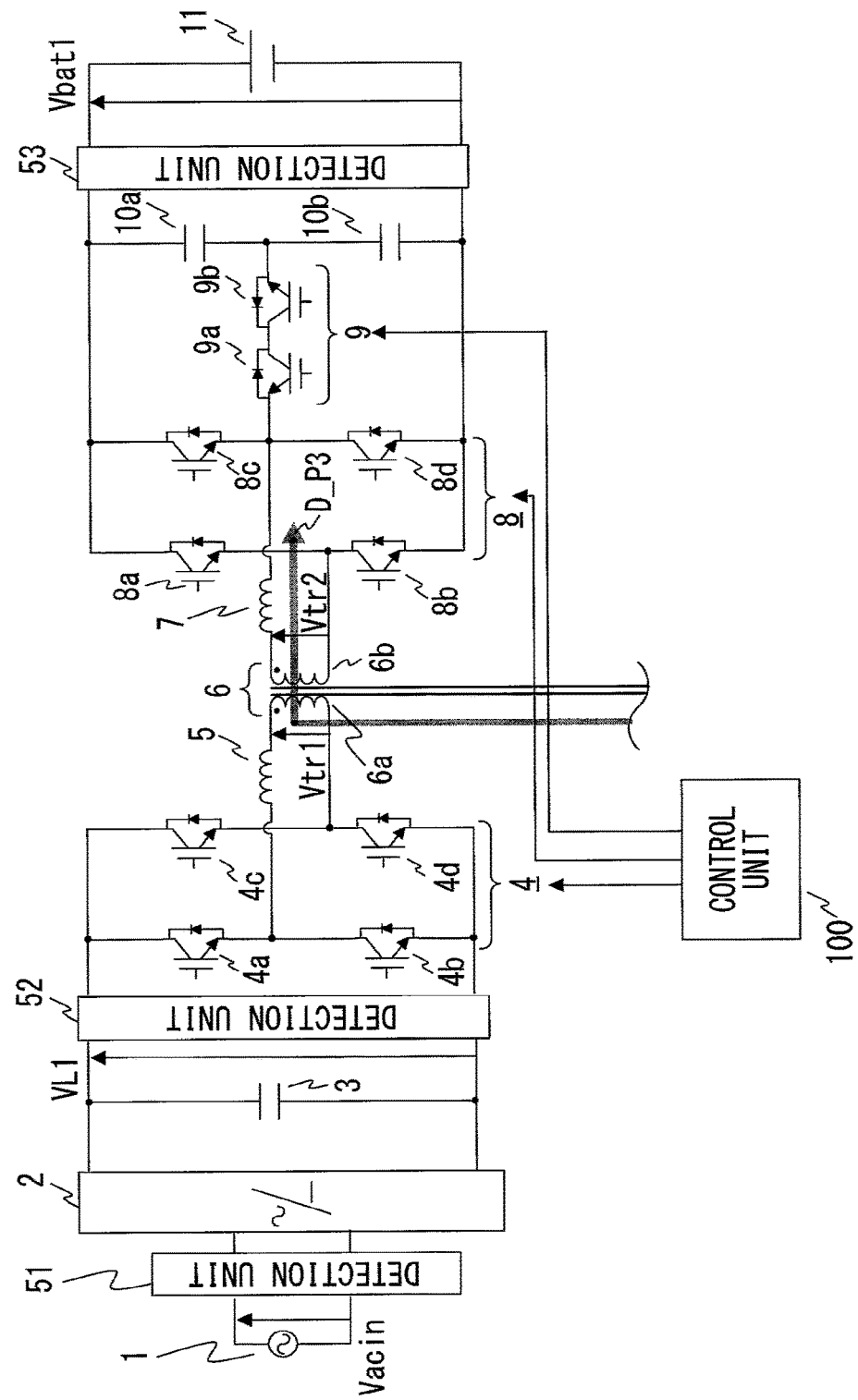
FIG. 9 is a diagram for explaining a power flow in the power conversion device according to embodiment 1 of the present invention.
Figure 10:
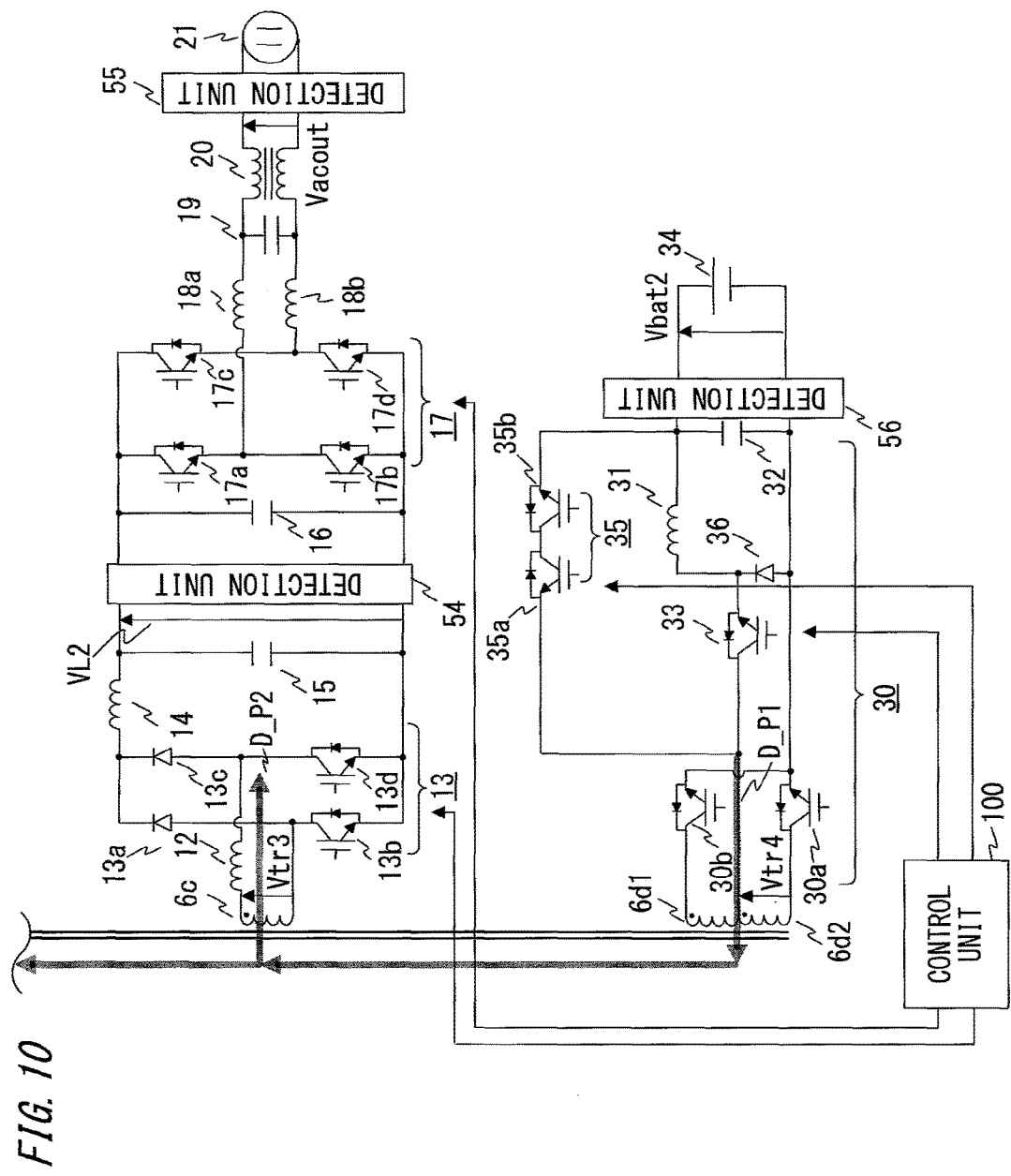
FIG. 10 is a diagram for explaining a power flow in the power conversion device according to embodiment 1 of the present invention.

As shown in FIG. 9 and FIG. 10, in the case where the AC power supply 1 is not connected and the charge amount of the first DC voltage source 11 is insufficient, the second DC voltage source 34 is used as a power supply source, and at this time, supply power D_P1 from the second DC voltage source 34 is distributed into supply power D_P3 for the first DC voltage source 11 and supply power D_P2 for the AC load connected to the load device connection end 21.

Figure 11:
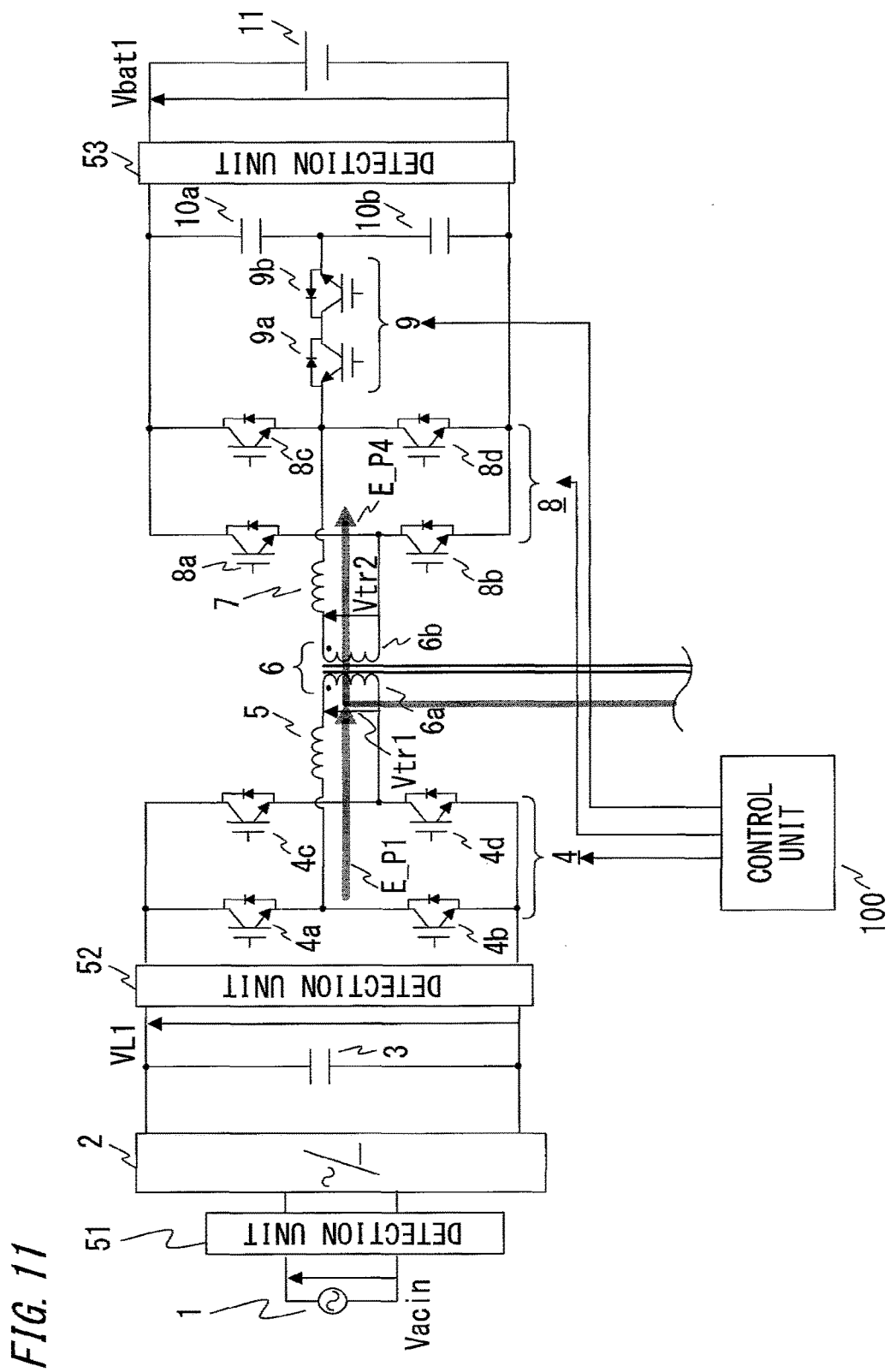
FIG. 11 is a diagram for explaining a power flow in the power conversion device according to embodiment 1 of the present invention.
Figure 12:
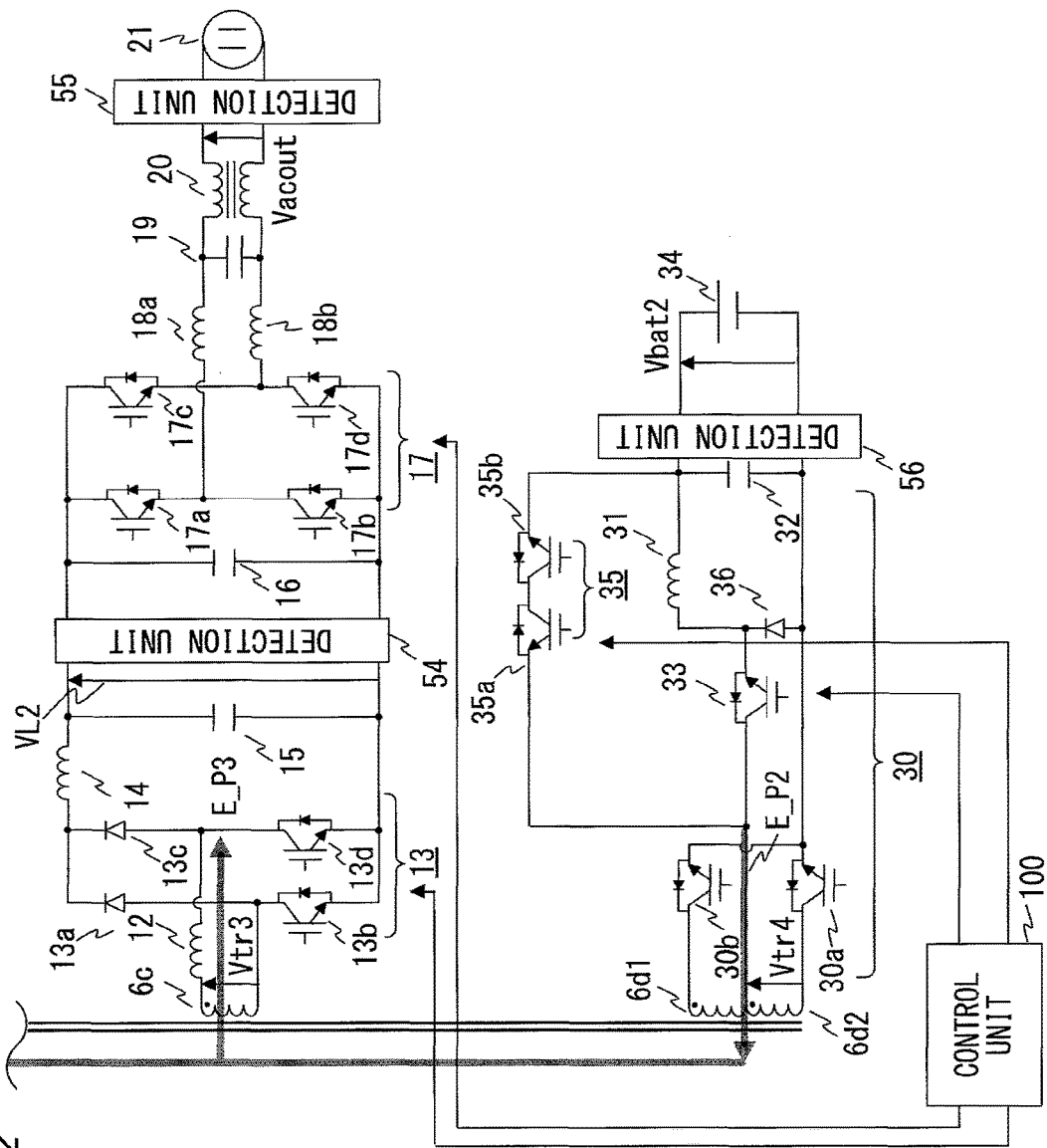
FIG. 12 is a diagram for explaining a power flow in the power conversion device according to embodiment 1 of the present invention.

As shown in FIG. 11 and FIG. 12, in the case where, since, for example, a private power generator is used as the AC power supply 1, power supplied from the AC power supply 1 is insufficient, and the charge amount of the first DC voltage source 11 is insufficient, and therefore the AC power supply 1 and the second DC voltage source 34 are both used as a power supply source, supply power E_P1 from the AC power supply 1 and supply power E_P2 from the second DC voltage source 34 are distributed into supply power E_P4 for the first DC voltage source 11 and supply power E_P3 for the AC load connected to the load device connection end 21.

Next, each process in the case of performing power distribution control in the power conversion device as described above will be described with reference to operation flowcharts in FIG. 13 to FIG. 17. In the following description, a character S denotes each processing step.

In order to perform power distribution control, it is necessary to supply power while dividing the process into the following modes 1 to 4. The mode 1 is a process in the case where supply of power to all the loads can be fully covered by only using the AC power supply 1 as a power supply source. The mode 2 is a process in the case of operating the first DC voltage source 11 as a power supply source because the AC power supply 1 is not connected and the first DC voltage source 11 keeps sufficient discharge voltage for supplying power. The mode 3 is a process in the case of operating the second DC voltage source 34 as a power supply source because the AC power supply 1 is not connected and the first DC voltage source 11 does not keep sufficient discharge voltage for supplying power. The mode 4 is a process in the case where the amount of power supplied from the AC power supply 1 is insufficient, and according to this, power from the first DC voltage source 11 or the second DC voltage source 34 is used as a power supply source.

Figure 13:
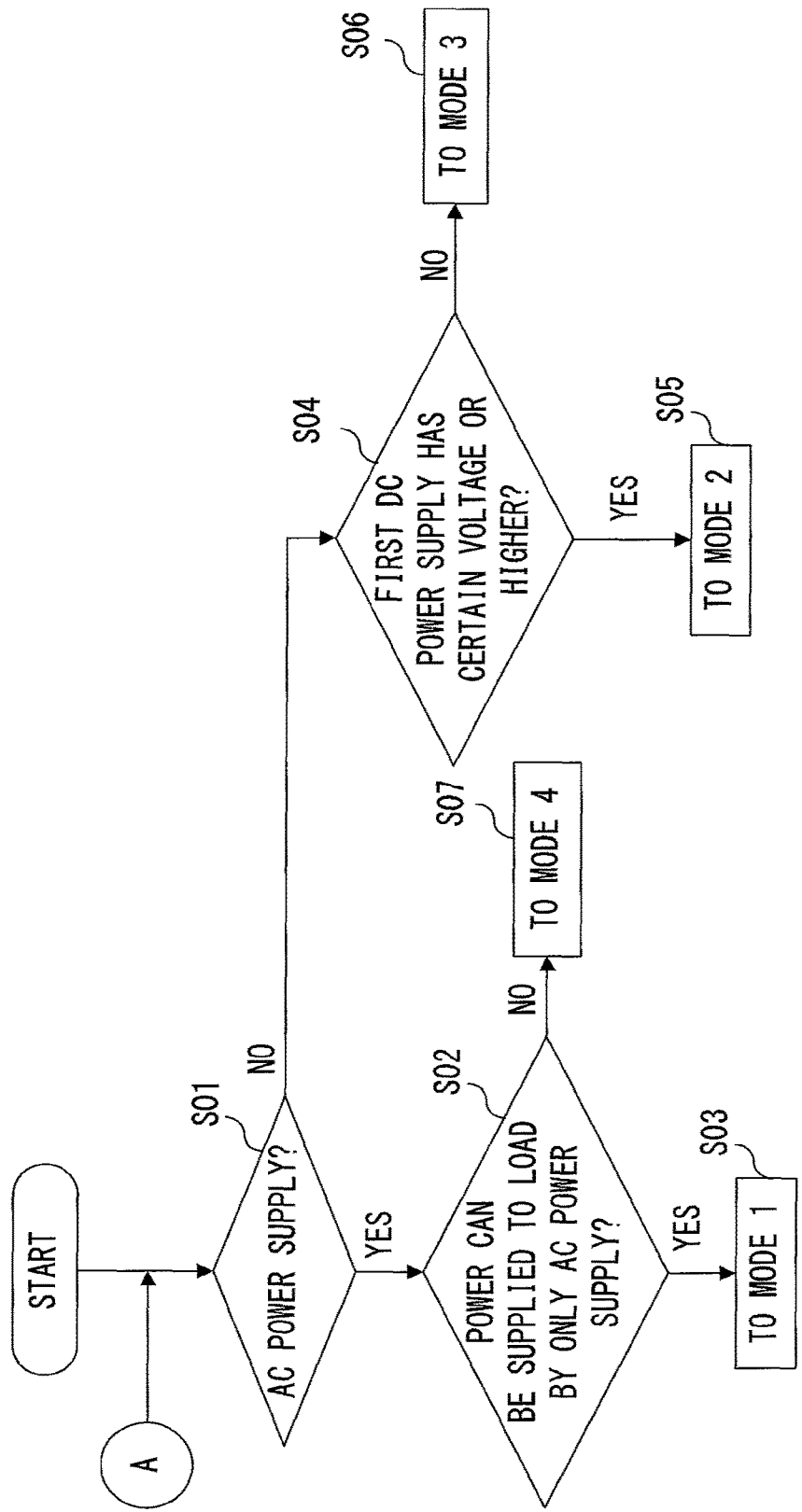
FIG. 13 is an operation flowchart showing a process for supplying power so as to be divided into modes 1 to 4, to perform power distribution control, in the power conversion device according to embodiment 1 of the present invention.

In FIG. 13, first, whether or not the AC power supply 1 is connected is determined (S01), and if the AC power supply 1 is connected, next, whether or not supply of power to all the loads can be fully covered by only the AC power supply 1 is determined (S02). If the load power can be fully covered by only the AC power supply 1, the process shifts to the mode 1 (FIG. 14) (S03). On the other hand, if the AC power supply 1 is not connected in S01, whether or not the first DC voltage source 11 keeps sufficient discharge voltage for supplying power is determined (S04), and if the first DC voltage source 11 is operated as a power supply source, the process shifts to the mode 2 (FIG. 15) (S05). If the first DC voltage source 11 does not keep sufficient discharge voltage for supplying power in S04, since the second DC voltage source 34 needs to be operated as a power supply source, the process shifts to the mode 3 (FIG. 16) (S06). If the AC power supply 1 is connected but the load power cannot be fully covered by only the AC power supply 1 in S02, the process shifts to the mode 4 (FIG. 17) (S07).

Figure 14:
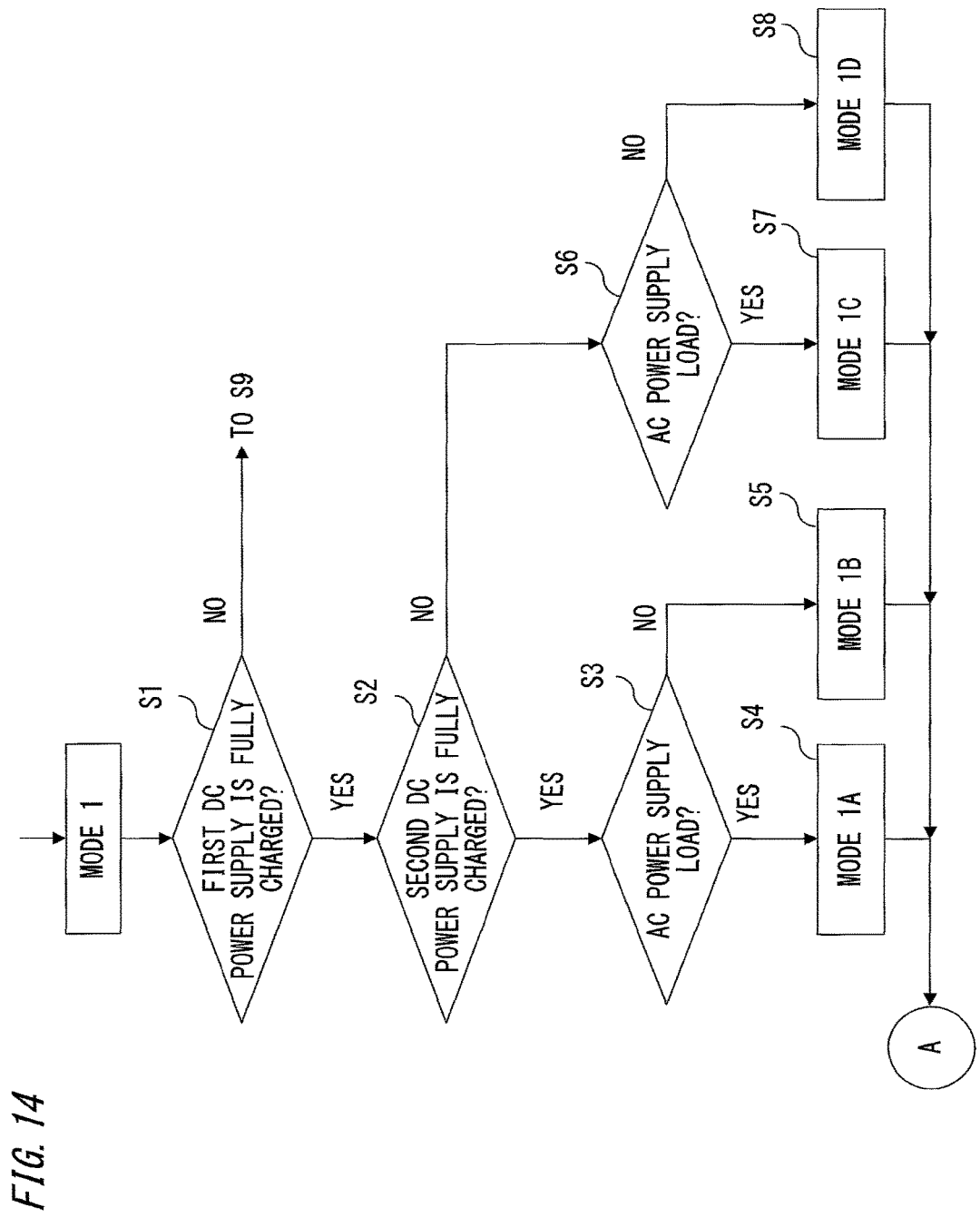
FIG. 14 is an operation flowchart showing the details of a process in the mode 1 shown in FIG. 13.

FIG. 14 is an operation flowchart in the mode 1. The mode 1 corresponds to the case where supply of power to all the loads can be fully covered by only the AC power supply 1. In this case, the AC power supply 1 is used as a power supply source, and power from the AC power supply 1 is distributed in accordance with: the states of charge of the first and second DC voltage sources 11 and 34; and presence/absence of the AC load (not shown) at the load device connection end 21.

That is, in the mode 1, based on, first, determination for the state of charge of the first DC voltage source 11 (S1), next, determination for the state of charge of the second DC voltage source 34 (S2, S9), and subsequently, determination for whether or not the AC load is connected to the load device connection end 21 (S3, S6, S10, S13), the process is divided into eight operation modes, i.e., modes 1A, 1B, 1C, 1D, 1E, 1F, 1G, 1H (S4, S5, S7, S8, S11, S12, S14, S15). Operation states in these operation modes are as follows.

Mode 1A: power from the AC power supply 1 is used only for the AC load.

Mode 1B: supply of power from the AC power supply 1 is stopped.

Mode 1C: power from the AC power supply 1 is used for the AC load and for charging the second DC voltage source 34.

Mode 1D: power from the AC power supply 1 is used only for charging the second DC voltage source 34.

Mode 1E: power from the AC power supply 1 is used for charging the first DC voltage source 11 and for the AC load.

Mode 1F: power from the AC power supply 1 is used only for charging the first DC voltage source 11.

Mode 1G: power from the AC power supply 1 is used for charging the first DC voltage source 11 and the second DC voltage source 34 and for the AC load.

Mode 1H: power from the AC power supply 1 is used for charging the first DC voltage source 11 and the second DC voltage source 34.

Figure 15:
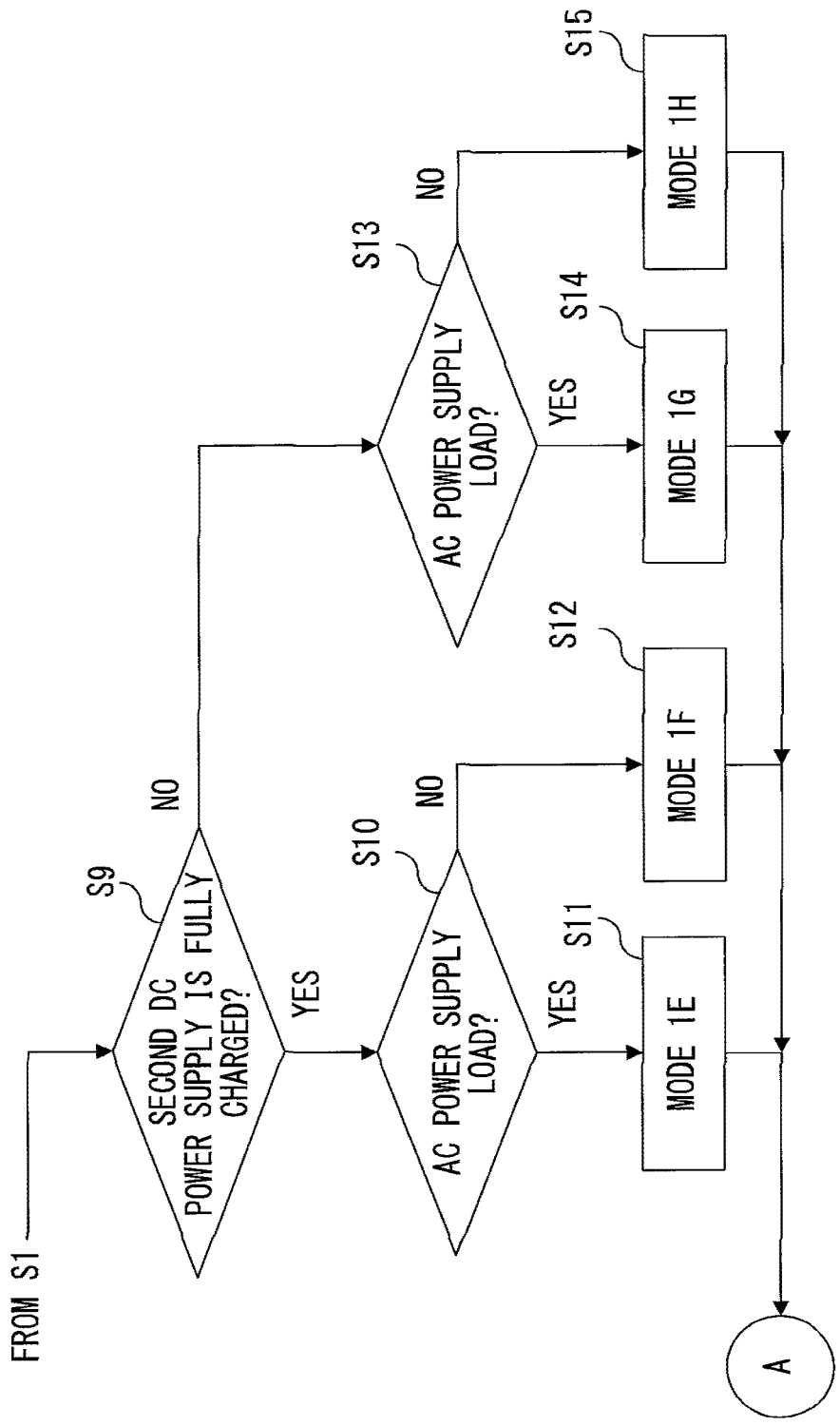
FIG. 15 is an operation flowchart showing the details of the process in the mode 1 shown in FIG. 13.

FIG. 15 is an operation flowchart in the mode 2. The mode 2 corresponds to the case where the AC power supply 1 is not connected and the first DC voltage source 11 keeps sufficient discharge voltage for supplying power, and therefore the first DC voltage source 11 is operated as a power supply source. In this case, first, based on determination for the state of charge of the second DC voltage source 34 (S21) and determination for whether or not the AC load (not shown) is connected to the load device connection end 21 (S22, S25), the process is divided into four operation modes, i.e., modes 2A, 2B, 2C, 2D (S23, S24, S26, S27). Operation states in these operation modes are as follows.

Mode 2A: power from the first DC voltage source 11 is supplied to the AC load.

Mode 2B: supply of power from the first DC voltage source 11 is stopped.

Mode 2C: power from the first DC voltage source 11 is used for charging the second DC voltage source 34 and for the AC load.

Mode 2D: power from the first DC voltage source 11 is used only for charging the second DC voltage source 34.

Figure 16:
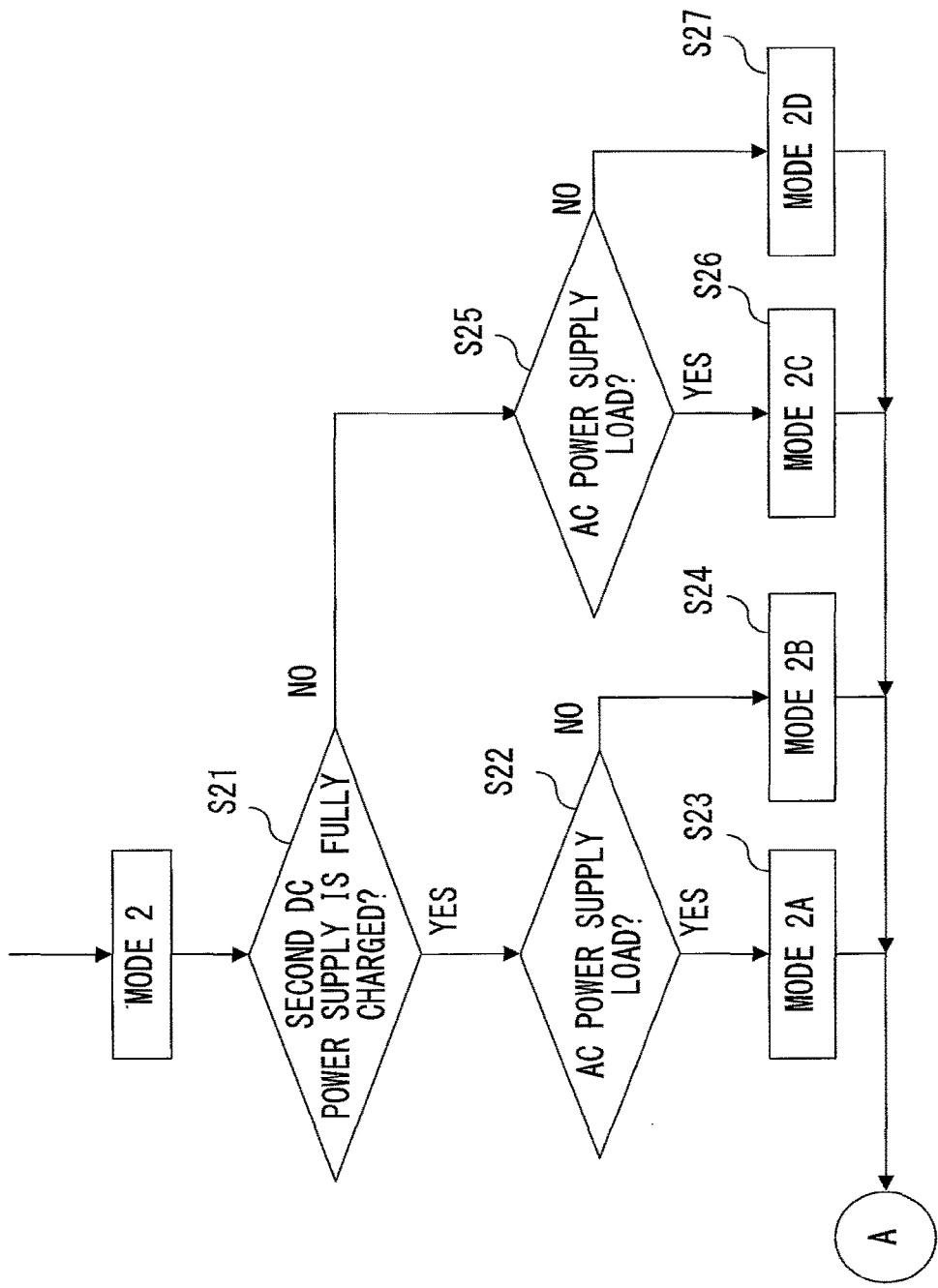
FIG. 16 is an operation flowchart showing the details of a process in the mode 2 shown in FIG. 13.

FIG. 16 is an operation flowchart in the mode 3. The mode 3 corresponds to the case where the AC power supply 1 is not connected and the first DC voltage source 11 does not keep sufficient discharge voltage for supplying power, and therefore the second DC voltage source 34 is operated as a power supply source. In this case, based on, first, determination for whether or not the second DC voltage source 34 keeps sufficient discharge voltage for supplying power (S31), subsequently, determination for the state of charge of the first DC voltage source 11 (S32), and further, determination for whether or not the AC load (not shown) is connected to the load device connection end 21 (S33, S36), the process is divided into four operation modes, i.e., modes 3A, 3B, 3C, 3D (S34, S35, S37, S38). Operation states in these operation modes are as follows.

Mode 3A: power from the second DC voltage source 34 is charged into the first DC voltage source 11 and supplied to the AC load.

Mode 3B: power from the second DC voltage source 34 only charges the first DC voltage source 11.

Mode 3C: power from the second DC voltage source 34 is supplied only to the AC load.

Mode 3D: end.

Figure 17:
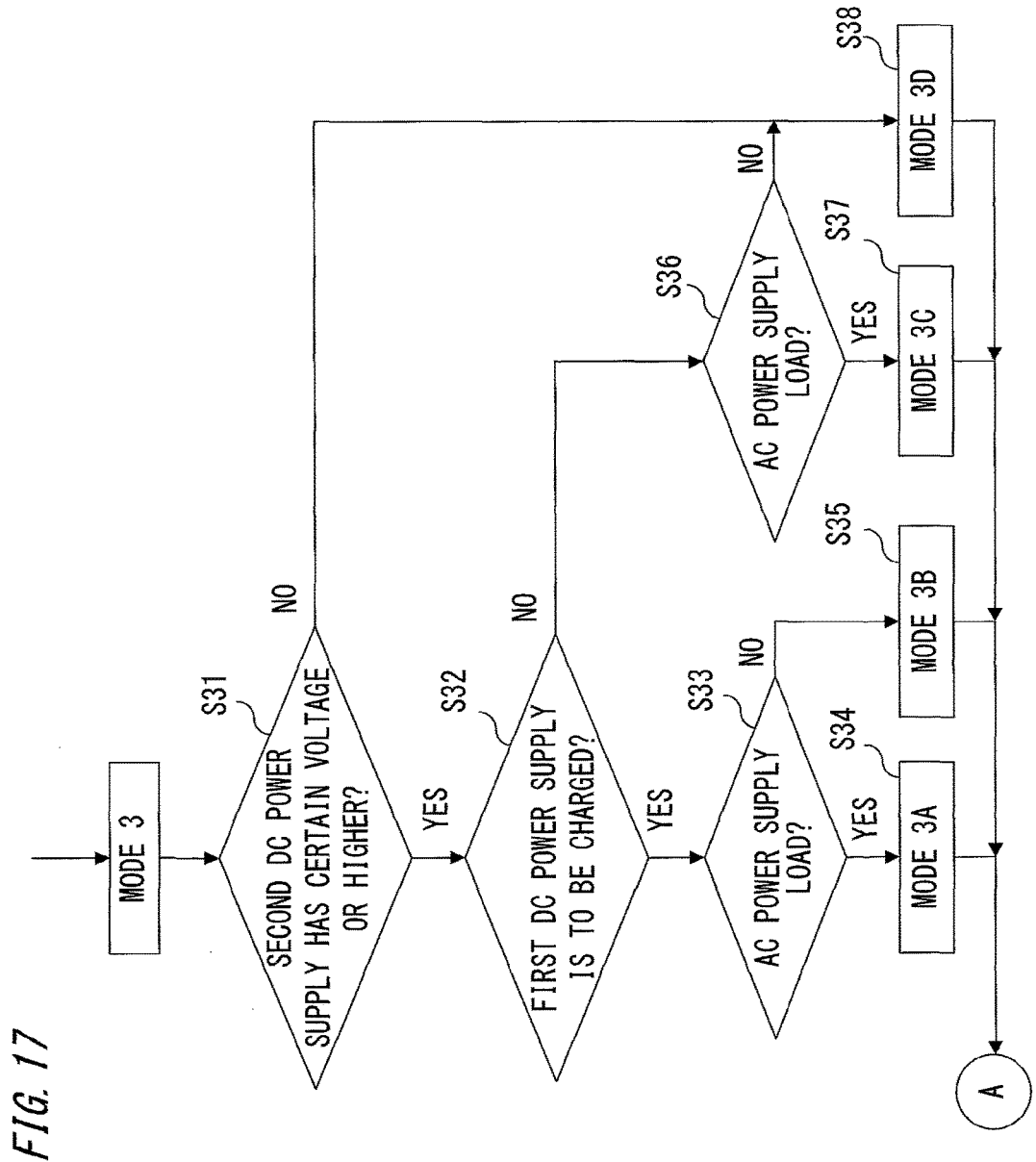
FIG. 17 is an operation flowchart showing the details of a process in the mode 3 shown in FIG. 13.
Figure 18:
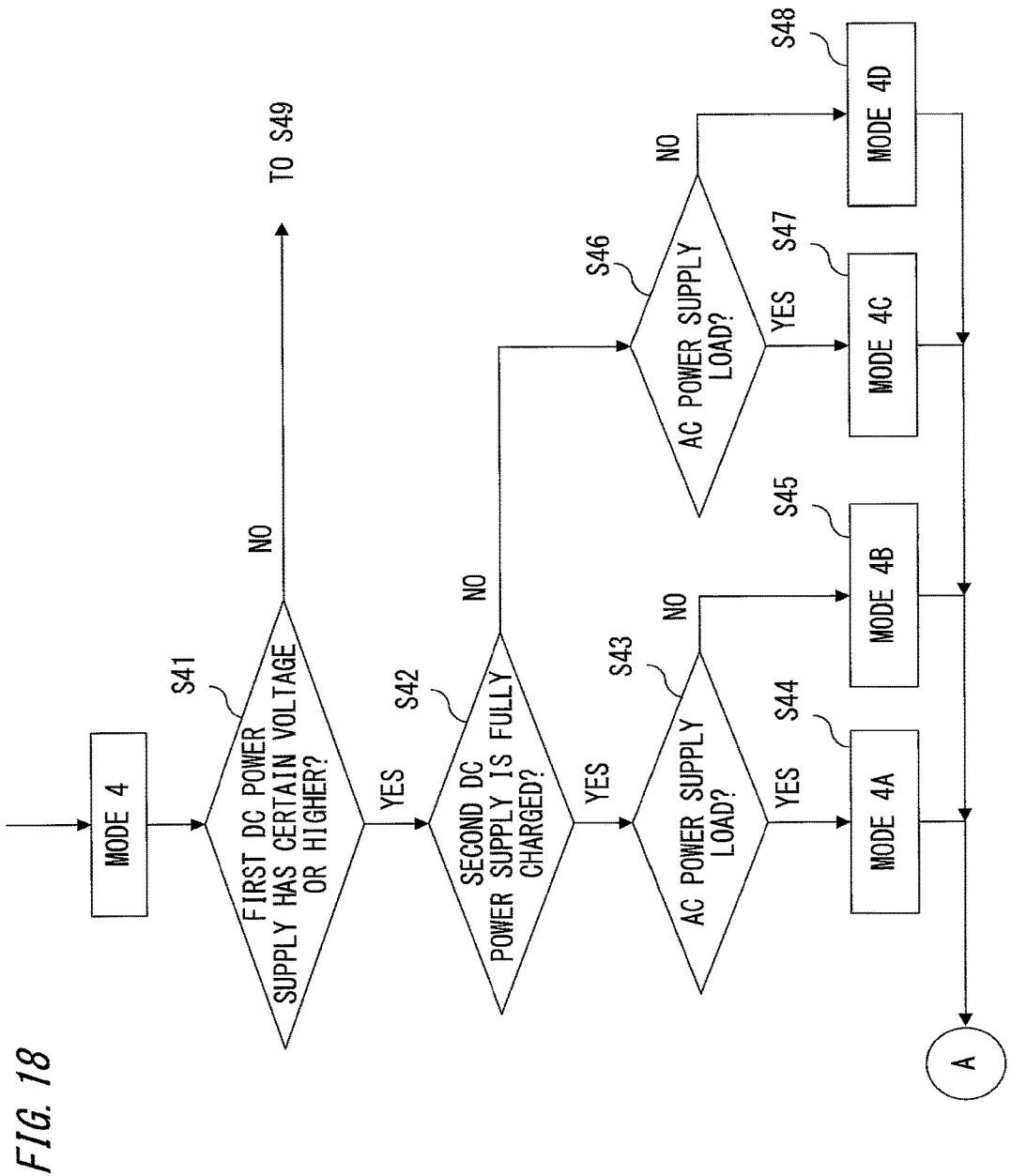
FIG. 18 is an operation flowchart showing the details of a process in the mode 4 shown in FIG. 13.
Figure 19:
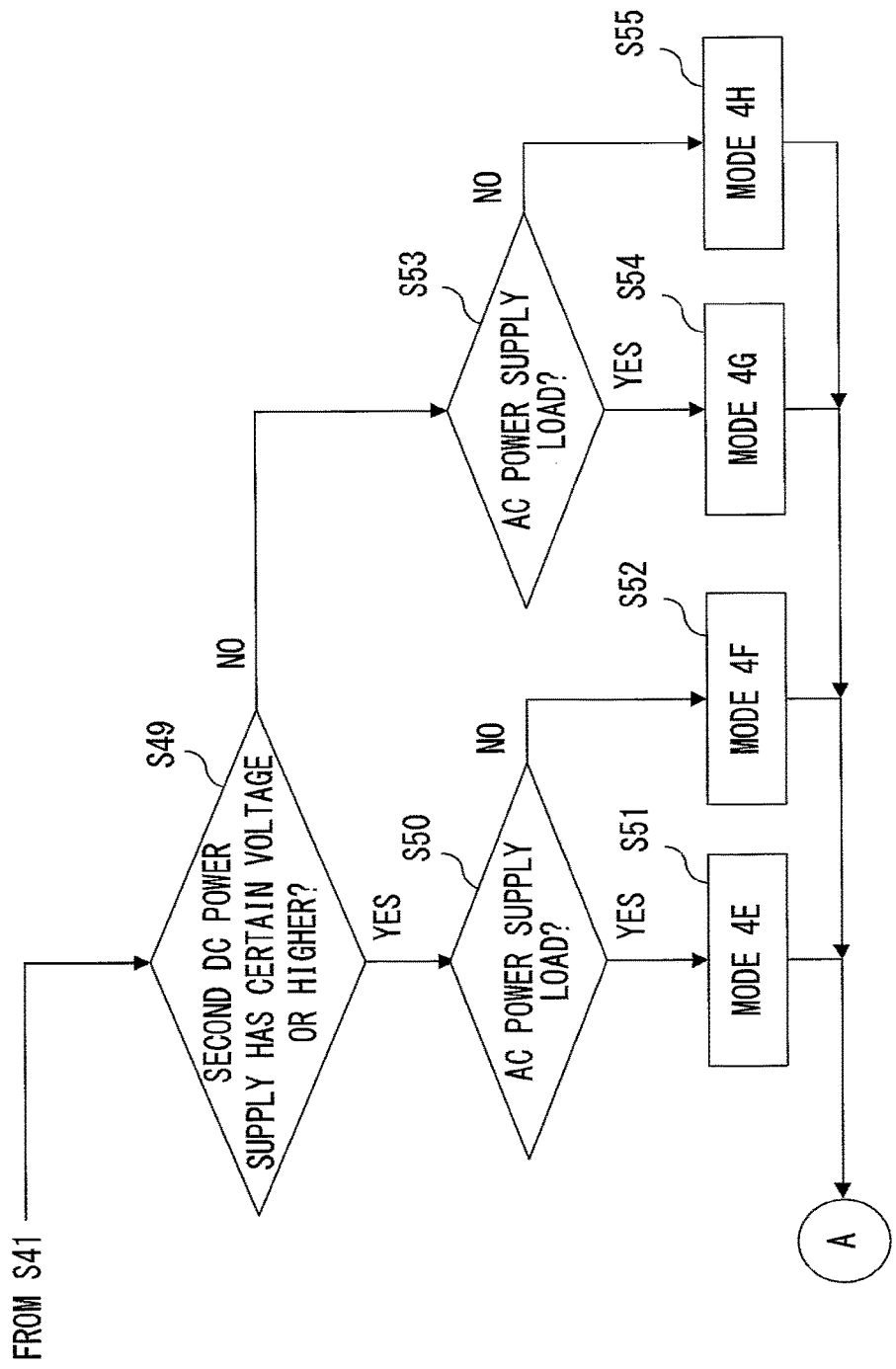
FIG. 19 is an operation flowchart showing the details of the process in the mode 4 shown in FIG. 13.

FIG. 17 is an operation flowchart in the mode 4. The mode 4 corresponds to the case where the amount of power supplied from the AC power supply 1 is insufficient, and according to this, power from the first DC voltage source 11 or the second DC voltage source 34 is supplied to the load. In this case, based on, first, determination for whether or not the first DC voltage source 11 keeps sufficient discharge voltage for supplying power (S41), subsequently, determination for the state of charge of the second DC voltage source 34, i.e., whether or not the second DC voltage source 34 is fully charged (S42) or determination for whether or not the second DC voltage source 34 keeps sufficient discharge voltage for supplying power (S49), and further, determination for whether or not the AC load (not shown) is connected to the load device connection end 21 (S43, S46, S50, S53), the process is divided into eight operation modes, i.e., modes 4A, 4B, 4C, 4D, 4E, 4F, 4G, 4H (S44, S45, S47, S48, S51, S52, S54, S55). Operation states in these operation modes are as follows.

Mode 4A: only the AC load is operated with power from the AC power supply 1 and the first DC voltage source 11.

Mode 4B: the first DC voltage source 11 is charged with power that can be supplied by the AC power supply 1, until the first DC voltage source 11 is fully charged.

Mode 4C: power from the AC power supply 1 and the first DC voltage source 11 is used for the AC load and for charging the second DC voltage source 34.

Mode 4D: power from the AC power supply 1 and the first DC voltage source 11 is used only for charging the second DC voltage source 34.

Mode 4E: power from the AC power supply 1 and the second DC voltage source 34 is used for charging the first DC voltage source 11 and for the AC load.

Mode 4F: power from the AC power supply 1 and the second DC voltage source 34 is used for charging the first DC voltage source 11.

Mode 4G: the AC load is supplied with power that can be supplied by the AC power supply 1.

Mode 4H: the first DC voltage source 11 and the second DC voltage source 34 are charged with power that can be supplied by the AC power supply 1.

Figure 20:
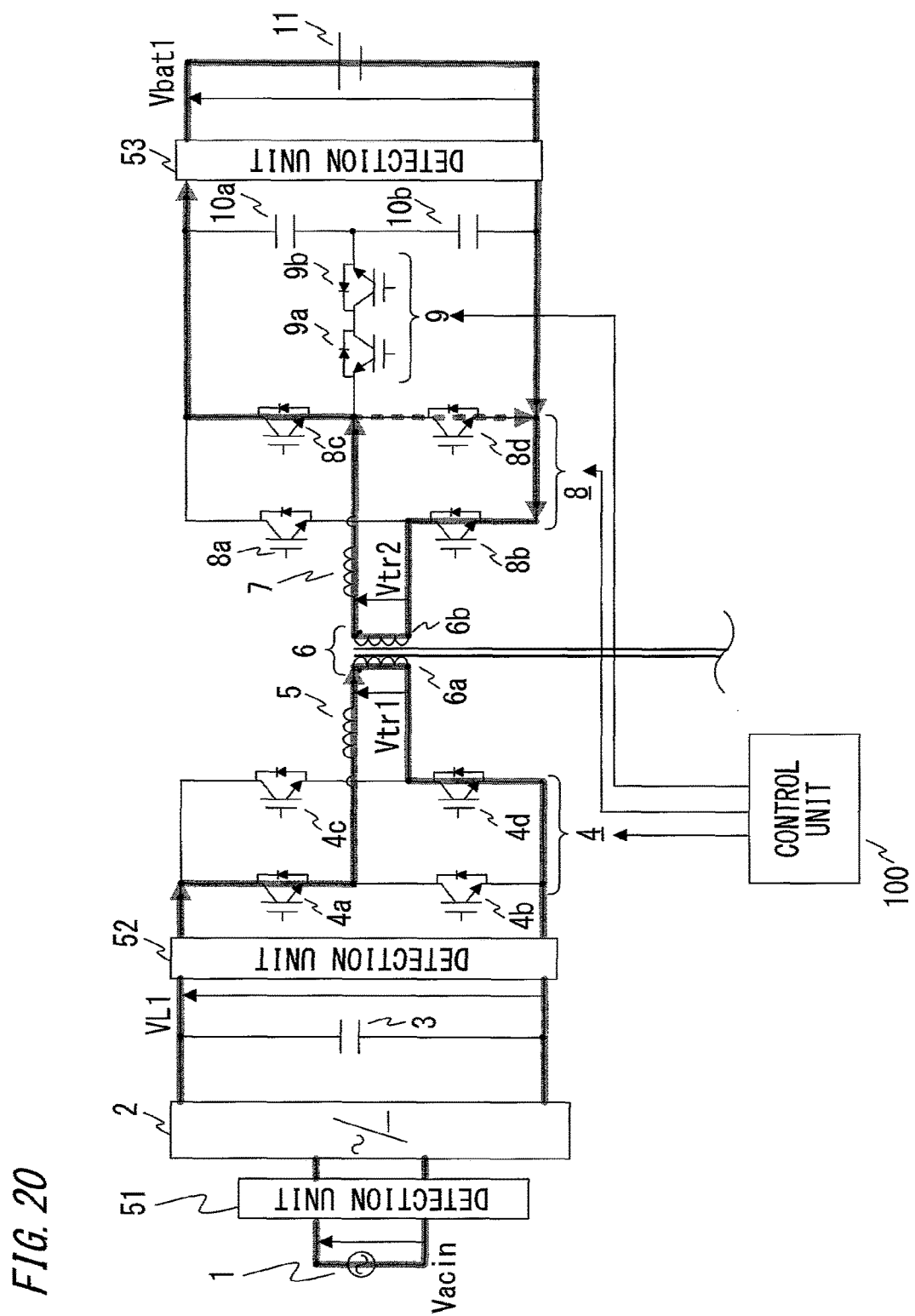
FIG. 20 is a current route diagram for explaining operation of the power conversion device according to embodiment 1 of the present invention.
Figure 21:
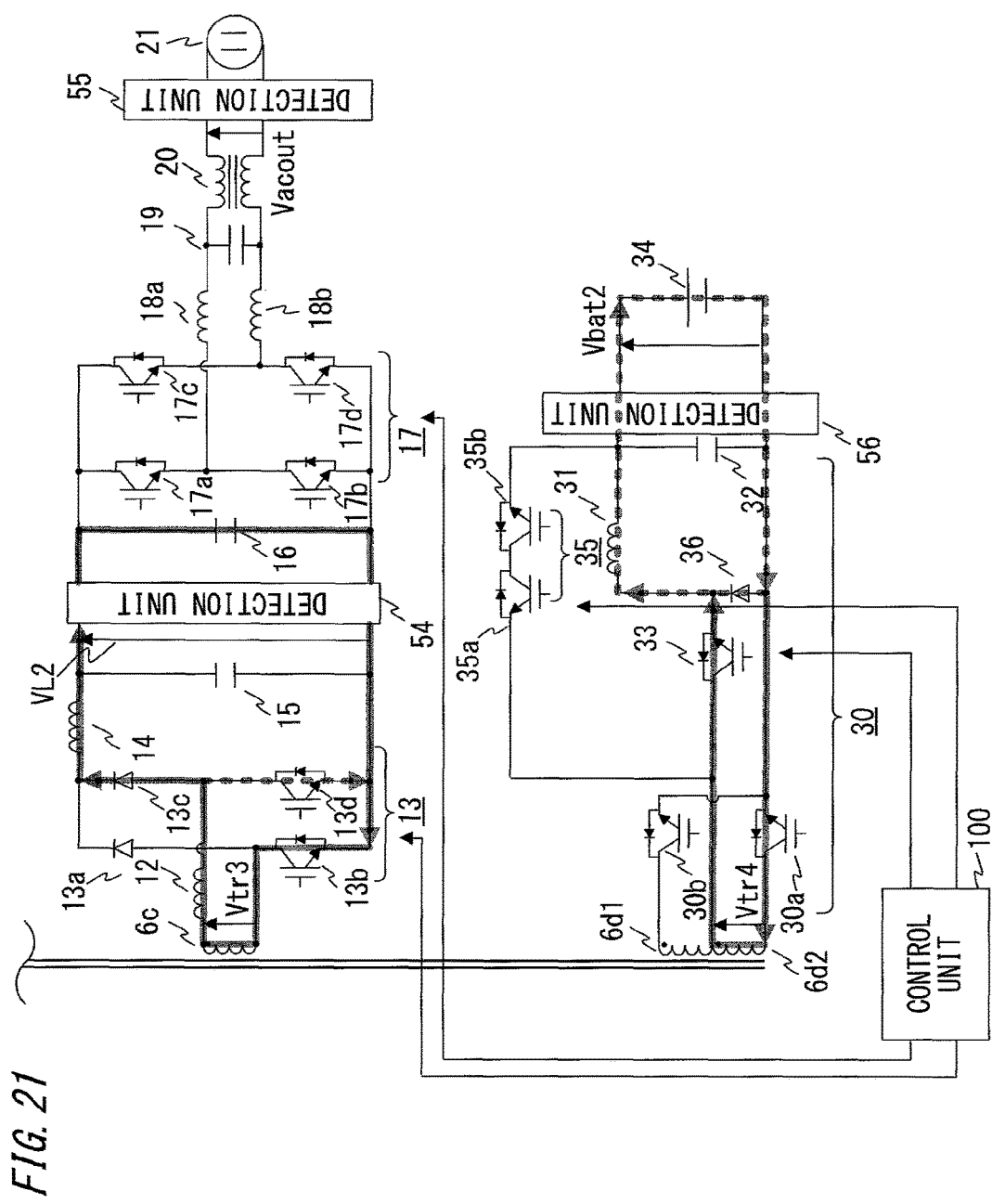
FIG. 21 is a current route diagram for explaining operation of the power conversion device according to embodiment 1 of the present invention.

FIG. 20 and FIG. 21 are current route diagrams showing routes of operation currents when power from the AC power supply 1 is distributed to the first DC voltage source 11, the AC load connected to the load device connection end 21, and the second DC voltage source 34.

First, operation for charging the first DC voltage source 11 and stopping the charging will be described.

The voltage Vacin of the AC power supply 1 is converted to the DC voltage VL1 by the AC/DC converter 2, the DC voltage VL1 is converted to the AC voltage Vtr1 by the first switching circuit 4, and the AC voltage Vtr1 is applied to the first winding 6a of the transformer 6. The turns ratio of the transformer 6 in this case is assumed as first winding 6a:second winding 6b=n1:n2.

FIG. 20 and FIG. 21 show the state in which the switching elements 4a and 4d of the first switching circuit 4 are turned on, and the voltage Vtr1 occurs on the first winding 6a of the transformer 6 and the voltage Vtr2 represented by the following expression occurs on the second winding 6b. In this case, the turns ratio between the first winding 6a and the second winding 6b is set so that the voltage Vtr2 occurring on the second winding 6b of the transformer 6 is lower than the voltage Vbat1 of the first DC voltage source 11. That is, the following expression is satisfied.

$$Vtr2=(n2/n1)Vtr1<Vbat1 \tag{1}$$

In this state, since the voltage Vtr2 of the second winding 6b of the transformer 6 is lower than the voltage Vbat1 of the first DC voltage source 11, the first DC voltage source 11 is not charged. Therefore, in order to charge the first DC voltage source 11, the second switching circuit 8 is operated as a step-up chopper.

That is, first, the switch 9 is turned off, and then the switching element 8d of the second switching circuit 8 is turned on, thereby flowing current through the second step-up coil 7 to store energy. Next, the switching element 8d is turned off and the switching element 8c is turned on, whereby the energy stored in the second step-up coil 7 is charged into the first DC voltage source 11 via the switching element 8c. The charge amount for the first DC voltage source 11 in this case can be controlled using the ON/OFF ratio of the switching element 8d.

As described above, using the turns ratio (=n2/n1) between the first winding 6a and the second winding 6b of the transformer 6, the voltage Vtr2 of the second winding 6b is set to be lower than the voltage Vbat1 of the first DC voltage source 11, while the second switching circuit 8 is caused to perform step-up operation and the step-up ratio is controlled, whereby the charge amount for the first DC voltage source 11 can be controlled. In addition, by stopping operation of the second switching circuit 8, the charging can be stopped.

Next, operation in the case of generating the AC power supply Vacout for the AC load connected to the load device connection end 21 based on power from the AC power supply 1 will be described.

The voltage Vtr3 occurring on the third winding 6c of the transformer 6 is converted to DC by the third switching circuit 13 which has a rectification function, and then converted to the DC voltage VL2 through the smoothing coil 14 and the smoothing capacitor 15. The DC voltage VL2 is converted to AC by the inverter 17, to generate the AC power supply Vacout. In addition, by stopping operation of the inverter 17, supply of power to the AC load connected to the load device connection end 21 can be stopped.

When the DC voltage VL2 on the input side of the inverter 17 is so low that the predetermined AC power supply Vacout cannot be generated, the third switching circuit 13 is operated as a step-up chopper, and when the DC voltage VL2 is high, the third switching circuit 13 is operated as a rectification circuit without performing switching operation, thus reducing switching loss. In the case of operating the third switching circuit 13 as a step-up chopper, the switching element 13d of the third switching circuit 13 is turned on, thereby flowing current through the third step-up coil 12 to store energy. Next, the switching element 13d is turned off, thereby storing the energy stored in the third step-up coil 12 into the smoothing capacitor 15 via the rectification element 13c. Thus, the voltage VL2 of the smoothing capacitor 15 can be made higher than the voltage Vtr3 occurring on the third winding 6c of the transformer 6.

Thus, by operating the third switching circuit 13 as a step-up chopper, the input voltage VL2 of the inverter 17 can be always kept constant even if the voltage Vtr3 occurring on the third winding 6c of the transformer 6 reduces.

Next, operation in the case of charging the second DC voltage source 34 with power from the AC power supply 1 will be described.

In order to charge the second DC voltage source 34, the fourth switching circuit 30 is operated as a step-down chopper. That is, first, the switch 35 is turned off, and then, for example, if the switching element 30a is turned on, the voltage Vtr4 occurring on the fourth windings 6d1 and 6d2 of the center-tap-type transformer 6 is rectified by the switching element 30a, and then stepped down through the switching element 33, the flyback diode 36, the smoothing coil 31, and the smoothing capacitor 32, to be the DC voltage Vbat2, which charges the second DC voltage source 34 via the voltage current detection unit 56. The charge amount for the second DC voltage source 34 in this case can be controlled using the ON/OFF ratio of the switching element 33. When the charging of the second DC voltage source 34 is completed, operation of the switching element 33 is stopped, whereby the charging can be stopped.

Figure 22:
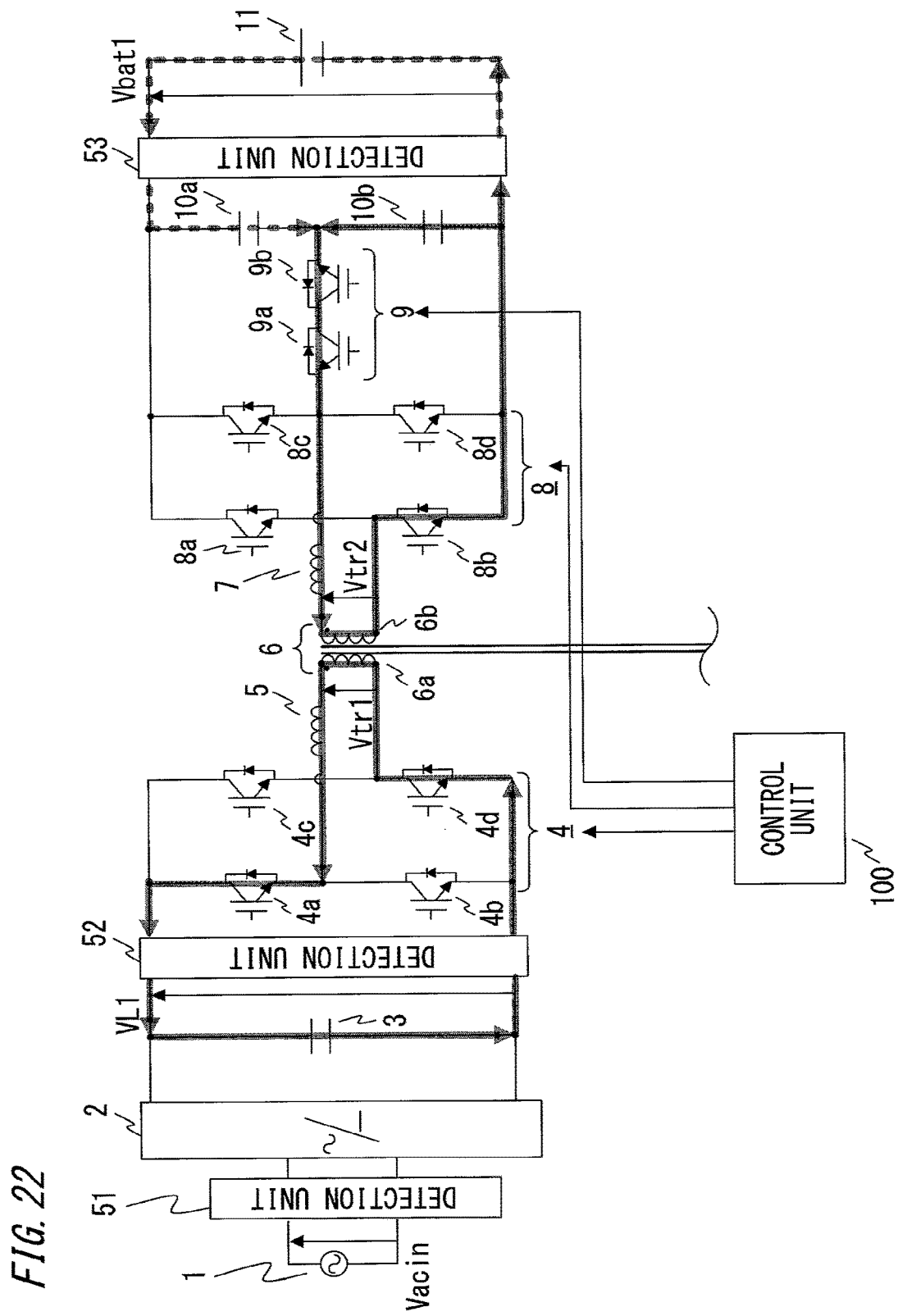
FIG. 22 is a current route diagram for explaining operation of the power conversion device according to embodiment 1 of the present invention.
Figure 23:
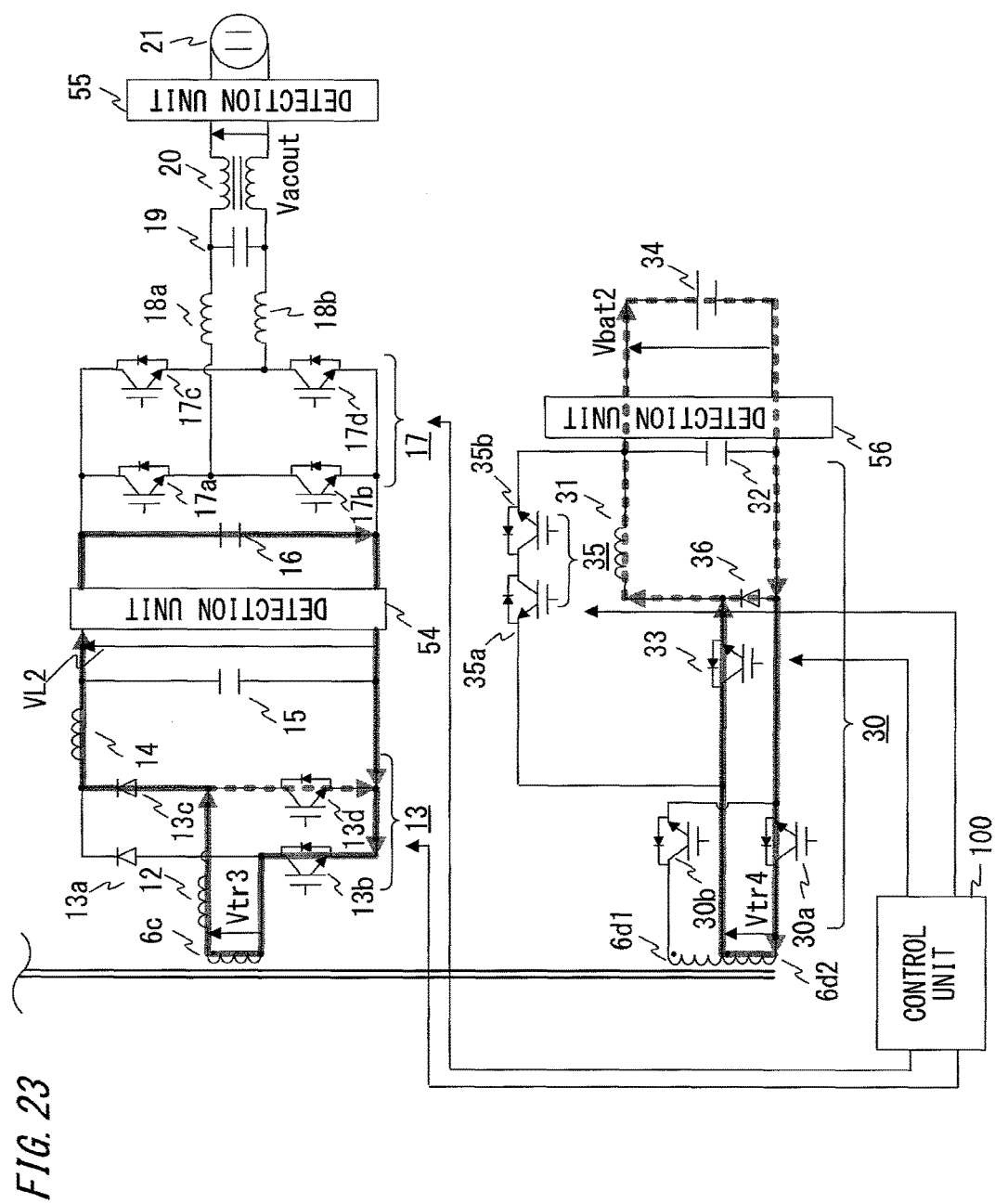
FIG. 23 is a current route diagram for explaining operation of the power conversion device according to embodiment 1 of the present invention.

FIG. 22 and FIG. 23 are current route diagrams showing routes of operation currents when power from the first DC voltage source 11 is distributed to the AC load connected to the load device connection end 21, and the second DC voltage source 34.

In the case where power from the first DC voltage source 11 is distributed to the AC load connected to the load device connection end 21, and the second DC voltage source 34, the generation of the AC power supply Vacout and the charge and stop operation for the second DC voltage source 34 are basically the same as in the case of using the AC power supply 1 as a power supply source. Therefore, the detailed description thereof is omitted.

Here, mainly, voltage occurring on the first switching circuit 4 on the primary side of the transformer 6 in the case of using the first DC voltage source 11 as a power supply source will be described.

In the case where the charge voltage of the first DC voltage source 11 is higher than a predetermined voltage value and the first DC voltage source 11 keeps sufficient discharge voltage that allows supply of power, first, the switch 9 is turned on and the second switching circuit 8 is operated as a half-bridge-type inverter.

That is, when the switch 9 is turned on and the switching element 8b of the second switching circuit 8 is turned on, voltage of the first DC voltage source 11 is divided by the capacitors 10a and 10b which have the same capacitance, and voltage that is half the voltage Vbat1 of the first DC voltage source 11 as shown by the following expression is applied to the second winding 6b of the transformer 6.

$$Vtr2=(½)Vbat1 \quad (2)$$

Here, in the case where the turns ratio between the first winding 6a and the second winding 6b is set as (n1/n2)>1, a step-down relationship of Vtr1>Vtr2 is satisfied when power is transmitted from the AC power supply 1 to the first DC voltage source 11.

On the other hand, in the case where the first DC voltage source 11 is used as a power supply source and the DC voltage Vbat1 thereof is added as it is to the second winding 6b, voltage shown by the following expression occurs on the first winding 6a.

$$Vtr1=(n1/n2)Vbat1 \quad (3)$$

That is, a step-up relationship of Vtr1>Vbat1 is satisfied, and therefore the switching elements 4a to 4d composing the first switching circuit 4 are required to have a high breakdown voltage property.

However, as shown in the above expression (2), by turning on the switch 9, the voltage Vtr2 occurring on the second winding 6b becomes half the voltage Vbat1 of the first DC voltage source 11. Therefore, even if the turns ratio is set as (n1/n2)>1, it is possible to use switching elements having low breakdown voltage, for the first switching circuit 4.

Figure 24:
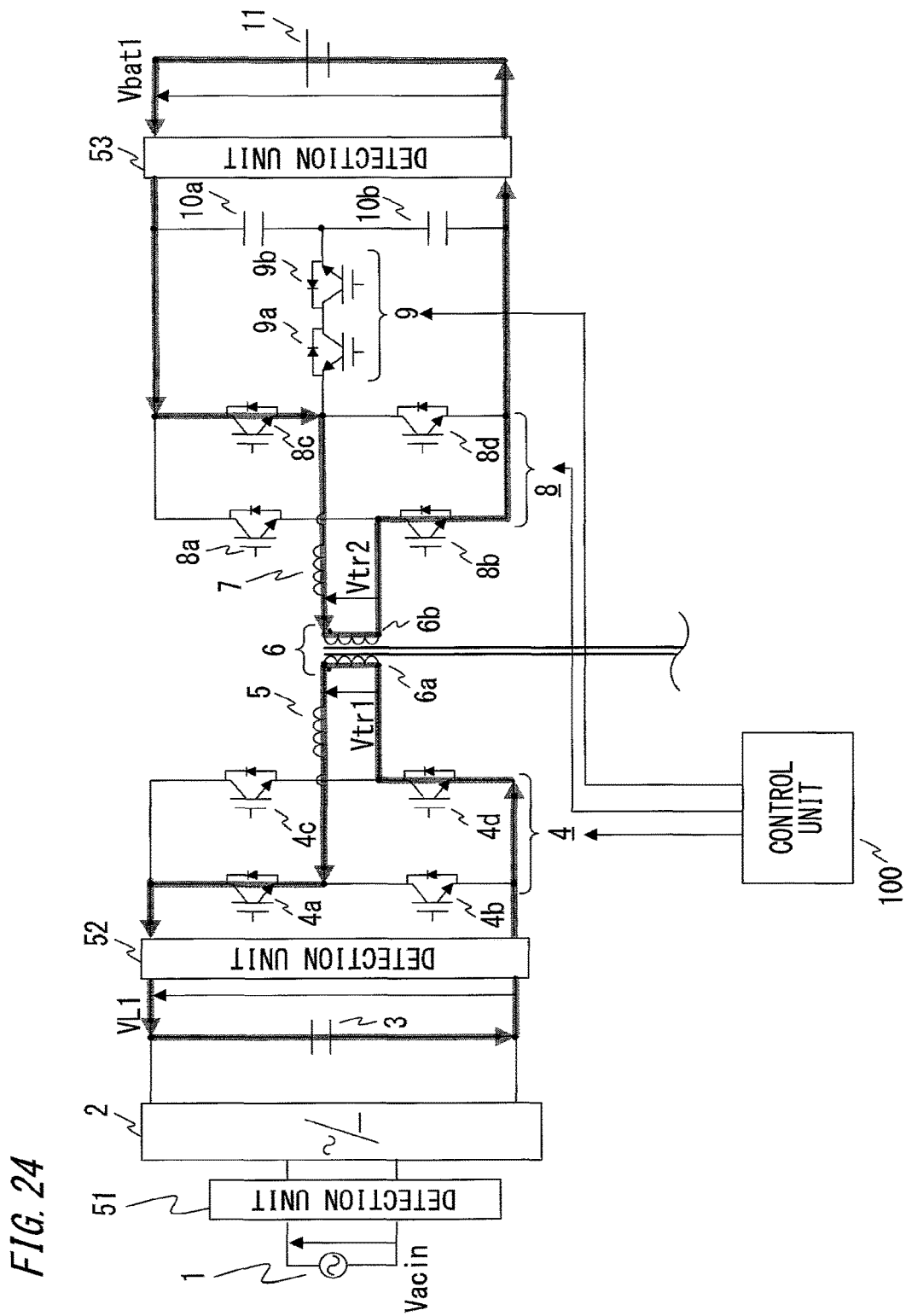
FIG. 24 is a current route diagram for explaining operation of the power conversion device according to embodiment 1 of the present invention.
Figure 25:
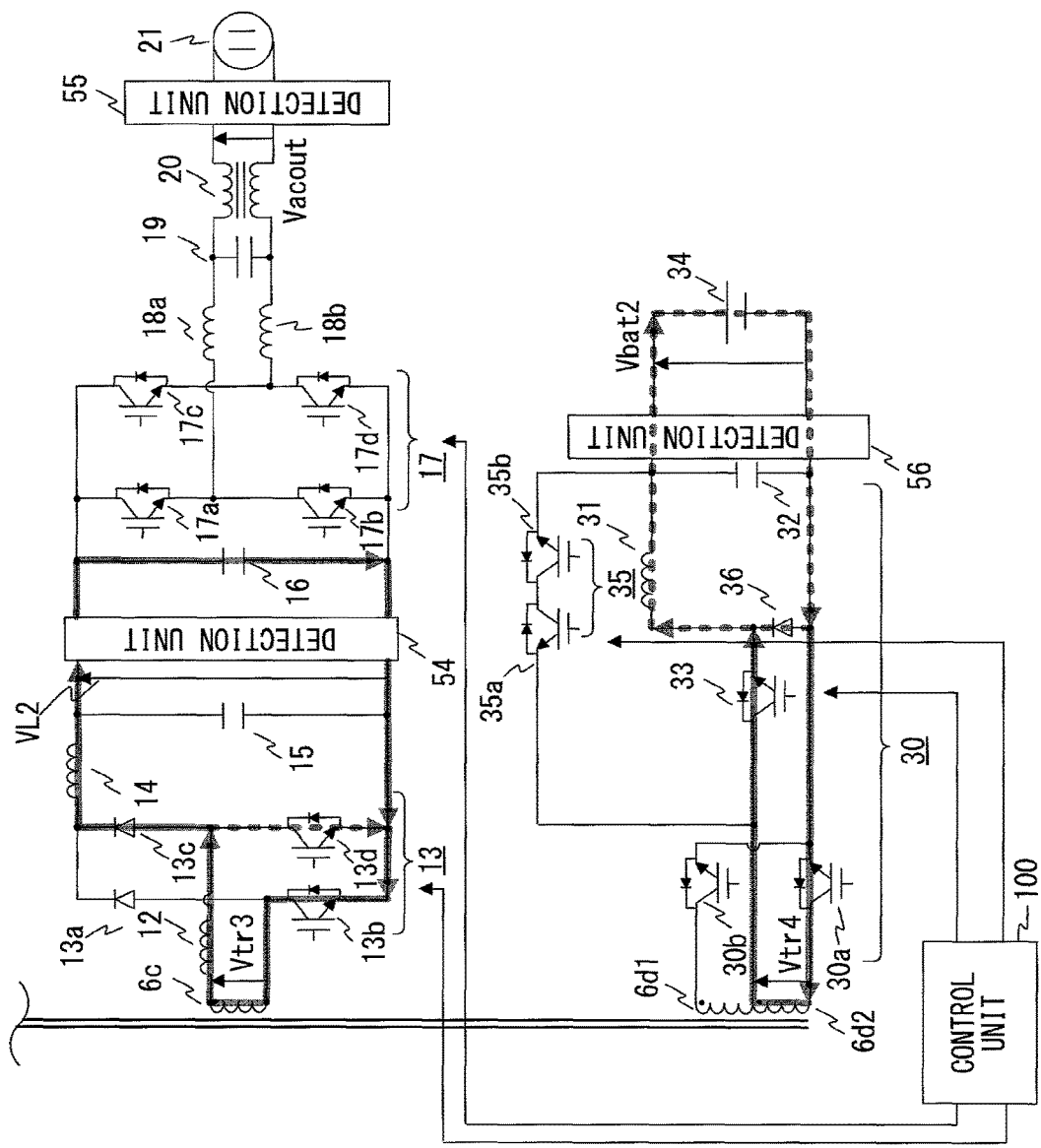
FIG. 25 is a current route diagram for explaining operation of the power conversion device according to embodiment 1 of the present invention.

FIG. 24 and FIG. 25 are current route diagrams showing routes of operation currents when power from the first DC voltage source 11 is distributed to the AC load connected to the load device connection end 21, and the second DC voltage source 34, in the case where the DC voltage Vbat1 of the first DC voltage source 11 is kept at discharge voltage that allows supply of power but the DC voltage Vbat1 is lower than in the case of FIG. 22 and FIG. 23.

In this case, for example, if breakdown voltage of each element in the first switching circuit 4, the third switching circuit 13, the fourth switching circuit 30, and the switch 35 is adequate, the switch 9 is turned off and the second switching circuit 8 is operated as a full-bridge-type inverter. Thus, high voltage can be applied to the second winding 6b of the transformer 6. Thus, conduction loss in power transmission can be reduced.

Figure 26:
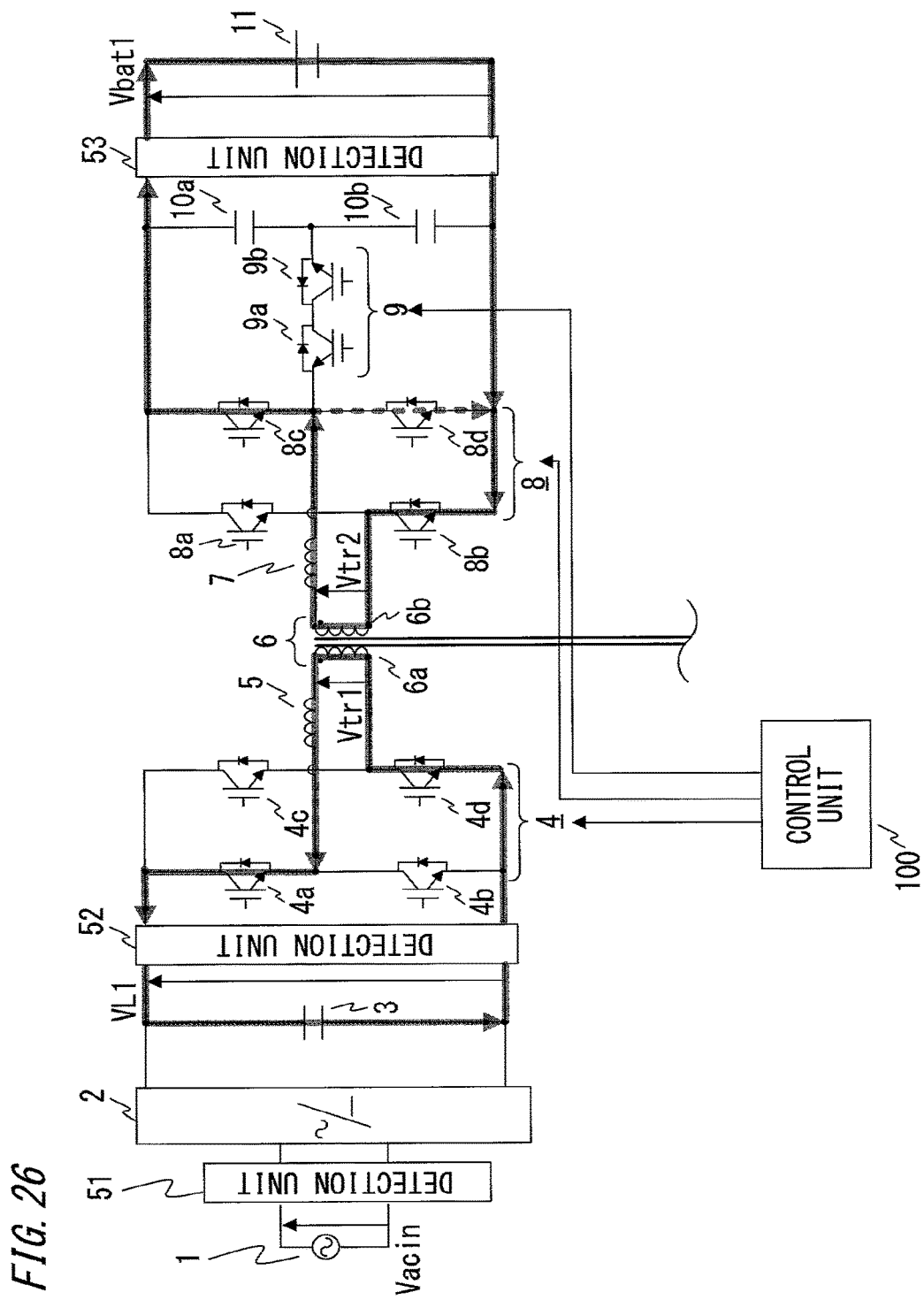
FIG. 26 is a current route diagram for explaining operation of the power conversion device according to embodiment 1 of the present invention.
Figure 27:
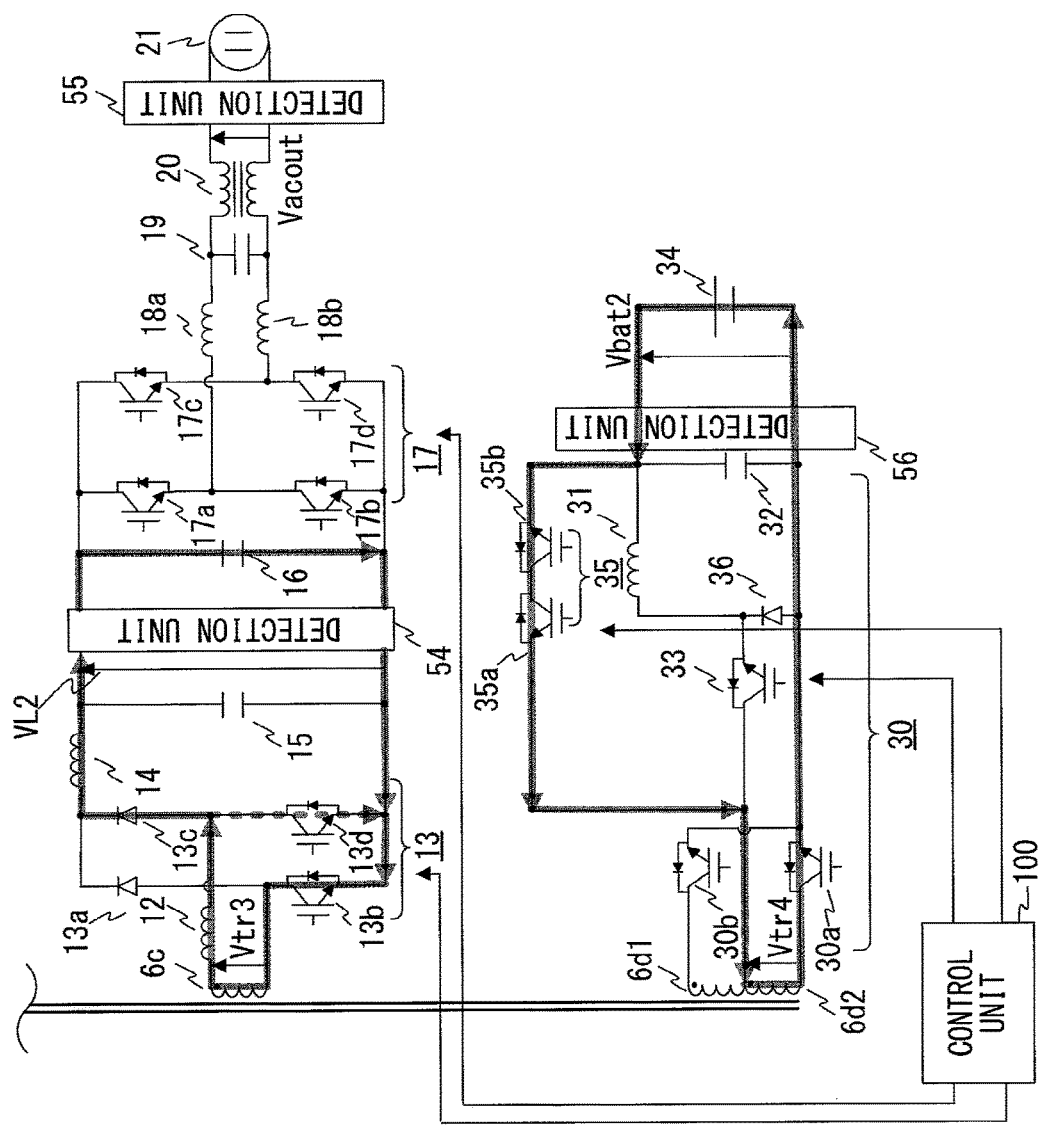
FIG. 27 is a current route diagram for explaining operation of the power conversion device according to embodiment 1 of the present invention.

FIG. 26 and FIG. 27 are current route diagrams showing routes of operation currents when the AC power supply 1 is not connected and power from the second DC voltage source 34 is charged into the first DC voltage source 11 and supplied to the AC load connected to the load device connection end 21.

In this case, by turning on the switching element 30a of the fourth switching circuit 30 and turning on the switch 35, voltage of the second DC voltage source 34 is applied to the fourth winding 6d2 of the transformer 6, whereby isolated voltage occurs as Vtr1 on the first winding 6a of the transformer 6. In addition, the voltage Vtr2 occurs on the second winding 6b of the transformer 6, and further, the voltage Vtr3 occurs on the third winding 6c of the transformer 6. The charging and stop for the first DC voltage source 11, and the operation of supplying power of the AC power supply Vacout to the AC load are the same as in the case where the AC power supply 1 is used as a power supply source in FIG. 12. Therefore, the detailed description thereof is omitted here.

As described above, the power conversion device according to embodiment 1 can perform power distribution control of input power to multiple outputs, and as necessary, can arbitrarily stop operation of charging the first DC voltage source 11 or the second DC voltage source 34, while supplying power to another load.

In the case where the first DC voltage source 11 is used as a power supply source, the second switching circuit 8 is switched to a half-bridge-type inverter function or a full-bridge-type inverter function depending on the voltage state of the first DC voltage source 11, voltage applied to the second winding 6b of the transformer 6 can be adjusted. Therefore, the breakdown voltages of the elements composing the power conversion device can be reduced, and conduction loss can be reduced.

Embodiment 2

Figure 28:
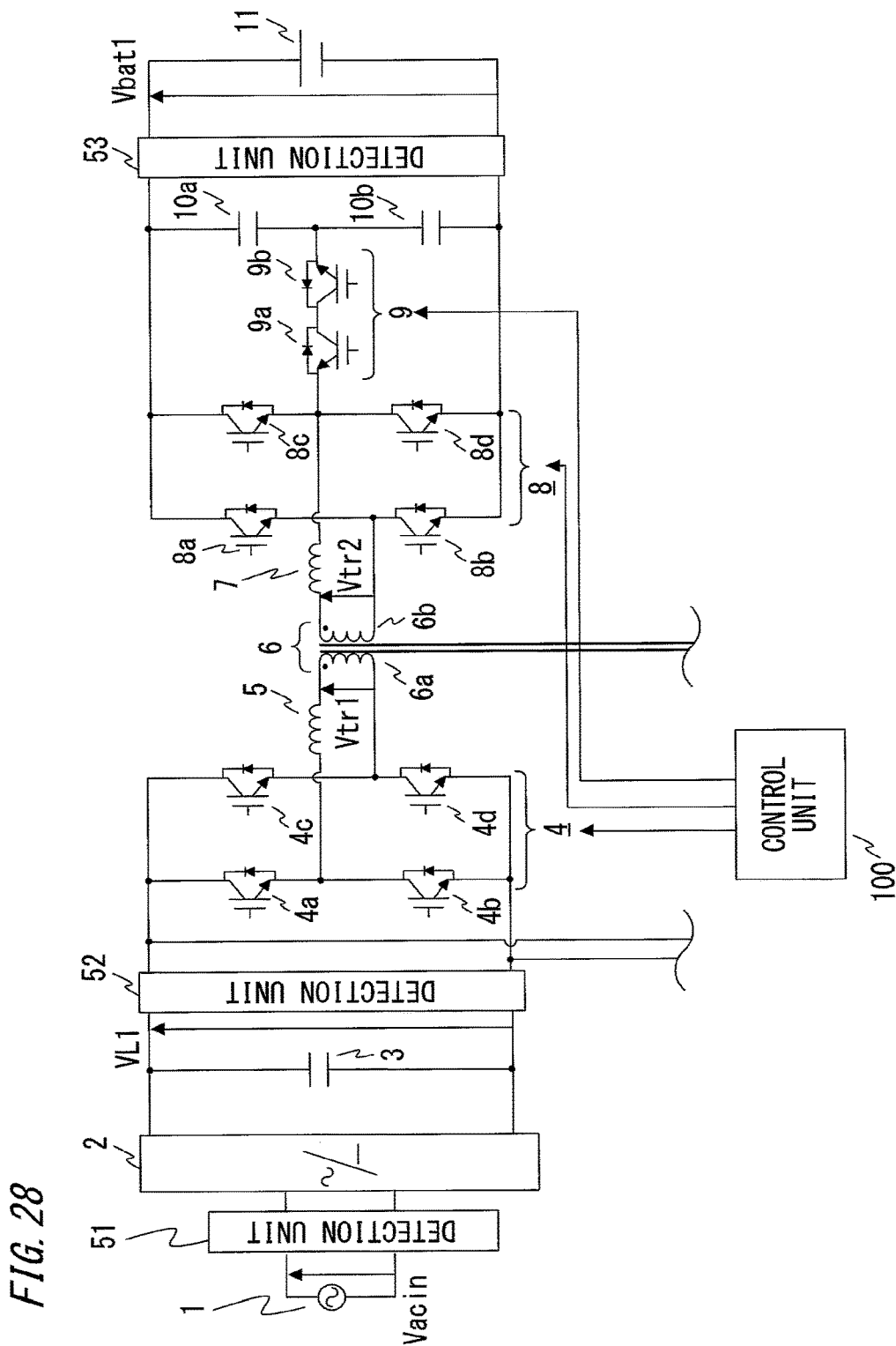
FIG. 28 is a circuit configuration diagram of a power conversion device according to embodiment 2 of the present invention.
Figure 29:
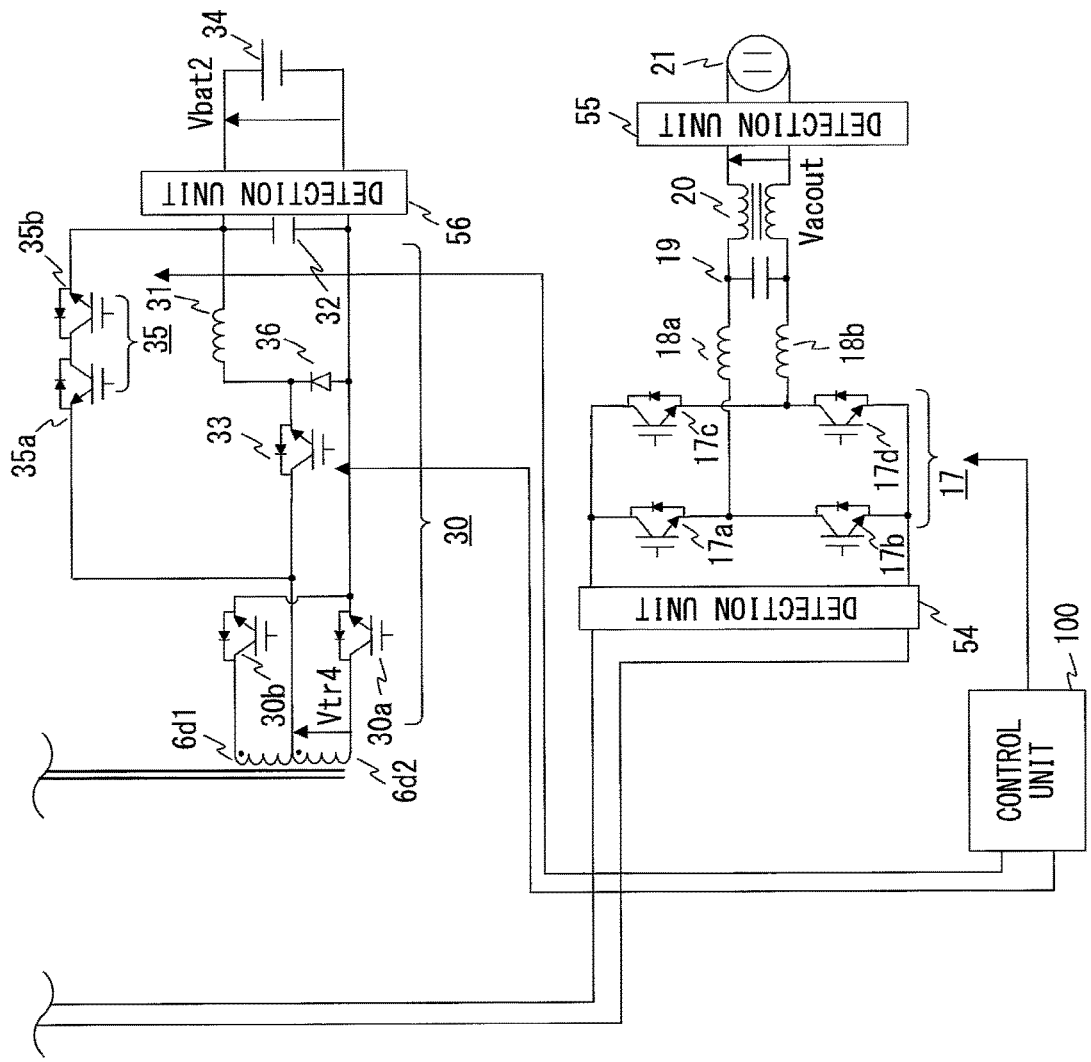
FIG. 29 is a circuit configuration diagram of the power conversion device according to embodiment 2 of the present invention.

FIG. 28 and FIG. 29 are circuit configuration diagrams of a power conversion device according to embodiment 2 of the present invention. The components that correspond to or are the same as those in embodiment 1 shown in FIG. 1 and FIG. 2 are denoted by the same reference characters.

A configuration feature of embodiment 2 is that the DC input end of the inverter 17 composed of the four switching elements 17a to 17d is connected in parallel with the first switching circuit 4 via the voltage current detection unit 54. To the AC output end of the inverter 17, the smoothing coils 18a and 18b, the smoothing capacitor 19, the common mode choke coil 20, the voltage current detection unit 55, and the load device connection end 21 are connected in this order. At the load device connection end 21, the AC power supply Vacout is generated which is a power supply for the AC load (not shown).

The other configuration is basically the same as in embodiment 1. Therefore, the corresponding components are denoted by the same reference characters and the detailed description thereof is omitted. The operations of the first, second, and fourth switching circuits 4, 8, and 30, the inverter 17, and the like are also basically the same as in embodiment 1, and therefore the detailed description thereof is omitted.

The summary of power distribution operation in the power conversion device having the above configuration will be described below.

In the case where the AC power supply 1 is connected and is used as a power supply source, the voltage Vacin of the AC power supply 1 is converted to the DC voltage VL1 by the AC/DC converter 2, and the DC voltage VL1 is converted to the secondary-side DC voltage Vbat1 isolated by the transformer 6, to charge the first DC voltage source 11. In addition, the DC voltage VL1 is converted to AC by the inverter 17, to generate the AC power supply Vacout for the AC load connected to the load device connection end 21. Further, the DC voltage VL1 is converted to the quaternary-side DC voltage Vbat2 isolated by the transformer 6, to charge the second DC voltage source 34.

In the case where the AC power supply 1 is not connected and therefore the first DC voltage source 11 is used as a power supply source, the voltage Vbat1 of the first DC voltage source 11 is converted to the primary-side DC voltage VL1 isolated by the transformer 6, and then, from the DC voltage VL1, the AC power supply Vacout for the AC load connected to the load device connection end 21 is generated by the inverter 17. In addition, the voltage Vbat1 of the first DC voltage source 11 is converted to the quaternary-side DC voltage Vbat2 isolated by the transformer 6, to charge the second DC voltage source 34.

In the case where the AC power supply 1 is not connected and the second DC voltage source 34 is used as a power supply source because the charge amount of the first DC voltage source 11 is insufficient, the voltage Vbat2 of the second DC voltage source 34 is converted to the primary-side DC voltage VL1 isolated by the transformer 6, and then, from the DC voltage VL1, the AC power supply Vacout for the AC load connected to the load device connection end 21 is generated by the inverter 17. In addition, the voltage Vbat2 of the second DC voltage source 34 is converted to the secondary-side DC voltage Vbat1 isolated by the transformer 6, to charge the first DC voltage source 11.

Next, the summary of a power flow in the power conversion device according to embodiment 2 of the present invention will be described with reference to FIG. 30 to FIG. 39.

Figure 30:
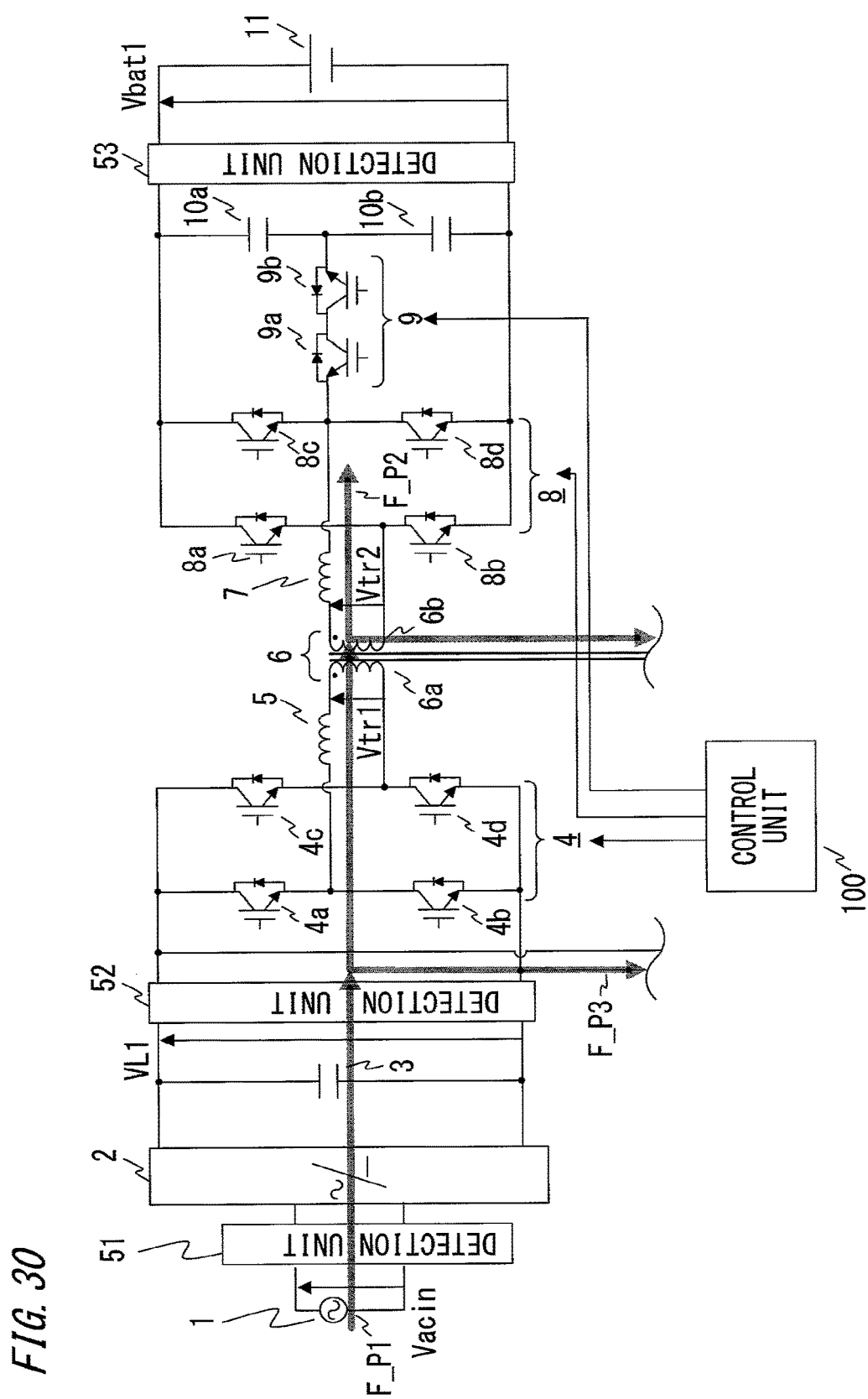
FIG. 30 is a diagram for explaining a power flow in the power conversion device according to embodiment 2 of the present invention.
Figure 31:
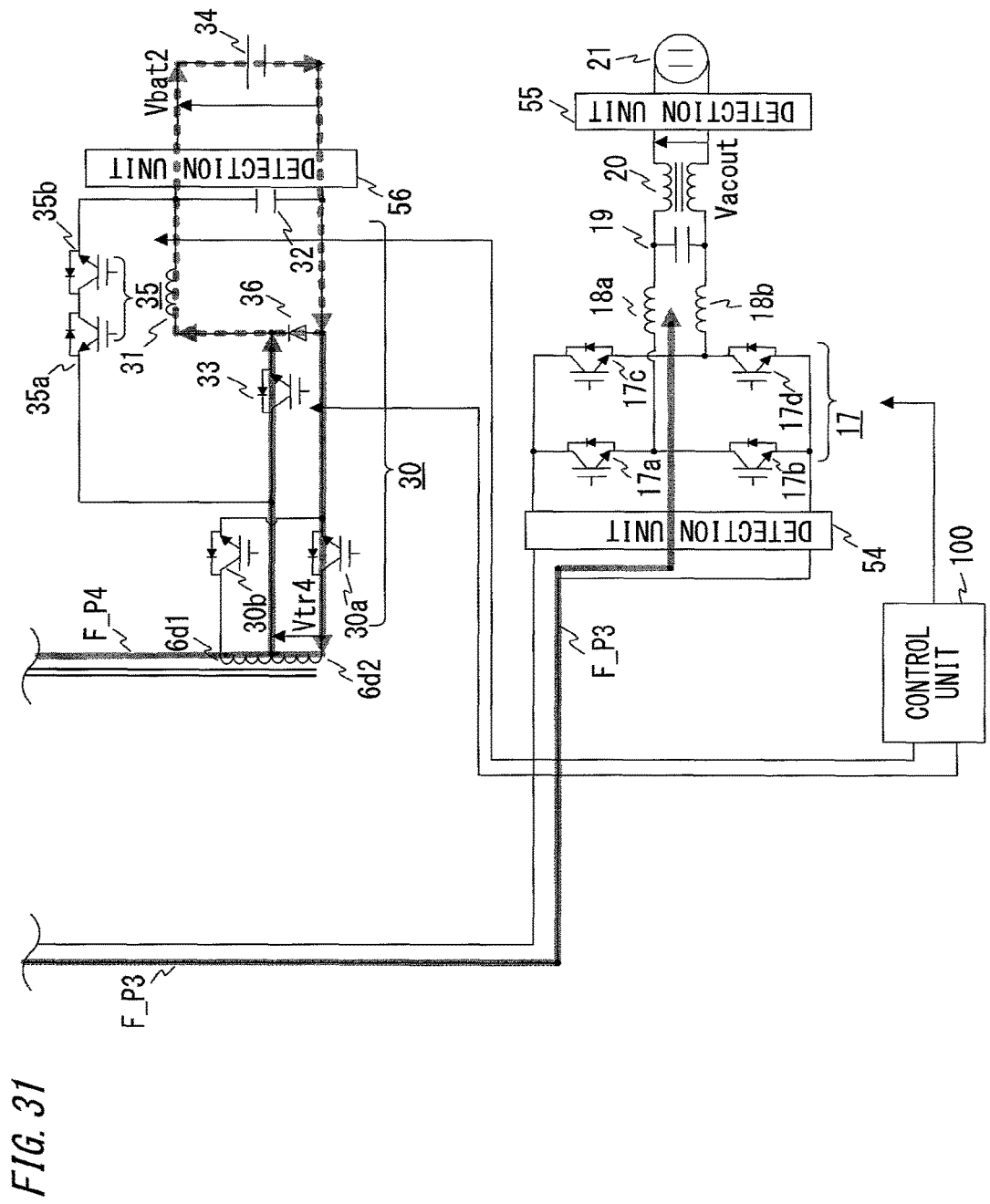
FIG. 31 is a diagram for explaining a power flow in the power conversion device according to embodiment 2 of the present invention.

As shown in FIG. 30 and FIG. 31, in the case where the AC power supply 1 is connected, input power F_P1 from the AC power supply 1 is distributed into charge power F_P2 for the first DC voltage source 11, supply power F_P3 for the AC load connected to the load device connection end 21, and charge power F_P4 for the second DC voltage source 34.

Figure 32:
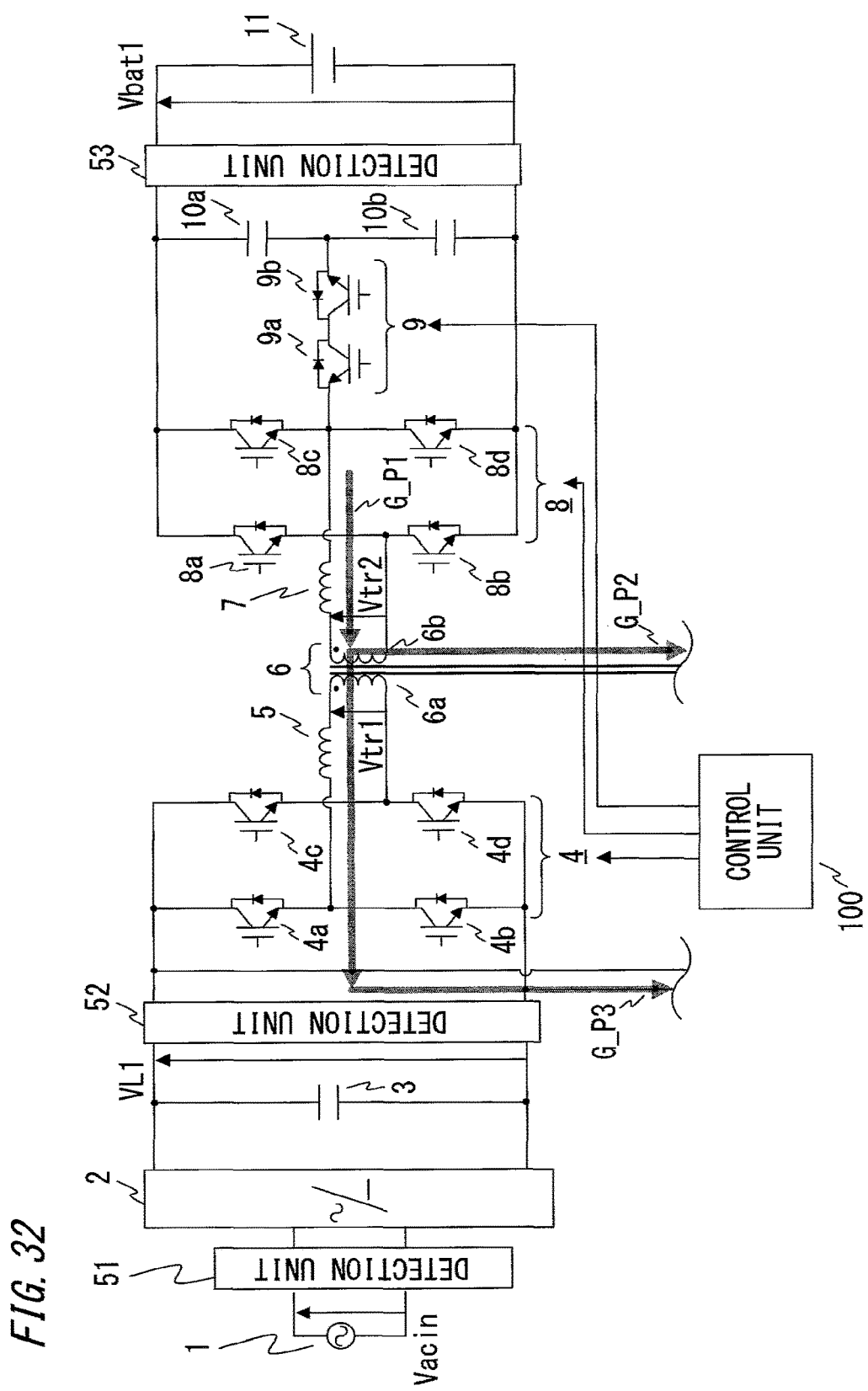
FIG. 32 is a diagram for explaining a power flow in the power conversion device according to embodiment 2 of the present invention.
Figure 33:
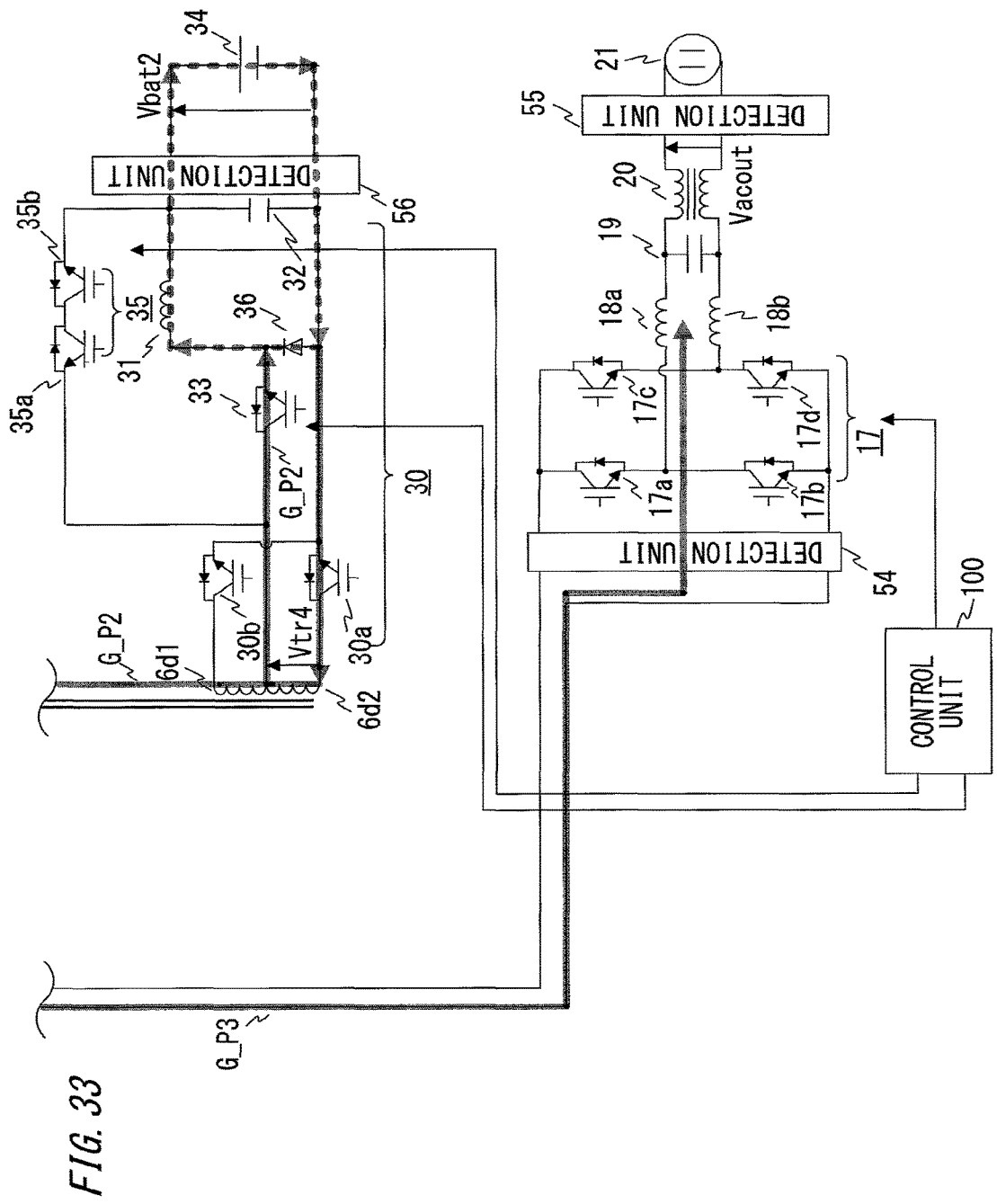
FIG. 33 is a diagram for explaining a power flow in the power conversion device according to embodiment 2 of the present invention.

As shown in FIG. 32 and FIG. 33, in the case where the AC power supply 1 is not connected and therefore the first DC voltage source 11 is used as a power supply source, supply power G_P1 from the first DC voltage source 11 is distributed into supply power G_P3 for the AC load connected to the load device connection end 21, and charge power G_P2 for the second DC voltage source 34.

Figure 34:
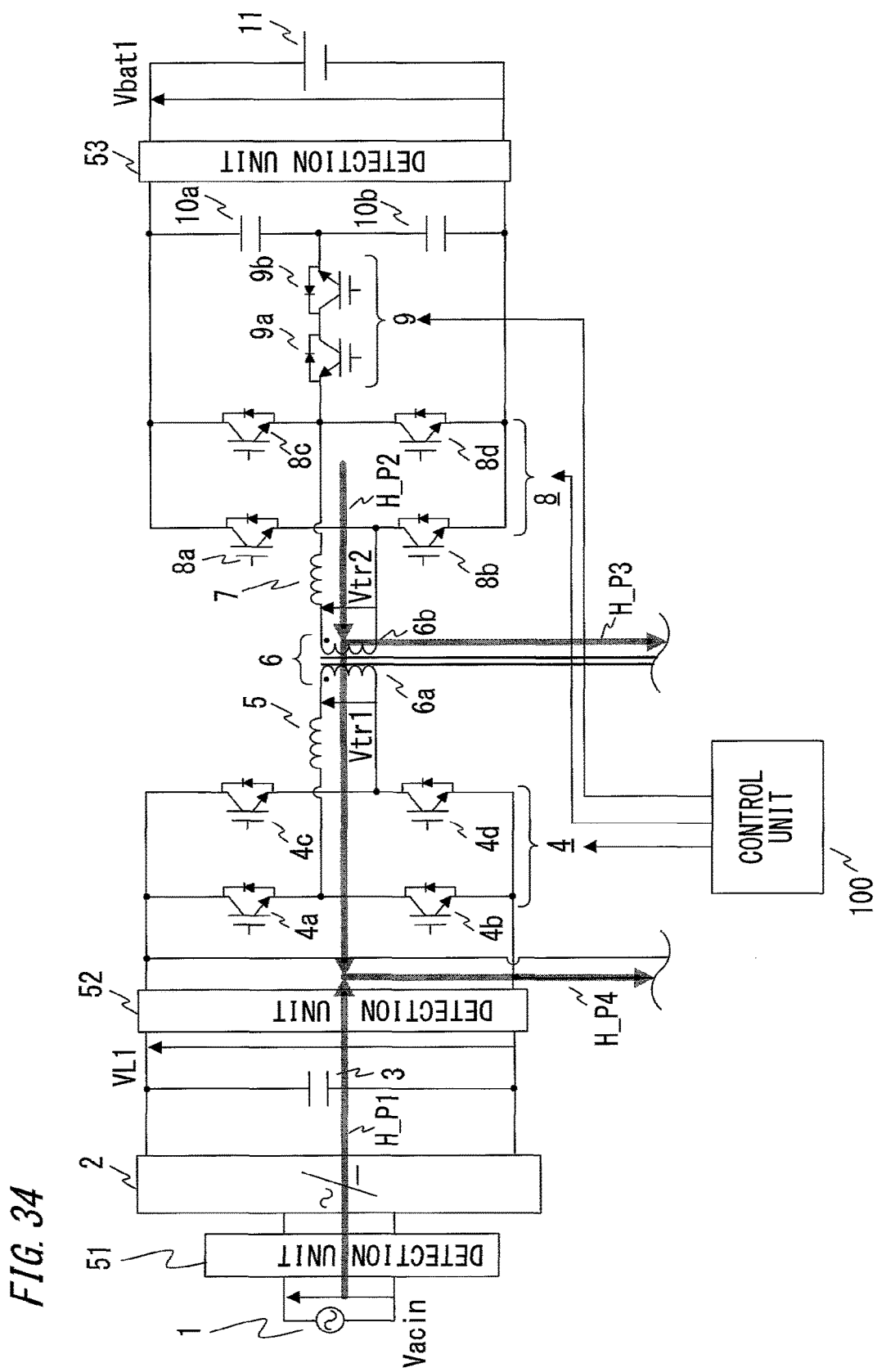
FIG. 34 is a diagram for explaining a power flow in the power conversion device according to embodiment 2 of the present invention.
Figure 35:
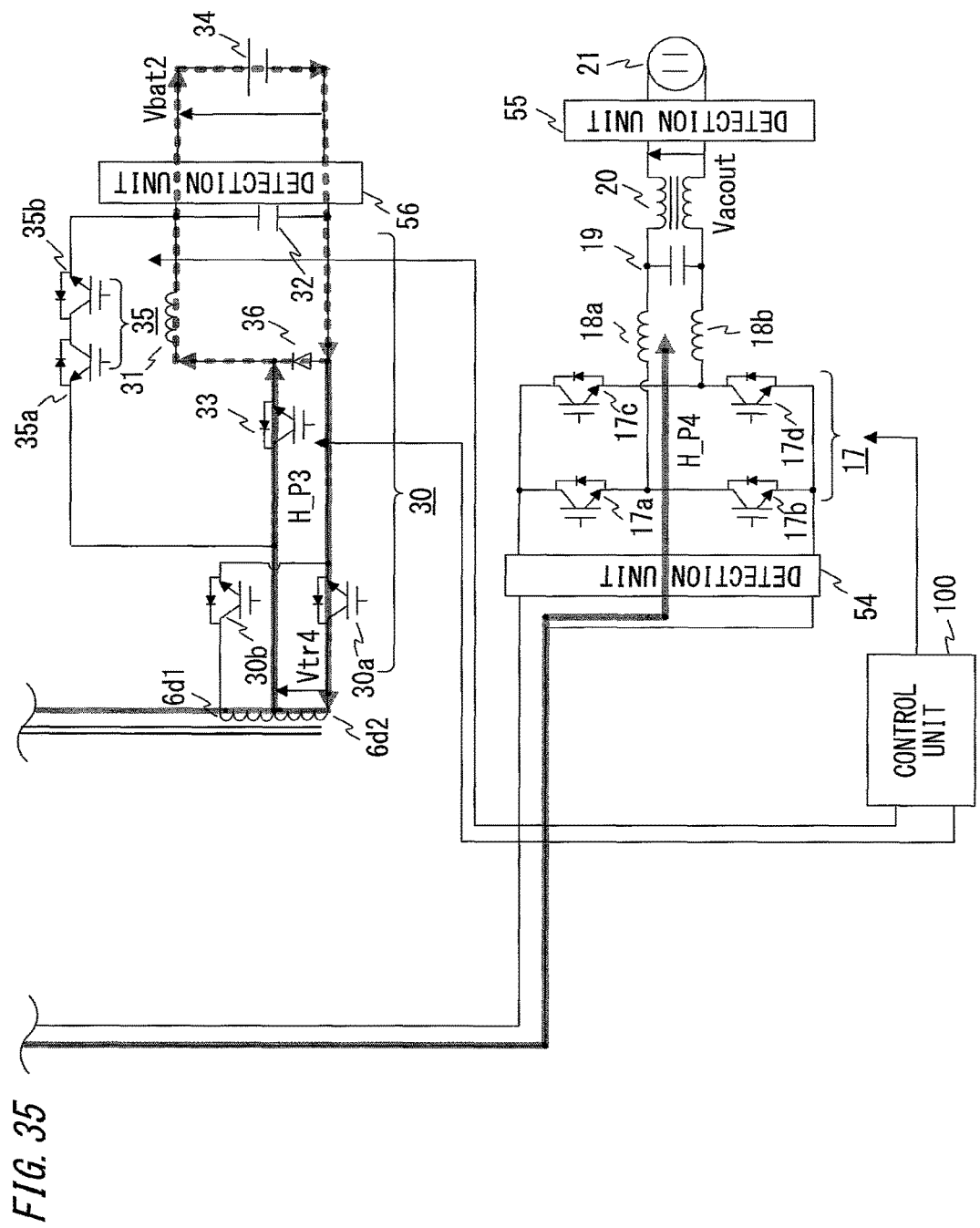
FIG. 35 is a diagram for explaining a power flow in the power conversion device according to embodiment 2 of the present invention.

As shown in FIG. 34 and FIG. 35, in the case where, since, for example, a private power generator is used as the AC power supply 1, power supplied from the AC power supply 1 is insufficient and therefore the AC power supply 1 and the first DC voltage source 11 are both used as a power supply source, power H_P1 from the AC power supply 1 and power H_P2 from the first DC voltage source 11 are distributed into supply power H_P4 for the AC load connected to the load device connection end 21, and charge power H_P3 for the second DC voltage source 34.

Figure 36:
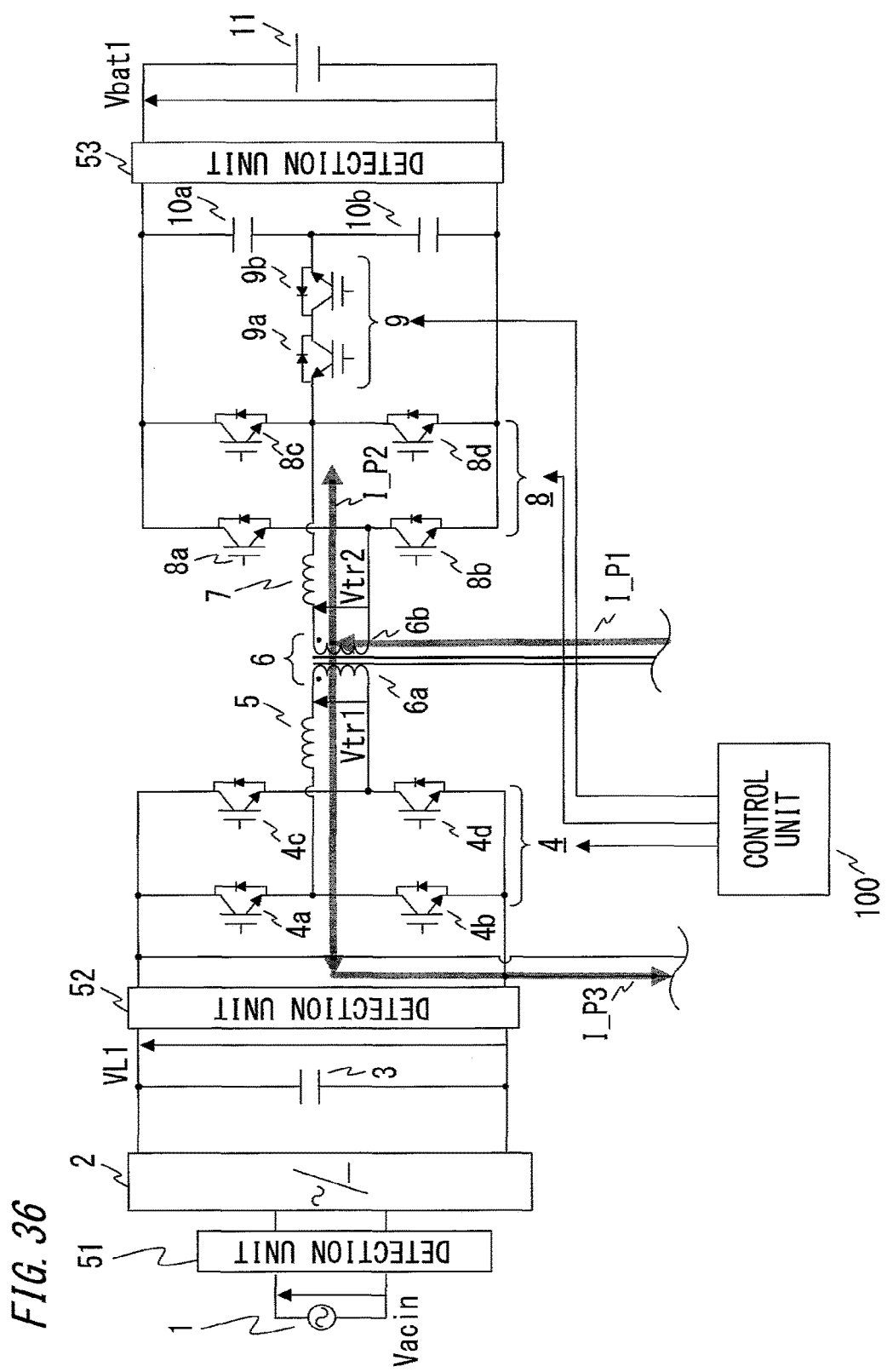
FIG. 36 is a diagram for explaining a power flow in the power conversion device according to embodiment 2 of the present invention.
Figure 37:
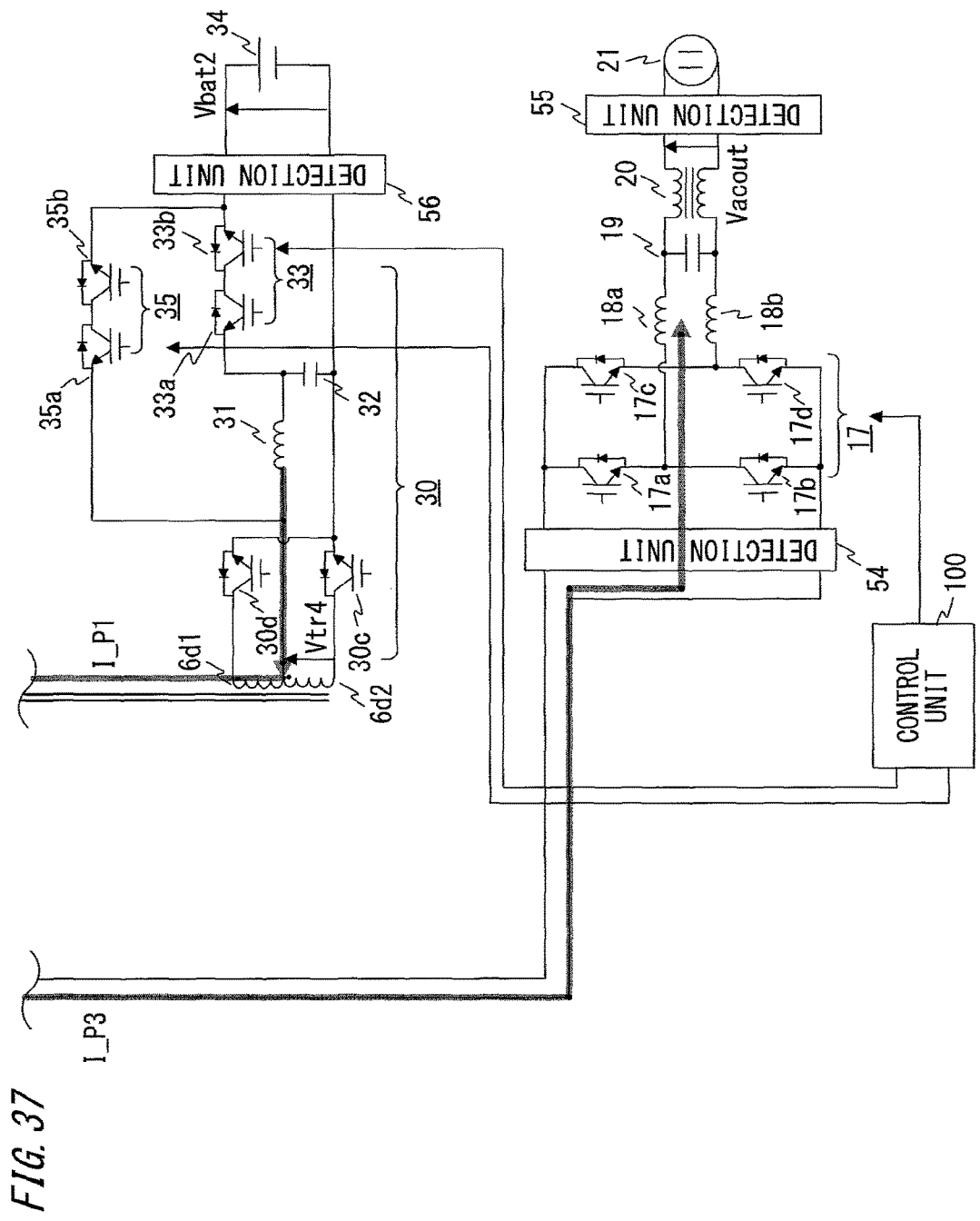
FIG. 37 is a diagram for explaining a power flow in the power conversion device according to embodiment 2 of the present invention.

As shown in FIG. 36 and FIG. 37, in the case where the AC power supply 1 is not connected and the charge amount of the first DC voltage source 11 is insufficient, the second DC voltage source 34 is used as a power supply source, and at this time, supply power I_P1 from the second DC voltage source 34 is distributed into supply power I_P2 for the first DC voltage source 11 and supply power I_P3 for the AC power supply Vacout.

Figure 38:
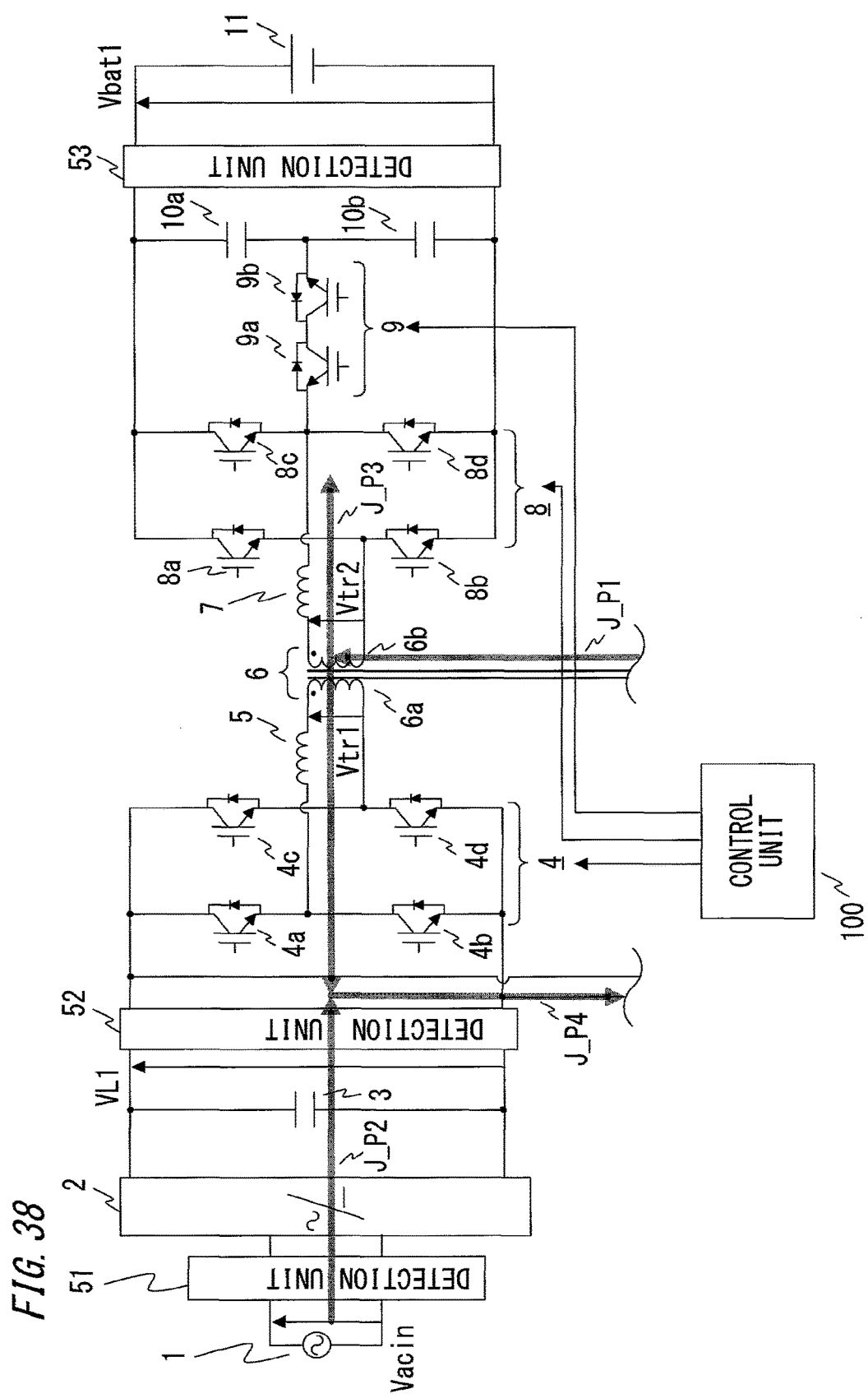
FIG. 38 is a diagram for explaining a power flow in the power conversion device according to embodiment 2 of the present invention.
Figure 39:
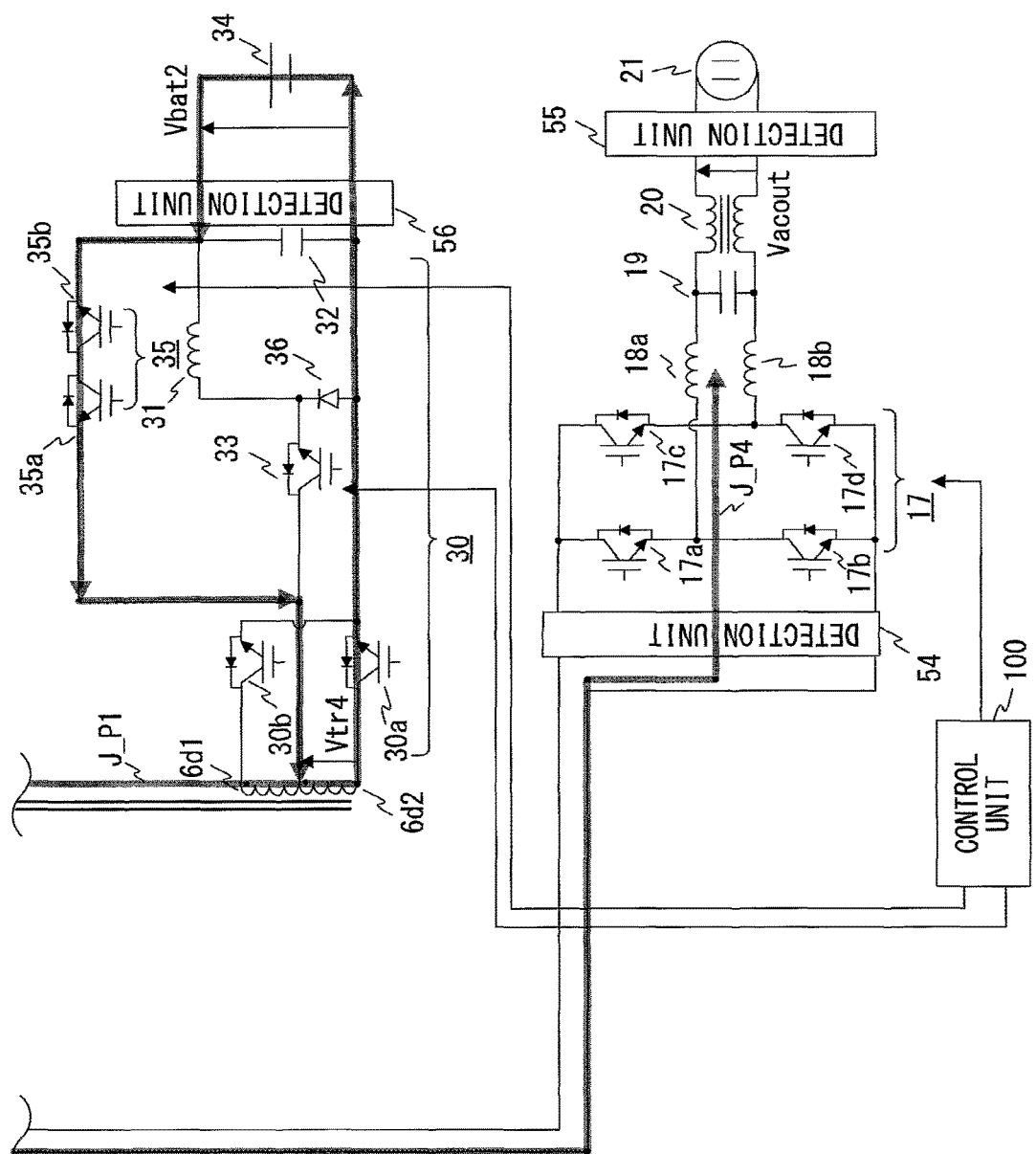
FIG. 39 is a diagram for explaining a power flow in the power conversion device according to embodiment 2 of the present invention.

As shown in FIG. 38 and FIG. 39, in the case where, since, for example, a private power generator is used as the AC power supply 1, power supplied from the AC power supply 1 is insufficient, and the charge amount of the first DC voltage source 11 is insufficient, and therefore the AC power supply 1 and the second DC voltage source 34 are both used as a power supply source, supply power J_P2 from the AC power supply 1 and supply power J_P1 from the second DC voltage source 34 are distributed into supply power J_P3 for the first DC voltage source 11 and supply power J_P4 for the AC load connected to the load device connection end 21.

The operations for realizing the above power flows are the same as in embodiment 1, and the details thereof is as shown in the flowcharts in FIG. 13 to FIG. 19. Therefore, the detailed description thereof is omitted here.

In order to obtain the required AC power supply Vacout at the load device connection end 21, in embodiment 1, the DC voltage VL2 on the input side of the inverter 17 is generated through the third winding 6c of the transformer 6 and the third switching circuit 13, but in the present embodiment 2, not via the transformer 6, the DC input end of the inverter 17 is connected to the capacitor 3 via the voltage current detection unit 54, in parallel with the first switching circuit 4.

Therefore, in the configuration in embodiment 2, the third winding 6c of the transformer 6 and the third switching circuit 13 as in embodiment 1 can be omitted, whereby the circuit configuration is simplified. However, the input voltage VL1 having the same value as that for the first switching circuit 4 is applied to the DC input end of the inverter 17, and the voltage applied to the inverter 17 cannot be adjusted using the number of turns of the third winding 6c. Therefore, the switching elements 17a to 17d of the inverter 17 are required to have high breakdown voltages.

As described above, as in embodiment 1, the power conversion device according to embodiment 2 can perform power distribution control of input power to multiple outputs, and as necessary, can arbitrarily stop operation of charging the first DC voltage source 11 or the second DC voltage source 34, while supplying power to another load. In addition, in the case where isolation between the AC power supply 1 and the inverter 17 is not necessary, since the DC voltage VL1 obtained by the AC/DC converter 2 can be applied to the inverter 17, the third winding 6c of the transformer 6 can be omitted to reduce the number of turns in windings.

Embodiment 3

Figure 40:
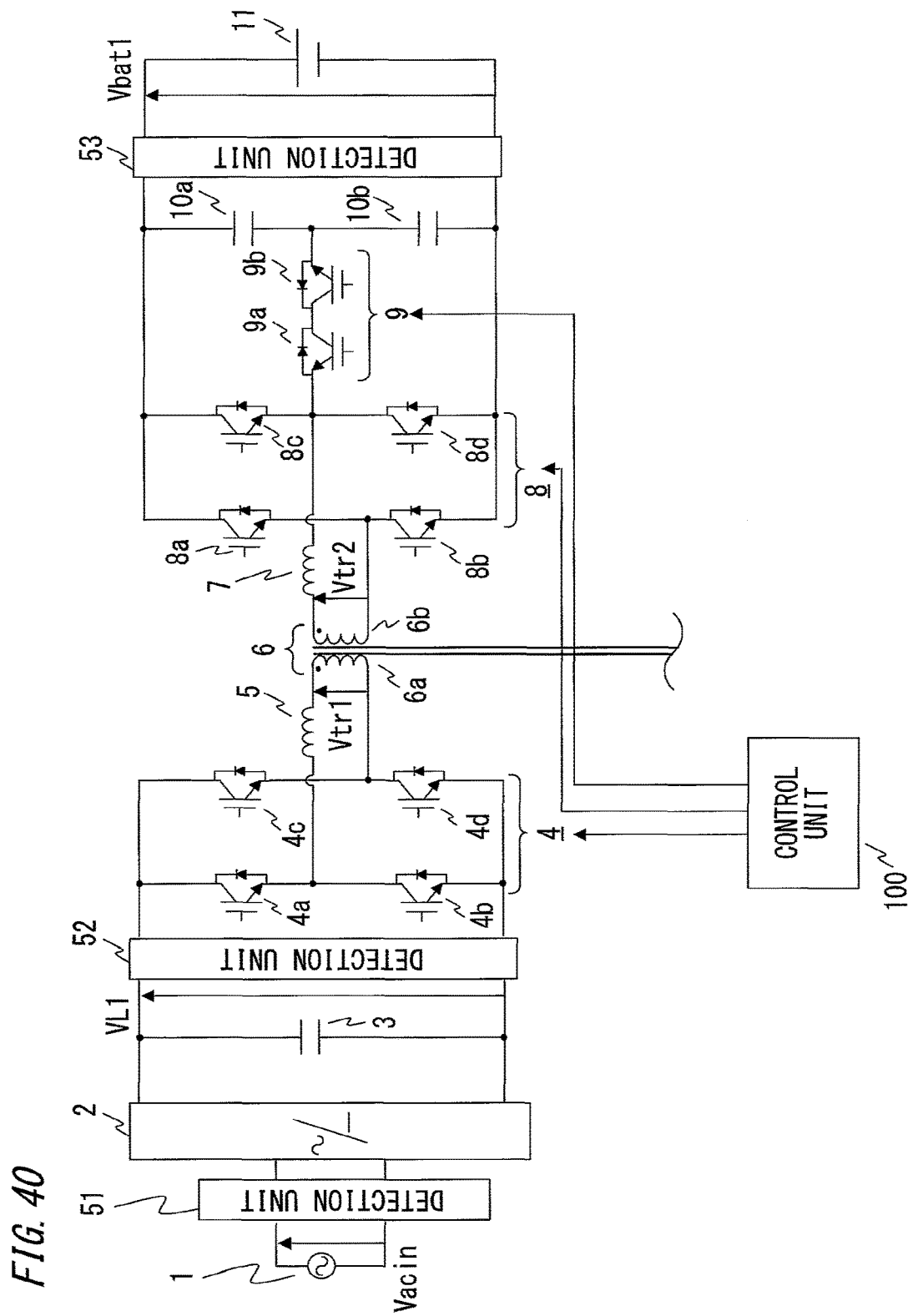
FIG. 40 is a circuit configuration diagram of a power conversion device according to embodiment 3 of the present invention.
Figure 41:
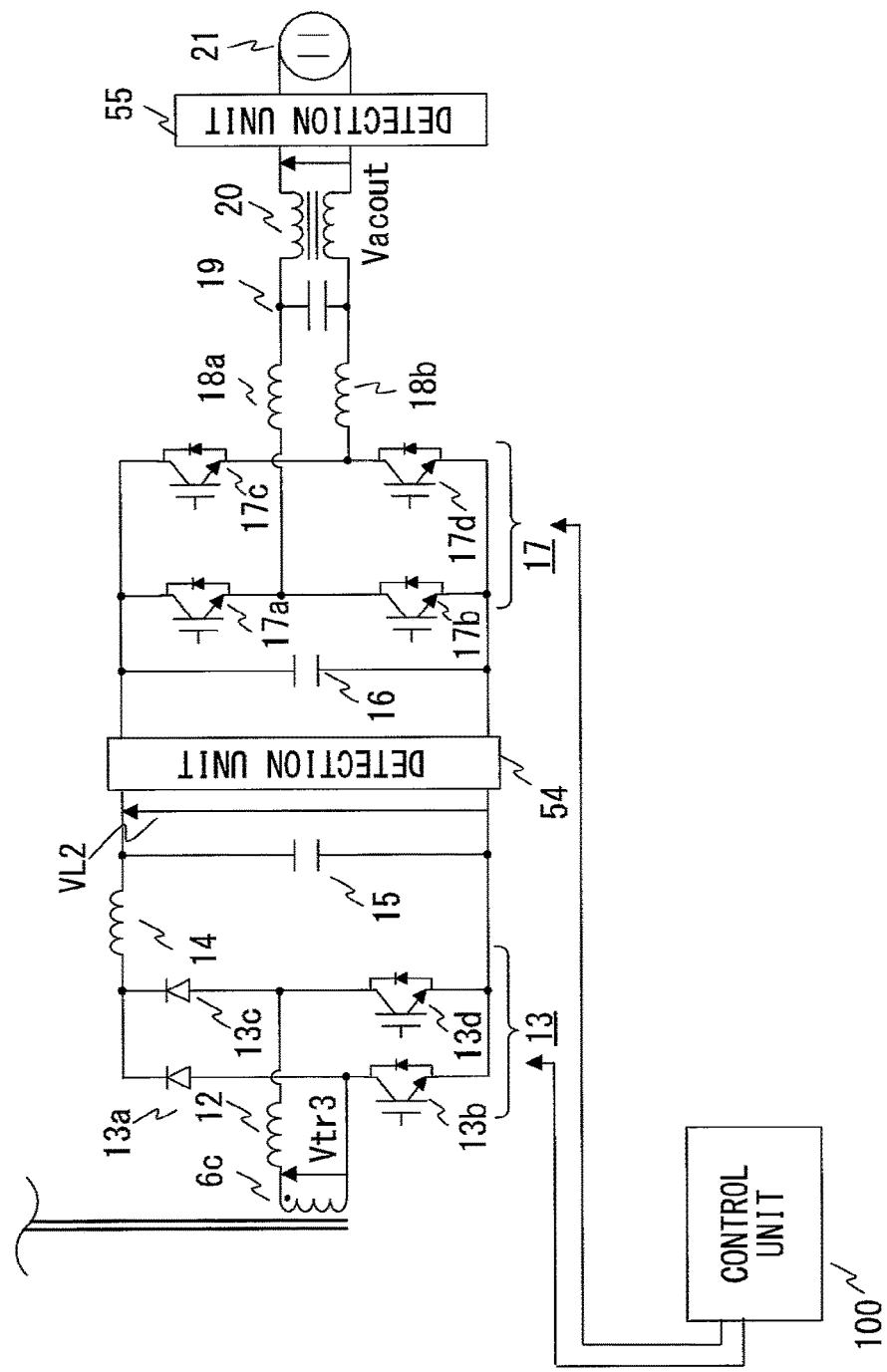
FIG. 41 is a circuit configuration diagram of the power conversion device according to embodiment 3 of the present invention.

FIG. 40 and FIG. 41 are circuit configuration diagrams of a power conversion device according to embodiment 3 of the present invention. The components that correspond to or are the same as those in embodiment 1 shown in FIG. 1 are denoted by the same reference characters.

A feature in embodiment 3 is that the circuit including: the fourth windings 6d1 and 6d2 of the transformer 6; and the fourth switching circuit 30 and the second DC voltage source 34 connected to the windings 6*d*1 and 6*d*2, is eliminated from the configuration in embodiment 1 shown in FIG. 1. The other configuration is the same as in embodiment 1.

Therefore, except for the operation of the circuit including the fourth switching circuit 30 and the second DC voltage source 34 in embodiment 1, the basic operation is the same as in embodiment 1, and therefore the detailed description thereof is omitted here.

The power conversion device according to embodiment 3 can perform power distribution control of input power to the first DC voltage source 11 and the AC load connected to the load device connection end 21, and as necessary, can arbitrarily stop operation of charging the first DC voltage source 11, while supplying power to the AC load. The configuration in embodiment 3 is applicable to the case where the second DC voltage source 34 as in embodiment 1 is separately provided as an independent power system such as a power supply for a vehicle electric component.

Embodiment 4

Figure 42:
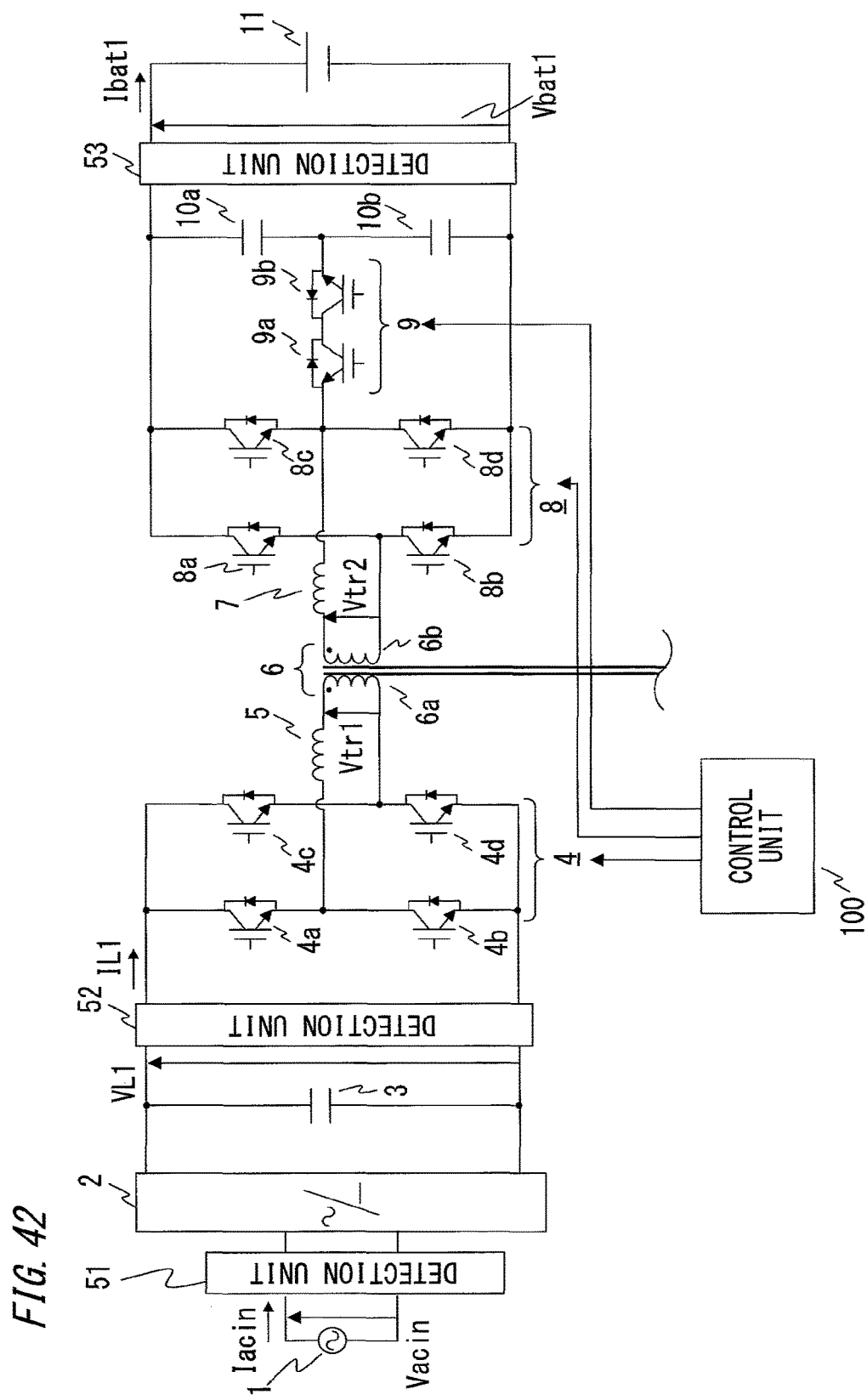
FIG. 42 is a circuit configuration diagram of a power conversion device according to embodiment 4 of the present invention.
Figure 43:
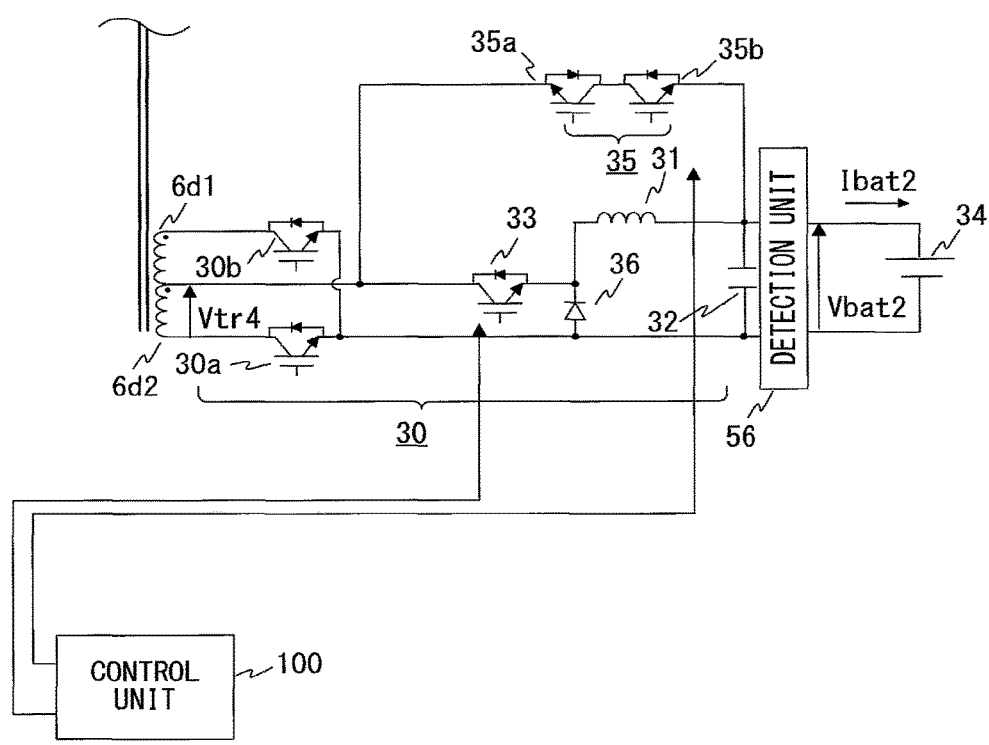
FIG. 43 is a circuit configuration diagram of the power conversion device according to embodiment 4 of the present invention.

FIG. 42 and FIG. 43 are circuit configuration diagrams of a power conversion device according to embodiment 4 of the present invention. The components that correspond to or are the same as those in embodiment 1 shown in FIG. 1 are denoted by the same reference characters.

A feature in embodiment 4 is that the circuit including: the third winding 6*c* of the transformer 6; and the third switching circuit 13 and the inverter 17 connected to the winding 6*c*, is eliminated from the configuration in embodiment 1 shown in FIG. 1. The other configuration is the same as in embodiment 1.

Therefore, except for the operation of the circuit including the third switching circuit 13 and the inverter 17 in embodiment 1, the basic operation is the same as in embodiment 1, and therefore the detailed description thereof is omitted.

The power conversion device according to embodiment 4 can perform power distribution control of input power to the first and second DC voltage sources 11 and 34, and while supplying power to one of the first and second DC voltage sources 11 and 34, can arbitrarily stop operation of charging the other DC voltage source as necessary. The configuration in embodiment 4 is applicable to the case where it is not particularly necessary to connect such an AC load as in embodiment 1 to the load device connection end 21 and therefore the circuit including the third winding 6*c*, the third switching circuit 13, and the inverter 17 can be omitted.

The present invention is not limited only to the configurations shown in the above embodiments 1 to 4. Without deviating from the gist of the present invention, each configuration may be partially modified or omitted, or the configurations in embodiments 1 to 4 may be combined as appropriate.

The invention claimed is:

1. A power conversion device comprising:
a transformer composed of a first winding, a second winding, a third winding, and a fourth winding which are magnetically coupled;
a first switching circuit having an AC end connected to the first winding via a first step-up coil;
an AC/DC converter having an output end connected to a DC end of the first switching circuit, and an input end connected to an AC power supply;
a second switching circuit having an AC end connected to the second winding via a second step-up coil;
a first DC voltage source connected to a DC end of the second switching circuit;
a third switching circuit having an AC end connected to the third winding;
an inverter connected to a DC end of the third switching circuit;
a fourth switching circuit connected between the fourth winding and a second DC voltage source; and
a control unit to control the first switching circuit, the second switching circuit, the third switching circuit, and the fourth switching circuit,
wherein
the second switching circuit is a bidirectional switch circuit that transmits power from the second winding to the first DC voltage source and transmits power from the first DC voltage source to the second winding, and
a turns ratio between the first winding and the second winding is set so that voltage of the second winding is lower than a charge of the first DC voltage source,
wherein, to distribute an input power from the AC power supply to the first DC voltage source, an AC load connected to the inverter, and the second DC voltage source,
the control unit controls a power reception amount of the input power from the AC power supply by controlling a switching operation of the first switching circuit,
the control unit steps up voltage of the second winding by controlling a switching operation of the second switching circuit, thereby controlling a charge power for the first DC voltage source, the voltage of the second winding being lower than a charge of the first DC voltage source,
the control unit controls conversion of a DC voltage output from the third switching circuit to an AC voltage using the inverter, to supply a resultant power to the AC load, and
the control unit controls a DC voltage output from the fourth switching circuit by controlling a switching operation of the fourth switching circuit, thereby controlling a charge power for the second DC voltage source, and
whereby a distribution control of the input power from the AC power supply is performed, and
wherein, in the distribution control of the input power from the AC power supply, the control unit stops the switching operation of the second switching circuit and allows stop of charging for the first DC voltage source, and the control unit stops the switching operation of the fourth switching circuit and allows a stop of charging for the second DC voltage source.

2. A power conversion device comprising:
a transformer composed of a first winding, a second winding, and a fourth winding which are magnetically coupled;
a first switching circuit having an AC end connected to the first winding via a first step-up coil;
an AC/DC converter having a DC end connected to a DC end of the first switching circuit, and an AC end connected to an AC power supply;
a second switching circuit having an AC end connected to the second winding via a second step-up coil;
a first DC voltage source connected to a DC end of the second switching circuit;
a fourth switching circuit connected between the fourth winding and a second DC voltage source;

an inverter connected to the DC end of the AC/DC converter, in parallel with the first switching circuit; and a control unit to control the first switching circuit, the second switching circuit, and the fourth switching circuit, wherein the second switching circuit is a bidirectional switch circuit that transmits power from the second winding to the first DC voltage source and transmits power from the first DC voltage source to the second winding, and a turns ratio between the first winding and the second winding is set so that voltage of the second winding is lower than a charge of the first DC voltage source, wherein, to distribute an input power from the AC power supply to the first DC voltage source, an AC load connected to the inverter, and the second DC voltage source, the control unit controls a power reception amount of the input power from the AC power supply by controlling a switching operation of the first switching circuit, the control unit steps up voltage of the second winding by controlling a switching operation of the second switching circuit, thereby controlling a charge power for the first DC voltage source, the voltage of the second winding being lower than a charge of the first DC voltage source, the control unit controls a DC voltage output from the fourth switching circuit by controlling a switching operation of the fourth switching circuit, thereby controlling a charge power for the second DC voltage source, and the control unit controls conversion of a DC voltage output from the AC/DC converter to an AC voltage using the inverter, to supply a resultant power to the AC load, whereby a distribution control of the input power from the AC power supply is performed, and wherein, in the distribution control of the input power from the AC power supply, the control unit stops the switching operation of the second switching circuit and allows stop of charging for the first DC voltage source, and the control unit stops the switching operation of the fourth switching circuit and allows a stop of charging for the second DC voltage source.

3. A power conversion device comprising:

a transformer composed of a first winding, a second winding, and a third winding which are magnetically coupled;

a first switching circuit having an AC end connected to the first winding via a first step-up coil;

an AC/DC converter having a DC end connected to a DC end of the first switching circuit, and an AC end connected to an AC power supply;

a second switching circuit having an AC end connected to the second winding via a second step-up coil;

a first DC voltage source connected to a DC end of the second switching circuit;

a third switching circuit having an AC end connected to the third winding;

an inverter connected to a DC end of the third switching circuit; and a control unit to control the first switching circuit, the second switching circuit, and the third switching circuit, wherein the second switching circuit is a bidirectional switch circuit that transmits power from the second winding to the first DC voltage source and transmits power from the first DC voltage source to the second winding, and a turns ratio between the first winding and the second winding is set so that voltage of the second winding is lower than a charge of the first DC voltage source, wherein, to distribute an input power from the AC power supply to the first DC voltage source and an AC load connected to the inverter, the control unit controls a power reception amount of the input power from the AC power supply by controlling a switching operation of the first switching circuit, the control unit steps up voltage of the second winding by controlling a switching operation of the second switching circuit, thereby controlling a charge power for the first DC voltage source, the voltage of the second winding being lower than a charge of the first DC voltage source, and the control unit controls conversion of a DC voltage output from the third switching circuit to an AC voltage using the inverter, to supply a resultant power to the AC load, whereby a distribution control of the input power from the AC power supply is performed, and wherein, in the distribution control of the input power from the AC power supply, the control units stops the switching operation of the second switching circuit and allows a stop of charging for the first DC voltage source.

4. A power conversion device comprising:

a transformer composed of a first winding, a second winding, and a fourth winding which are magnetically coupled;

a first switching circuit having an AC end connected to the first winding via a first step-up coil;

an AC/DC converter having an output end connected to a DC end of the first switching circuit, and an input end connected to an AC power supply;

a second switching circuit having an AC end connected to the second winding via a second step-up coil;

a first DC voltage source connected to a DC end of the second switching circuit;

a fourth switching circuit connected between the fourth winding and a second DC voltage source; and a control unit to control the first switching circuit, the second switching circuit, and the third switching circuit, wherein the second switching circuit is a bidirectional switch circuit that transmits power from the second winding to the first DC voltage source and transmits power from the first DC voltage source to the second winding, and a turns ratio between the first winding and the second winding is set so that voltage of the second winding is lower than a charge of the first DC voltage source, wherein, to distribute an input power from the AC power supply to the first DC voltage source and the second DC voltage source, the control unit controls a power reception amount of the input power from the AC power supply by controlling a switching operation of the first switching circuit, the control unit steps up voltage of the second winding by controlling a switching operation of the second switching circuit, thereby controlling a charge power for the first DC voltage source, the voltage of the second winding being lower than a charge of the first DC voltage source, and the control unit controls a DC voltage output from the fourth switching circuit by controlling a switching operation of the fourth switching circuit, thereby controlling a charge power for the second DC voltage source, whereby a distribution control of the input power from the AC power supply is performed, and wherein, in the distribution control of the input power from the AC power supply, the control unit stops the switching operation of the second switching circuit and allows stop of charging for the first DC voltage source, and the control unit stops the switching operation of the fourth switching circuit and allows a stop of charging for the second DC voltage source.

5. The power conversion device according to claim 1, wherein, in a case where the first DC voltage source is used as a power supply source, the control unit controls the switching operation of the second switching circuit as a half-bridge type to cause a voltage applied to the second winding of the transformer to be half a voltage of the first DC voltage source, to reduce the voltage applied to the second winding.

6. The power conversion device according to claim 1, wherein, in a case where the first DC voltage source is used as a power supply source, the control unit controls the switching operation of the second switching circuit as a full-bridge type to cause a voltage applied to the second winding of the transformer to be higher than when the control unit controls the switching operation of the second switching circuit as a half-bridge type.

7. The power conversion device according to claim 1, wherein, in charging of the second DC voltage source, the control unit performs charge control using a voltage obtained by stepping down a voltage of the fourth winding of the transformer through the fourth switching circuit.

8. The power conversion device according to claim 1, wherein,
a third step-up coil is connected between the third winding and the AC end of the third switching circuit,
in a first case where an input voltage to the inverter is higher than a predetermined voltage value, the control unit operates the third switching circuit as a rectification circuit without performing a switching operation of the third switching circuit, and
in a second case where the input voltage to the inverter is lower than the predetermined voltage value, a voltage of the third winding of the transformer is controlled by controlling the switching operation of the third switching circuit, to keep the input voltage to the inverter constant.

9. The power conversion device according to claim 1, wherein, in a case where there is no input power from the AC power supply, the control unit uses the second DC voltage source as a power supply source to charge the first DC voltage source via the second winding and the second switching circuit, and supply power to the inverter via the third winding of the transformer and the third switching circuit.

10. The power conversion device according to claim 1, wherein, in a case where both the AC power supply and the first DC voltage source are used as a power supply source, the control unit supplies power to the inverter via the third winding of the transformer and the third switching circuit, and the control unit charges the second DC voltage source via the fourth winding of the transformer and the fourth switching circuit.

11. The power conversion device according to claim 3, wherein, in a case where both the AC power supply and the first DC voltage source are used as a power supply source, the control unit supplies power to the inverter via the third winding of the transformer and the third switching circuit.

12. The power conversion device according to claim 4, wherein, in a case where both the AC power supply and the first DC voltage source are used as a power supply source, the control unit charges the second DC voltage source via the fourth winding of the transformer and the fourth switching circuit.

13. The power conversion device according to claim 2, wherein, in a case where the first DC voltage source is used as a power supply source, the control unit controls the switching operation of the second switching circuit as a half-bridge type to cause a voltage applied to the second winding of the transformer to be half a voltage of the first DC voltage source, to reduce the voltage applied to the second winding.

14. The power conversion device according to claim 3, wherein, in a case where the first DC voltage source is used as a power supply source, the control unit controls the switching operation of the second switching circuit as a half-bridge type to cause a voltage applied to the second winding of the transformer to be half a voltage of the first DC voltage source, to reduce the voltage applied to the second winding.

15. The power conversion device according to claim 4, wherein, in a case where the first DC voltage source is used as a power supply source, the control unit controls the switching operation of the second switching circuit as a half-bridge type to cause a voltage applied to the second winding of the transformer to be half a voltage of the first DC voltage source, to reduce the voltage applied to the second winding.

16. The power conversion device according to claim 2, wherein, in a case where the first DC voltage source is used as a power supply source, the control unit controls the switching operation of the second switching circuit as a full-bridge type to cause a voltage applied to the second winding of the transformer to be higher than when the control unit controls the switching operation of the second switching circuit as a half-bridge type.

17. The power conversion device according to claim 3, wherein, in a case where the first DC voltage source is used as a power supply source, the control unit controls the switching operation of the second switching circuit as a full-bridge type to cause a voltage applied to the second winding of the transformer to be higher than when the control unit controls switching operation of the second switching circuit as a half-bridge type.

18. The power conversion device according to claim 4, wherein, in a case where the first DC voltage source is used as a power supply source, the control unit controls the switching operation of the second switching circuit as a full-bridge type to cause a voltage applied to the second winding of the transformer to be higher than when the control unit controls the switching operation of the second switching circuit as a half-bridge type.

19. The power conversion device according to claim 2, wherein, in charging of the second DC voltage source, the control unit performs charge control using a voltage obtained by stepping down a voltage of the fourth winding of the transformer through the fourth switching circuit.

20. The power conversion device according to claim 4, wherein, in charging of the second DC voltage source, the control unit performs charge control using a voltage obtained by stepping down a voltage of the fourth winding of the transformer through the fourth switching circuit.

21. The power conversion device according to claim 3, wherein,
- a third step-up coil is connected between the third winding and the AC end of the third switching circuit,
- in a first case where an input voltage to the inverter is higher than a predetermined voltage value, the control unit operates the third switching circuit as a rectification circuit without performing a switching operation of the third switching circuit, and
- in a second case where the input voltage to the inverter is lower than the predetermined voltage value, the control unit steps up a voltage of the third winding of the transformer by controlling the switching operation of the third switching circuit, to keep the input voltage to the inverter constant.

* * * * *